(12) United States Patent
Masese et al.

(10) Patent No.: US 10,811,684 B2
(45) Date of Patent: Oct. 20, 2020

(54) POTASSIUM COMPOUND AND POSITIVE ELECTRODE ACTIVE MATERIAL FOR POTASSIUM ION SECONDARY BATTERIES CONTAINING SAME

(71) Applicant: National Institute of Advanced Industrial Science and Technology, Tokyo (JP)

(72) Inventors: Titus Nyamwaro Masese, Osaka (JP); Masahiro Shikano, Osaka (JP); Hikari Sakaebe, Osaka (JP); Hiroshi Senoh, Osaka (JP); Hikaru Sano, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 130 days.

(21) Appl. No.: 15/781,254

(22) PCT Filed: Dec. 7, 2016

(86) PCT No.: PCT/JP2016/086415
§ 371 (c)(1),
(2) Date: Nov. 5, 2018

(87) PCT Pub. No.: WO2017/099135
PCT Pub. Date: Jun. 15, 2017

(65) Prior Publication Data
US 2019/0067696 A1    Feb. 28, 2019

(30) Foreign Application Priority Data

Dec. 7, 2015    (JP) ................................ 2015-238898

(51) Int. Cl.
*H01B 1/08*    (2006.01)
*H01M 4/00*    (2006.01)
(Continued)

(52) U.S. Cl.
CPC .......... *H01M 4/5825* (2013.01); *C01B 33/32* (2013.01); *C01G 45/1214* (2013.01);
(Continued)

(58) Field of Classification Search
CPC . H01B 1/00; H01B 1/08; C01B 33/32; H01M 4/00; H01M 4/136; H01M 4/58; C01G 45/00; C01G 49/00; C01G 51/00
See application file for complete search history.

(56) References Cited

FOREIGN PATENT DOCUMENTS

| CN | 103219551 | * | 7/2013 |
| CN | 104701531 | * | 6/2015 |

(Continued)

OTHER PUBLICATIONS

JP 2008218105 (pub 2008) English language machine translation.*

(Continued)

*Primary Examiner* — Mark Kopec
(74) *Attorney, Agent, or Firm* — Cesari and McKenna, LLP

(57) ABSTRACT

Provided is a material that can be used as a potassium secondary battery positive electrode active material (particularly a potassium ion secondary battery positive electrode active material), other than Prussian blue, by using a potassium compound and a potassium ion secondary battery positive electrode active material comprising the potassium compound, the potassium compound being represented by general formula (1):

$K_n A_k BO_m$, wherein A is a positive divalent element in groups 7 to 11 of the periodic table; B is positive tetravalent silicon, germanium, titanium or manganese, excluding a case in which A is manganese and B is titanium, and a case in which A is cobalt and B is silicon; n is 1.5 to 2.5; and m is 3.5 to 4.5.

8 Claims, 39 Drawing Sheets

(51) Int. Cl.
*H01M 4/58* (2010.01)
*C01B 33/32* (2006.01)
*C01G 49/00* (2006.01)
*C01G 53/00* (2006.01)
*H01M 4/485* (2010.01)
*C01G 45/12* (2006.01)
*H01M 4/62* (2006.01)
*H01M 4/136* (2010.01)
*C01G 51/00* (2006.01)
*H01M 4/131* (2010.01)
*H01M 4/505* (2010.01)
*H01M 4/525* (2010.01)
*H01M 10/054* (2010.01)
*C01B 33/20* (2006.01)
*H01M 4/02* (2006.01)

(52) U.S. Cl.
CPC ..... *C01G 45/1235* (2013.01); *C01G 45/1242* (2013.01); *C01G 49/0018* (2013.01); *C01G 49/0027* (2013.01); *C01G 49/0072* (2013.01); *C01G 51/52* (2013.01); *C01G 53/42* (2013.01); *C01G 53/52* (2013.01); *H01B 1/08* (2013.01); *H01M 4/131* (2013.01); *H01M 4/136* (2013.01); *H01M 4/485* (2013.01); *H01M 4/505* (2013.01); *H01M 4/525* (2013.01); *H01M 4/624* (2013.01); *H01M 4/625* (2013.01); *H01M 10/054* (2013.01); *C01B 33/20* (2013.01); *C01P 2002/72* (2013.01); *C01P 2002/76* (2013.01); *C01P 2002/77* (2013.01); *C01P 2002/85* (2013.01); *C01P 2002/88* (2013.01); *C01P 2004/03* (2013.01); *C01P 2004/61* (2013.01); *C01P 2004/62* (2013.01); *C01P 2006/37* (2013.01); *C01P 2006/40* (2013.01); *C01P 2006/60* (2013.01); *H01M 2004/028* (2013.01)

(56) References Cited

FOREIGN PATENT DOCUMENTS

| | | |
|---|---|---|
| JP | 2008218105 A | 9/2008 |
| WO | WO 2015021789 * | 2/2015 |
| WO | WO-2016059907 A1 | 4/2016 |
| WO | WO 2016168496 A1 * | 10/2016 |

OTHER PUBLICATIONS

Zhang et al "Electrochemistry of the layered Manganese Dioxides: AxMn1—y(Co,Ni,Fe)yO2 (A=Li,K) rate effects", Electrochemical and Solid State Letters, 3(7) 309-311 (2000).*

Wang et al "P3-type K0.33Co0.53Mn0.47O2-0.39H2): a novel bifunctional electrode for Na-ion batteries", Mater. Horiz., 2017, 4, 1122.*

Whittingham et al "The stabilization of layered manganese oxides for use in rechargeable lithium batteries", Mat. Res. Soc. Symp. Proc. vol. 575, 2000 (p. 77-82).*

Sasaki et al "Synthesis of Hollandite- Type Ky( $Mn_1$—χMx) $O_2$ (M = Co, Fe) by Oxidation of Mn(II) Precursor and Preliminary Results on Electrode Characteristics in Rechargeable Lithium Batteries"; Electrochemical and Solid-State Letters, 8 (9) A471-A475, 2005.

Wessells et al "Copper hexacyanoferrate battery electrodes with long cycle life and high power"; Nature Communications, 2011, vol. 2, No. 550, pp. 1-5, Macmillan Publishers Limited.

Komaba et al "Potassium intercalation into graphite to realize high-voltage/high-power potassium-ion batteries and potassium-ion capacitors"; Electrochemistry Communications, 2015, vol. 60, pp. 172-175.

\* cited by examiner

ZAF method simple quantitative analysis

Fitting coefficient: 0.2419

| Element | (keV) | mass% | σ | Atomic number% | Compound mass% | Number of cations K |
|---|---|---|---|---|---|---|
| K K | 3.312 | 36.23 | 0.16 | 47.63 | | 44.4522 |
| Mn K | 5.894 | 31.71 | 0.26 | 29.67 | | 34.0752 |
| Ge L | 1.198 | 32.05 | 0.19 | 22.70 | | 21.4727 |
| Total | | 100.00 | | 100.00 | | |

POTASSIUM COMPOUND AND POSITIVE ELECTRODE ACTIVE MATERIAL FOR POTASSIUM ION SECONDARY BATTERIES CONTAINING SAME

CROSS REFERENCE TO RELATED APPLICATIONS

This application is the National Stage of International Application No. PCT/JP2016/086415, filed Dec. 7, 2016, which claims the benefit of priority of Japanese Patent Application No. 2015-238,898, filed Dec. 7, 2015, the contents of both being incorporated by reference in their entirety for all purposes.

TECHNICAL FIELD

The present invention relates to a potassium compound and a potassium ion secondary battery positive electrode active material comprising the same.

BACKGROUND ART

Research and development of secondary batteries etc. using lithium ions, sodium ions, magnesium ions, aluminum ions, or the like as carrier ions have been recently drawing attention. From the viewpoint of resource and cost advantages as well as adaptability etc. of a wide variety of novel materials, secondary batteries using other carrier ions have been studied and developed as an actual solution for next-generation, large-sized storage batteries.

Among these, potassium ions, which have a low Lewis acidity and a small Coulomb interaction, have been expected to produce ultrafast chargeable and dischargeable storage batteries. Further, because of the large atomic weight of potassium, potassium-containing materials have a higher true density than lithium-containing materials, and an improvement in energy density per volume can be expected. Moreover, even when dendrites occur in potassium and cause a short circuit, since they are spontaneously dissolved by generated heat and easily eliminate the short circuit, thermal runway is unlikely to occur. Additionally, since potassium does not form an alloy with aluminum, there is no need to use expensive copper as a current collector of the negative electrode side.

Such potassium ion secondary batteries are new subjects of study and are highly expected to be novel storage batteries that will create new industries. As such a potassium ion secondary battery, a potassium secondary battery in which Prussian blue (KCuFe(CN)$_6$), which is used as a positive electrode active material, is combined with carbon, which is used as a negative electrode material, has been reported, wherein a high discharge voltage of 3.8 V is attained (NPL 1).

CITATION LIST

Non-Patent Literature

NPL 1: C. D. Wessells et al., Nat. Comm., 2, 550 (2011)
NPL 2: Komaba et al., Electrochem. Commun., 60, 172-175 (2015)

SUMMARY OF INVENTION

Technical Problem

However, since potassium has a large atomic weight and a large ionic radius, the theoretical capacity of a potassium ion secondary battery is likely to be lower than that of a lithium ion secondary battery. Sb, KC$_8$, graphite, etc., are known as negative electrode materials of potassium ion secondary batteries (NPL 2); however, positive electrode active materials comprising Prussian blue have a low capacity (theoretical charge capacity: about 85 mAhg$^{-1}$; effective capacity: 65 mAhg$^{-1}$ (NPL 1)). Other than Prussian blue, effective positive electrode active materials have not been found. An object of the present invention is to provide a material other than Prussian blue, the material having high theoretical charge-discharge capacity and being able to be used as a potassium ion secondary battery positive electrode active material.

Solution to Problem

The inventors conducted extensive research to solve the above problems. As a result, they found that a potassium compound having a specific composition enables insertion and extraction of potassium ions, and has high theoretical charge-discharge capacity so that it can be used as a potassium ion secondary battery positive electrode active material. Based on this findings, the inventors conducted further research and accomplished the present invention. Specifically, the present invention includes the following.

Item 1. A potassium compound represented by general formula (1):

$$K_nA_kBO_m,$$

wherein A is a positive divalent element in groups 7 to 11 of the periodic table; B is positive tetravalent silicon, germanium, titanium or manganese, excluding a case in which A is manganese and B is titanium, and a case in which A is cobalt and B is silicon; k is 0.6 to 1.5; n is 1.5 to 2.5; and m is 3.5 to 4.5.

Item 2. The potassium compound according to Item 1, wherein A is manganese, iron, cobalt, nickel, or copper.

Item 3. The potassium compound according to Item 1 or 2, wherein the potassium compound has at least one member selected from the group consisting of a cubic structure, a tetragonal structure, an orthorhombic structure, and a monoclinic structure.

Item 4. The potassium compound according to any one of Items 1 to 3, wherein the potassium compound has a mean particle diameter of 0.2 to 200 μm.

Item 5. A method for producing the potassium compound according to any one of Items 1 to 4, the method comprising a heating step of heating a mixture containing potassium, an element in groups 7 to 11 of the periodic table, silicon, germanium, titanium or manganese, and oxygen.

Item 6. The production method according to Item 5, wherein the heating temperature in the heating step is 600 to 1500° C.

Item 7. A potassium ion secondary battery positive electrode active material comprising a potassium compound represented by general formula (2): $K_nA_kBO_m$, wherein A is a positive divalent element in groups 7 to 11 of the periodic table; B is positive tetravalent silicon, germanium, titanium or manganese; k is 0.6 to 1.5; n is 1.5 to 2.5; and m is 3.5 to 4.5.

Item 8. A potassium ion secondary battery positive electrode active material comprising the potassium compound according to any one of Items 1 to 4.

Item 9. A potassium ion secondary battery positive electrode comprising the potassium ion secondary battery positive electrode active material according to Item 7 or 8.

Item 10. The potassium ion secondary battery positive electrode according to Item 9, further comprising a conductive material.

Item 11. A potassium ion secondary battery comprising the potassium ion secondary battery positive electrode according to Item 9 or 10.

Advantageous Effects of Invention

The potassium compound of the present invention enables insertion and extraction of potassium ions, and thus can be used as a potassium ion secondary battery positive electrode active material. In particular, potassium ion secondary batteries using the potassium compound of the present invention as a positive electrode active material are expected to have high capacity and high potential.

Further, since potassium does not form an alloy with aluminum, a potassium ion secondary battery using the potassium compound of the present invention as a positive electrode active material can also use low-cost aluminum rather than expensive copper as a negative electrode current collector.

DESCRIPTION OF EMBODIMENTS

1. Potassium Compound

Figure 1:
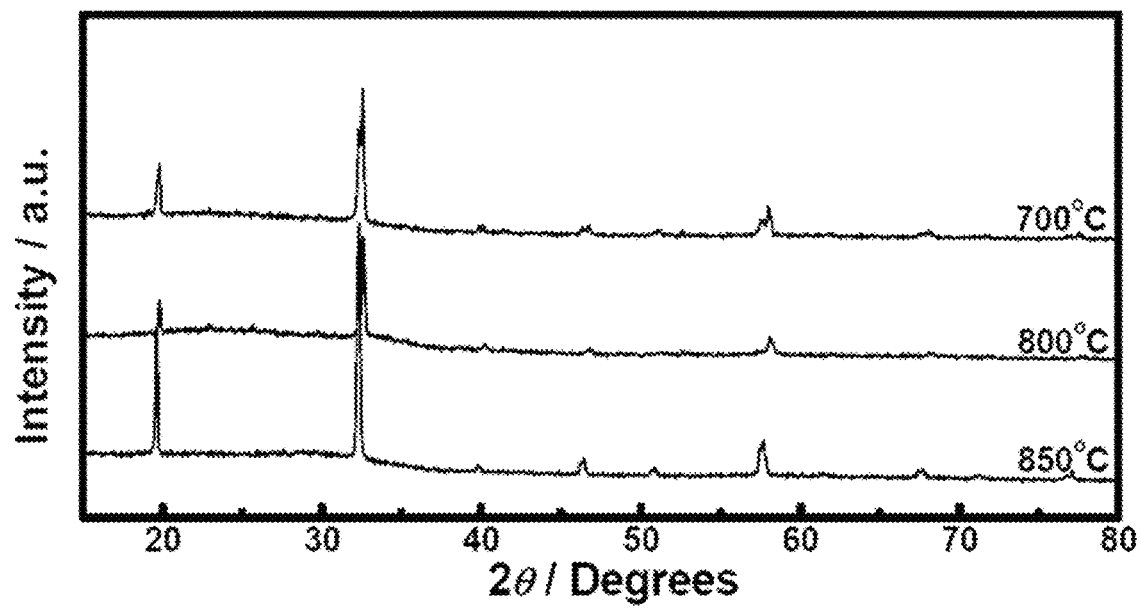
FIG. 1 shows X-ray diffraction patterns of $K_2Fe^{2+}Si^{4+}O_4$ obtained in Example 1-2.

The potassium compound of the present invention is a potassium compound represented by general formula (1): $K_nA_kBO_m$, wherein A is a positive divalent element in groups 7 to 11 of the periodic table; B is positive tetravalent silicon, germanium, titanium or manganese, excluding a case in which A is manganese and B is titanium, and a case in which A is cobalt and B is silicon; k is 0.6 to 1.5; n is 1.5 to 2.5; and m is 3.5 to 4.5 (hereinafter also referred to as "the potassium compound of the present invention").

In general formula (1), A is a positive divalent element in groups 7 to 11 of the periodic table. In terms of the ease of insertion and extraction of potassium ions, as well as capacity and potential, A is preferably manganese, iron, cobalt, nickel, copper, or the like.

In general formula (1), B is positive tetravalent silicon, germanium, titanium, or manganese.

A and B may be the same elements. That is, both A and B may be manganese. However, the potassium compound of the present invention excludes a case in which A is manganese and B is titanium, and a case in which A is cobalt and B is silicon.

In general formula (1), k is 0.6 to 1.5, and preferably 0.7 to 1.2 in terms of the ease of insertion and extraction of potassium ions, as well as capacity and potential. n is 1.5 to 2.5, and preferably 1.7 to 2.3 in terms of the ease of insertion and extraction of potassium ions, as well as capacity and potential. m is 3.5 to 4.5, and preferably 3.7 to 4.3 in terms of the ease of insertion and extraction of potassium ions, as well as capacity and potential.

Specific examples of the potassium compound of the present invention include $K_nFe^{2+}_kSi^{4+}O_4$, $K_nFe^{2+}_kGe^{4+}O_4$, $K_nFe^{2+}_kTi^{4+}O_4$, $K_nFe^{2+}_kMn^{4+}O_4$, $K_nMn^{2+}_kSi^{4+}O_4$, $K_nMn^{2+}_kGe^{4+}O_4$, $K_nMn^{2+}_kMn^{4+}O_4$, $K_nCo^{2+}_kGe^{4+}O_4$, $K_nCo^{2+}_kTi^{4+}O_4$, $K_nCo^{2+}_kMn^{4+}O_4$, $K_nNi^{2+}_kSi^{4+}O_4$, $K_nNi^{2+}_kGe^{4+}O_4$, $K_nNi^{2+}_kTi^{4+}O_4$, $K_nNi^{2+}_kMn^{4+}O_4$, $K_nCu^{2+}_kSi^{4+}O_4$, $K_nCu^{2+}_kGe^{4+}O_4$, $K_nCu^{2+}_kTi^{4+}O_4$, $K_nCu^{2+}_kMn^{4+}O_4$, and the like. Of these, in terms of the ease of insertion and extraction of potassium ions, as well as capacity and potential, it is preferable to use $K_nFe^{2+}_kSi^{4+}O_4$, $K_nFe^{2+}_kGe^{4+}O_4$, $K_nFe^{2+}_kTi^{4+}O_4$, $K_nFe^{2+}_kMn^{4+}O_4$, $K_nMn^{2+}_kSi^{4+}O_4$, $K_nMn^{2+}_kGe^{4+}O_4$, $K_nMn^{2+}_kMn^{4+}O_4$, $K_nCo^{2+}_kGe^{4+}O_4$, $K_nCo^{2+}_kTi^{4+}O_4$, $K_nNi^{2+}_kSi^{4+}O_4$, $K_nNi^{2+}_kGe^{4+}O_4$, $K_nNi^{2+}_kTi^{4+}O_4$, $K_nCu^{2+}_kSi^{4+}O_4$, $K_nCu^{2+}_kGe^{4+}O_4$, etc.; and it is more preferable to use $K_nFe^{2+}_kSi^{4+}O_4$, $K_nFe^{2+}_kGe^{4+}O_4$, $K_nFe^{2+}_kTi^{4+}O_4$, $K_nFe^{2+}_kMn^{4+}O_4$, $K_nMn^{2+}_kSi^{4+}O_4$, $K_nCo^{2+}_kGe^{4+}O_4$, $K_nCo^{2+}_kTi^{4+}O_4$, $K_nNi^{2+}_kSi^{4+}O_4$, $K_nNi^{2+}_kGe^{4+}O_4$, $K_nNi^{2+}_kTi^{4+}O_4$, $K_nCu^{2+}_kSi^{4+}O_4$, etc.

The potassium compound of the present invention can take any crystal structure, such as a cubic structure, a tetragonal structure, an orthorhombic structure, or a monoclinic structure. In particular, the potassium compound of the present invention preferably has a cubic structure, a tetragonal structure, an orthorhombic structure, a monoclinic structure, etc., as a main phase. For example, $K_nMn^{2+}_kSi^{4+}O_4$ and $K_nFe^{2+}_kSi^{4+}O_4$ preferably have a cubic structure as a main phase; $K_nCo^{2+}_kGe^{4+}O_4$ and $K_nNi^{2+}_kSi^{4+}O_4$ preferably have a tetragonal structure as a main phase; $K_nFe^{2+}_kGe^{4+}O_4$, $K_nFe^{2+}_kTi^{4+}O_4$, and $K_nFe^{2+}_kMn^{4+}O_4$ preferably have an orthorhombic structure as a main phase; and $K_nCo^{2+}_kTi^{4+}O_4$ and $K_nCu^{2+}_kSi^{4+}O_4$ preferably have a monoclinic structure as a main phase. The amount of the main phase crystal structure present in the potassium compound of the present invention is not limited and is preferably 80 mol % or more, and more preferably 90 mol % or more based on the entire potassium compound of the present invention. Thus, the potassium compound of the present invention can be formed of a material having a single phase crystal structure, or a material having another crystal structure, as long as the effect of the present invention is not impaired. The crystal structure of the potassium compound of the present invention is confirmed by X-ray diffraction measurement.

The potassium compound of the present invention has diffraction peaks at various positions in the X-ray diffractogram obtained using CuKα radiation. For example, $K_nFe^{2+}_k Si^{4+}O_4$, $K_nFe^{2+}_kGe^{4+}O_4$, $K_nFe^{2+}_kTi^{4+}O_4$, $K_nFe^{2+}_k Mn^{4+}O_4$, $K_nMn^{2+}_kSi^{4+}O_4$, $K_nCo^{2+}_kGe^{4+}O_4$, etc., have the strongest peak at a diffraction angle 2θ of 30.8 to 33.9°, and preferably further have peaks at least at a diffraction angle 2θ of 18.4 to 21.5°, 35.1 to 41.1°, 43.5 to 47.7°, 48.2 to 52.8°, 55.2 to 58.8°, 63.0 to 71.7°, etc. Moreover, $K_nCu^{2+}_k Si^{4+}O_4$ etc. have the strongest peak at a diffraction angle 2θ of 34.7 to 36.6°, and preferably further have peaks at least at a diffraction angle 2θ of 24.6 to 27.7°, 28.8 to 30.6°, 31.2 to 33.6°, 37.9 to 44.6°, 47.8 to 50.3°, 51.2 to 52.6°, 53.0 to 54.9°, 57.4 to 59.1°, 60.9 to 62.9°, 65.0 to 69.4°, 71.6 to 73.3°, 74.5 to 76.8°, 79.5 to 81.6°, 82.0 to 84.6°, etc. Furthermore, $K_nCo^{2+}{}_kTi^{4+}{}_kO_4$, $K_nNi^{2+}{}_kSi^{4+}{}_kO_4$, etc., have the strongest peak at a diffraction angle 2θ of 41.5 to 45.2°, and preferably further have peaks at least at a diffraction angle 2θ of 35.7 to 38.9°, 60.8 to 65.3°, 73.1 to 81.5°, etc. In the present specification, the strongest peak means the peak with the highest intensity.

From the viewpoint of easy potassium ion insertion and extraction, capacity, and potential, the mean particle diameter of the potassium compound of the present invention having the crystal structure and composition mentioned above is preferably 0.2 to 200 μm, and more preferably 0.5 to 150 μm. The mean particle diameter of the potassium compound of the present invention is measured by electron microscope (SEM) observation.

2. Method for Producing Potassium Compound

The potassium compound of the present invention can be obtained, for example, by a production method comprising a heating step of heating a mixture containing potassium, a positive divalent element in groups 7 to 11 of the periodic table, positive tetravalent silicon, positive tetravalent germanium, positive tetravalent titanium or positive tetravalent manganese, and oxygen. The method is explained in detail below.

(1) Starting Material Compound

In the production method of the present invention, a mixture containing potassium, an element in groups 7 to 11 of the periodic table, silicon, germanium, titanium or manganese, and oxygen is subjected to a heating step. The starting material compounds for obtaining the mixture containing potassium, an element in groups 7 to 11 of the periodic table, silicon, germanium, titanium or manganese, and oxygen may be a mixture that in the end contains potassium, an element in groups 7 to 11 of the periodic table, silicon, germanium, titanium or manganese, and oxygen at a specific ratio. Usable examples include potassium-containing compounds, manganese-containing compounds, iron-containing compounds, cobalt-containing compounds, nickel-containing compounds, copper-containing compounds, silicon-containing compounds, germanium-containing compounds, titanium-containing compounds, oxygen-containing compounds, and the like.

The types of potassium-containing compounds, manganese-containing compounds, iron-containing compounds, cobalt-containing compounds, nickel-containing compounds, copper-containing compounds, silicon-containing compounds, germanium-containing compounds, titanium-containing compounds, oxygen-containing compounds, etc., are not limited. Four or more compounds each containing a respective element among potassium, manganese, iron, cobalt, nickel, copper, silicon, germanium, titanium, oxygen, and the like can be mixed for use. Alternatively, less than four compounds can be mixed using a compound simultaneously containing two or more elements among potassium, manganese, iron, cobalt, nickel, copper, silicon, germanium, titanium, oxygen, and the like as part of the starting materials.

These starting material compounds are preferably compounds that do not contain metal elements (particularly rare metal elements) other than potassium, manganese, iron, cobalt, nickel, copper, silicon, germanium, titanium, oxygen, etc. Moreover, the elements other than potassium, manganese, iron, cobalt, nickel, copper, silicon, germanium, titanium, oxygen, etc., contained in the starting material compounds are preferably those that undergo extraction and volatilization upon heat treatment in a non-oxidizing atmosphere, described later.

Specific examples of such starting material compounds are as follows. Examples of potassium-containing compounds include metal potassium (K), potassium hydroxide (KOH), potassium nitrate ($KNO_3$), potassium chloride (KCl), potassium carbonate ($K_2CO_3$), potassium azide ($KN_3$), potassium oxalate ($K_2C_2O_4$), and the like. Examples of manganese-containing compounds include metal manganese (Mn); manganese oxides, such as manganese(II) oxide (MnO) and manganese(IV) oxide ($MnO_2$); manganese hydroxides, such as manganese(II) hydroxide ($Mn(OH)_2$) and manganese(IV) hydroxide ($Mn(OH)_4$); manganese(II) carbonate ($MnCO_3$); manganese(II) oxalate ($MnC_2O_4$); and the like. Examples of iron-containing compounds include metal iron (Fe); iron oxides, such as iron(II) oxide (FeO) and iron(III) oxide ($Fe_2O_3$); iron hydroxides, such as iron(II) hydroxide ($Fe(OH)_2$) and iron(III) hydroxide ($Fe(OH)_3$); iron carbonates, such as iron(II) carbonate ($FeCO_3$) and iron(III) carbonate ($Fe_2(CO_3)_3$); iron(II) oxalate ($FeC_2O_4$); and the like. Examples of cobalt-containing compounds include metal cobalt (Co), cobalt oxide (CoO), cobalt hydroxide (CoOH), cobalt carbonate ($CoCO_3$), cobalt oxalate ($CoC_2O_4$), etc. Examples of nickel-containing compounds include metal nickel (Ni); nickel oxides, such as nickel(I) oxide ($Ni_2O$) and nickel(II) oxide (NiO); nickel hydroxides, such as nickel(I) hydroxide (NiOH) and nickel (II) hydroxide ($Ni(OH)_2$); nickel(II) carbonate ($NiCO_3$); nickel(II) oxalate ($NiC_2O_4$); and the like. Examples of copper-containing compounds include metal copper (Cu), copper oxide (CuO), copper hydroxide (CuOH), copper carbonate ($CuCO_3$), copper oxalate ($CuC_2O_4$), and the like. Examples of silicon-containing compounds include silicon (Si), silicon oxide ($SiO_2$), and the like. Examples of germanium-containing compounds include germanium (Ge), germanium oxide ($GeO_2$), and the like. Examples of titanium-containing compounds include metal titanium (Ti); titanium oxide ($TiO_2$); titanium oxides, such as titanium hydroxide ($Ti(OH)_4$); and the like. Examples of oxygen-containing compounds include potassium hydroxide (KOH); potassium carbonate ($K_2CO_3$); manganese oxides, such as manganese (II) oxide (MnO) and manganese(IV) oxide ($MnO_2$); manganese hydroxides, such as manganese(II) hydroxide ($Mn(OH)_2$) and manganese(IV) hydroxide ($Mn(OH)_4$); manganese(II) carbonate ($MnCO_3$); manganese(II) oxalate ($MnC_2O_4$); iron oxides, such as iron(II) oxide (FeO) and iron(III) oxide ($Fe_2O_3$); iron hydroxides, such as iron(II) hydroxide ($Fe(OH)_2$) and iron(III) hydroxide ($Fe(OH)_3$); iron carbonates, such as iron(II) carbonate ($FeCO_3$) and iron(III) carbonate ($Fe_2(CO_3)_3$); iron(II) oxalate ($FeC_2C_4$); cobalt oxide (CoO); cobalt hydroxide (CoOH); cobalt carbonate ($CoCO_3$); cobalt oxalate ($CoC_2O_4$); nickel oxides, such as nickel(I) oxide ($Ni_2O$) and nickel(II) oxide (NiO); nickel hydroxides, such as nickel(I) hydroxide (NiOH) and nickel(II) hydroxide ($Ni(OH)_2$); nickel(II) carbonate ($NiCO_3$); nickel(II) oxalate ($NiC_2O_4$); copper oxide (CuO); copper hydroxide (CuOH); copper carbonate ($CuCO_3$); copper oxalate ($CuC_2O_4$); silicon oxide ($SiO_2$); germanium oxide ($GeO_2$); and the like. Moreover, hydrates of these starting material compounds can also be used.

In the present invention, the above starting material compounds may be commercial products, or may be separately synthesized.

The shape of these starting material compounds is not particularly limited, and a powder shape is preferable in terms of handling properties. Moreover, in terms of reactivity, fine particles are preferable, and a powder shape having a mean particle diameter of 1 μm or less (particularly about 60 to 80 nm) is preferable. The mean particle diameter of the starting material compounds is measured by electron microscope observation (SEM).

The mixture containing potassium, an element in groups 7 to 11 of the periodic table, silicon, germanium, titanium or manganese, and oxygen can be obtained by mixing necessary materials among the starting material compounds explained above.

The mixing ratio of the starting material compounds is not particularly limited. It is preferable to mix the starting material compounds so as to obtain the composition of a potassium compound, which is the final product. The mixing ratio of the starting material compounds is preferably determined so that the ratio of each element contained in the respective starting material compounds is the same as the ratio of each element in the target composite oxide. Specifically, in terms of the ease of insertion and extraction of potassium ions, as well as capacity and potential, the ratio of potassium: an element in groups 7 to 11 of the periodic table: silicon, germanium, titanium or manganese is, for example, preferably 30 to 70 mol %:15 to 35 mol %:15 to 35 mol %, and more preferably 40 to 60 mol %:20 to 30 mol %:20 to 30 mol %.

(2) Production Method

The mixing method for producing a mixture containing potassium, an element in groups 7 to 11 of the periodic table, silicon, germanium, titanium or manganese, and oxygen is not particularly limited. A method that can uniformly mix each starting material compound can be used. Usable examples include mortar mixing, mechanical milling, coprecipitation, a method in which each component is dispersed in a solvent and then mixed, and a method in which the components are mixed by dispersing them in a solvent at once. Of these methods, when mortar mixing is used, the potassium compound of the present invention can be obtained more simply. To obtain a more uniform mixture, coprecipitation can be used.

When mechanical milling is performed as the mixing method, examples of usable mechanical milling devices include a ball mill, a vibration mill, a turbo mill, a disc mill, and the like; and preferably a ball mill. In this case, it is preferable to perform mixing and heat treatment simultaneously.

The atmosphere during mixing and heating is not particularly limited. For example, an inert gas atmosphere, such as argon or nitrogen, can be used. Further, mixing and heating may be performed under reduced pressure (e.g., under vacuum).

In the heat treatment of the mixture containing potassium, an element in groups 7 to 11 of the periodic table, silicon, germanium, titanium or manganese, and oxygen, the heating temperature is preferably 600 to 1500° C., more preferably 650 to 1300° C., and even more preferably 700 to 1000° C., because operation can be more easily performed, and the crystallinity and electrode characteristics (capacity and potential) of the resulting potassium compound can be further improved. The heating time is not particularly limited. For example, the heating time is preferably 10 minutes to 48 hours, and more preferably 30 minutes to 24 hours.

3. Potassium Ion Secondary Battery Positive Electrode Active Material

Because of the above composition, crystal structure, etc., the potassium compound of the present invention enables insertion and extraction of potassium ions, and is thus useful as a potassium ion secondary battery positive electrode active material.

In addition to the potassium compound of the present invention, the following potassium compound also enables insertion and extraction of potassium ions, and is thus useful as a potassium ion secondary battery positive electrode active material. Specifically, this potassium compound is represented by general formula (2): $K_nA_kBO_m$ wherein A is a positive divalent element in groups 7 to 11 of the periodic table; B is positive tetravalent silicon, germanium, titanium or manganese; k is 0.6 to 1.5; n is 1.5 to 2.5; and m is 3.5 to 4.5.

In general formula (2), A and B can be those mentioned in general formula (1). General formula (2) includes a case in which A is manganese and B is titanium, and a case in which A is cobalt and B is silicon.

In general formula (2), k is 0.6 to 1.5, and preferably 0.7 to 1.2 in terms of the ease of insertion and extraction of potassium ions, as well as capacity and potential. n is 1.5 to 2.5, and preferably 1.7 to 2.3 in terms of the ease of insertion and extraction of potassium ions, as well as capacity and potential. m is 3.5 to 4.5, and preferably 3.7 to 4.3 in terms of the ease of insertion and extraction of potassium ions, as well as capacity and potential.

Specific examples of the potassium compound represented by general formula (1) or (2), which can be thus used for the potassium ion secondary battery positive electrode active material of the present invention, include $K_nFe^{2+}{}_kSi^{4+}O_4$, $K_nFe^{2+}{}_kGe^{4+}O_4$, $K_nFe^{2+}{}_kTi^{4+}O_4$, $K_nFe^{2+}{}_kMn^{4+}O_4$, $K_nMn^{2+}{}_kSi^{4+}O_4$, $K_nMn^{2+}{}_kGe^{4+}O_4$, $K_nMn^{2+}{}_kTi^{4+}O_4$, $K_nMn^{2+}{}_kMn^{4+}O_4$, $K_nCo^{2+}{}_kSi^{4+}O_4$, $K_nCo^{2+}{}_kGe^{4+}O_4$, $K_nCo^{2+}{}_kTi^{4+}O_4$, $K_nCo^{2+}{}_kMn^{4+}O_4$, $K_nNi^{2+}{}_kSi^{4+}O_4$, $K_nNi^{2+}{}_kGe^{4+}O_4$, $K_nNi^{2+}{}_kTi^{4+}O_4$, $K_nNi^{2+}{}_kMn^{4+}O_4$, $K_nCu^{2+}{}_kSi^{4+}O_4$, $K_nCu^{2+}{}_kGe^{4+}O_4$, $K_nCu^{2+}{}_kTi^{4+}O_4$, $K_nCu^{2+}{}_kMn^{4+}O_4$, and the like. Of these, in terms of the ease of insertion and extraction of potassium ions, as well as capacity and potential, it is preferable to use $K_nFe^{2+}{}_kSi^{4+}O_4$, $K_nFe^{2+}{}_kGe^{4+}O_4$, $K_nFe^{2+}{}_kTi^{4+}O_4$, $K_nFe^{2+}{}_kMn^{4+}O_4$, $K_nMn^{2+}{}_kSi^{4+}O_4$, $K_nMn^{2+}{}_kGe^{4+}O_4$, $K_nMn^{2+}{}_kTi^{4+}O_4$, $K_nMn^{2+}{}_kMn^{4+}O_4$, $K_nCo^{2+}{}_kSi^{4+}O_4$, $K_nCo^{2+}{}_kGe^{4+}O_4$, $K_nCo^{2+}{}_kTi^{4+}O_4$, $K_nNi^{2+}{}_kSi^{4+}O_4$, $K_nNi^{2+}{}_kGe^{4+}O_4$, $K_nNi^{2+}{}_kTi^{4+}O_4$, $K_nCu^{2+}{}_kSi^{4+}O_4$, $K_nCu^{2+}{}_kGe^{4+}O_4$, etc.; it is more preferable to use $K_nFe^{2+}{}_kSi^{4+}O_4$, $K_nFe^{2+}{}_kGe^{4+}O_4$, $K_nFe^{2+}{}_kTi^{4+}O_4$, $K_nFe^{2+}{}_kMn^{4+}O_4$, $K_nMn^{2+}{}_kSi^{4+}O_4$, $K_nCo^{2+}{}_kSi^{4+}O_4$, $K_nCo^{2+}{}_kGe^{4+}O_4$, $K_nCo^{2+}{}_kTi^{4+}O_4$, $K_nNi^{2+}{}_kSi^{4+}O_4$, $K_nNi^{2+}{}_kGe^{4+}O_4$, $K_nNi^{2+}{}_kTi^{4+}O_4$, $K_nCu^{2+}{}_kSi^{4+}O_4$, etc.; and it is even more preferable to use $K_nCo^{2+}{}_kSi^{4+}O_4$.

The crystal structure of the potassium compound represented by general formula (1) or (2), which can be used for the potassium ion secondary battery positive electrode active material of the present invention, is not particularly limited. The potassium compound of the present invention can have a cubic structure, a tetragonal structure, an orthorhombic structure, a monoclinic structure, or the like. In particular, the potassium compound of the present invention preferably has a cubic structure, a tetragonal structure, an orthorhombic structure, a monoclinic structure, or the like as a main phase. For example, $K_nMn^{2+}{}_kSi^{4+}O_4$ and $K_nFe^{2+}{}_kSi^{4+}O_4$ preferably have a cubic structure as a main phase; $K_nCo^{2+}{}_kGe^{4+}O_4$ and $K_nNi^{2+}{}_kSi^{4+}O_4$ preferably have a tetragonal structure as a main phase; $K_nFe^{2+}{}_kGe^{4+}O_4$, $K_nFe^{2+}{}_kTi^{4+}O_4$, $K_nFe^{2+}{}_kMn^{4+}O_4$, and $K_nCo^{2+}{}_kSi^{4+}O_4$ preferably have an orthorhombic structure as a main phase; and $K_nCo^{2+}{}_kTi^{4+}O_4$ and $K_nCu^{2+}{}_kSi^{4+}O_4$ preferably have a monoclinic structure as a main phase. In the potassium compound represented by general formula (1) or (2), which can be used for the potassium secondary battery positive electrode active material of the present invention, the abundance of the crystal structure as a main phase is not particularly limited, and is preferably 80 mol % or more, and more preferably 90 mol % or more, based on the entire potassium compound represented by general formula (1) or (2), which can be used for the potassium secondary battery positive electrode active material of the present invention. Therefore, the potassium compound represented by general formula (1) or (2), which can be used for the potassium ion secondary battery positive electrode active material of the present invention, can be a material having a single-phase crystal structure, or a material having another crystal structure, as long as the effect of the present invention is not impaired. The crystal structure of the potassium compound represented by general formula (1) or (2), which can be used for the potassium ion secondary battery positive electrode active material of the present invention, is confirmed by X-ray diffraction measurement.

Moreover, the potassium compound represented by general formula (1) or (2), which can be used for the potassium ion secondary battery positive electrode active material of the present invention, can have diffraction peaks in various positions in an X-ray diffractogram obtained using CuKa radiation. For example, $K_nFe^{2+}{}_kSi^{4+}O_4$, $K_nFe^{2+}{}_kGe^{4+}O_4$, $K_nFe^{2+}{}_kTi^{4+}O_4$, $K_nFe^{2+}{}_kMn^{4+}O_4$, $K_nMn^{2+}{}_kSi^{4+}O_4$, $K_nCo^{2+}{}_kGe^{4+}O_4$, $K_nCo^{2+}{}_kSi^{4+}O_4$, etc., have the strongest peak at a diffraction angle 2θ of 30.8 to 33.9°, and preferably further have peaks at least at a diffraction angle 2θ of 18.4 to 21.5°, 35.1 to 41.1°, 43.5 to 47.7°, 48.2 to 52.8°, 55.2 to 58.8°, 63.0 to 71.7°, etc. Moreover, $K_nCu^{2+}{}_kSi^{4+}O_4$ etc. have the strongest peak at a diffraction angle 2θ of 34.7 to 36.6°, and preferably further have peaks at least at a diffraction angle 2θ of 24.6 to 27.7°, 28.8 to 30.6°, 31.2 to 33.6°, 37.9 to 44.6°, 47.8 to 50.3°, 51.2 to 52.6°, 53.0 to 54.9°, 57.4 to 59.1°, 60.9 to 62.9°, 65.0 to 69.4°, 71.6 to 73.3°, 74.5 to 76.8°, 79.5 to 81.6°, 82.0 to 84.6°, etc. Furthermore, $K_nCo^{2+}{}_k Ti^{4+}O_4$, $K_nNi^{2+}{}_kSi^{4+}O_4$, etc., have the strongest peak at a diffraction angle 2θ of 41.5 to 45.2°, and preferably further have peaks at least at a diffraction angle 2θ of 35.7 to 38.9°, 60.8 to 65.3°, 73.1 to 81.5°, etc.

The mean particle diameter of the potassium compound represented by general formula (1) or (2) having the above crystal structure and composition, which can be used for the potassium ion secondary battery positive electrode active material of the present invention, is preferably 0.2 to 200 μm, and more preferably 0.5 to 150 μm, in terms of the ease of insertion and extraction of potassium ions, as well as capacity and potential. The mean particle diameter of the potassium compound represented by general formula (1) or (2), which can be used for the potassium secondary battery positive electrode active material of the present invention, is measured by electron microscope (SEM) observation.

In the potassium ion secondary battery positive electrode active material of the present invention, the potassium compound and a carbon material (e.g., carbon black such as acetylene black) may form a composite. The carbon material thereby suppresses the grain growth during firing, which enables obtaining a fine particle potassium ion secondary battery positive electrode active material having excellent electrode properties. In this case, the content of the carbon material in the potassium ion secondary battery positive electrode active material of the present invention is preferably adjusted to 3 to 20 mass %, and particularly preferably 5 to 15 mass %.

The potassium ion secondary battery positive electrode active material of the present invention comprises the potassium compound mentioned above. The potassium ion secondary battery positive electrode active material of the present invention can consist of the potassium compound of the present invention, and can contain inevitable impurities in addition to the potassium compound of the present invention. Examples of such inevitable impurities include the starting material compounds explained above. The inevitable impurity can be contained in an amount of about 10 mol % or less, preferably about 5 mol % or less, and even more preferably about 2 mol % or less as long as the effect of the present invention is not impaired.

4. Potassium Ion Secondary Battery Positive Electrode and Potassium Ion Secondary Battery In the potassium ion secondary battery positive electrode and the potassium ion secondary battery according to the present invention, the potassium compound represented by general formula (1) or (2) is used as a positive active material, and other basic structures can be formed by referring to known nonaqueous electrolyte lithium ion secondary battery positive electrodes and nonaqueous electrolyte lithium ion secondary batteries. For example, a positive electrode, negative electrode, and separator can be arranged in a battery container in such a manner that the positive electrode is isolated from the negative electrode by the separator. Subsequently, the battery container is filled with a nonaqueous electrolyte solution, and then sealed, thus producing the potassium ion secondary battery of the present invention. The potassium ion secondary battery used in the present invention may be a potassium secondary battery. In this specification, "potassium ion secondary battery" means a secondary battery in which potassium ions are carrier ions, and "potassium secondary battery" means a secondary battery in which potassium metal or potassium alloy is used as a negative electrode active material.

The positive electrode can take a structure in which a positive electrode material containing the potassium compound represented by general formula (1) or (2) is supported on a positive electrode current collector. For example, the positive electrode can be produced by applying a positive electrode mixture containing the potassium compound represented by general formula (1) or (2), a conductive material, and optionally a binder to a positive electrode current collector.

Examples of conductive materials include acetylene black, Ketjenblack, carbon nanotube, vapor-grown carbon fibers, carbon nanofibers, graphite, corks, and like carbon materials. The shape of the conductive material is not limited, and powders, for example, can be used.

Examples of binders include fluororesins, such as polyvinylidene fluoride resin and polytetrafluoroethylene.

The contents of components in the positive electrode material are not limited and can be suitably determined. For example, it is preferable that the potassium compound represented by general formula (1) or (2) is contained in an amount of 50 to 95 vol % (particularly, 70 to 90 vol %), the conductive material is contained in an amount of 2.5 to 25 vol % (particularly, 5 to 15 vol %), and the binder is contained in an amount of 2.5 to 25 vol % (particularly 5 to 15 vol %).

Examples of materials composing the positive electrode current collector include aluminum, platinum, molybdenum, stainless steel, etc. Examples of the shape of the positive electrode current collector include a porous body, foil, plate, mesh formed of fiber, etc.

It is preferable that the application amount of the positive electrode material relative to the positive electrode current collector is suitably determined in accordance with the use etc. of the potassium ion secondary battery.

Examples of negative electrode active materials composing the negative electrode include potassium metal; silicon; silicon-containing Clathrate compounds; potassium alloy; ternary or quaternary oxides represented by $M^1M^2_2O_4$ ($M^1$: Co, Ni, Mn, Sn, etc. $M^2$: Mn, Fe, Zn, etc.); metal oxides represented by $M^3 3O4$ ($M^3$: Fe, Co, Ni, Mn, etc.), $M^4_2O_3$ ($M^4$: Fe, Co, Ni, Mn, etc.), $M_nV_2O_6$, $M^4O_2$ ($M^4$: Sn, Ti, etc.), $M^2O$ ($M^2$: Fe, Co, Ni, Mn, Sn, Cu, etc.), etc.; graphite, hard carbon, soft carbon, graphene; carbon materials mentioned above; Lepidocrocite-type $K_{0.8}Li_{0.2}Ti_{1.67}O_4$; $KC_8$; $KTi_3O_4$; $K_2Ti_6O_{13}$; $K_2Ti_nO_{2n+1}$ (n=3, 4, 6, 8); $K_2SiP_2$; $KSi_2P_3$; $MnSnO_3$; $K_{1.4}Ti_8O_{16}$; $K_{1.5}Ti_{6.5}V_{1.5}O_{16}$; $K_{1.4}Ti_{6.6}Mn_{1.4}O_{16}$; $Zn_3(HCOO)_6$; $Co_3(HCOO)_6$; $Zn_{1.5}Co_{1.5}(HCOO)_6$; $KVMoO_6$; $AV_2O_6$ (A=Mn, Co, and Ni, Cu); $Mn_2GeO_4$; $Ti_2(SO_4)_3$; $KTi_2(PO_4)_3$; $SnO_2$; $Nb_2O_5$; $TiO_2$; Te; $VOMoO_4$; $TiS_2$; $TaS_2$; $MoSe_2$; $SnSe_2$; $SnS_5$; $SnO_2$; $Sb_2O_3$; $NiCo_2S_4$; $Sb_2O_4$; $Ni_3S_2$; $FeS_2$; $Nb_2O_5$; $K_{0.3}MoO_2$; $K_2Ti_3O_7$; $K_2Ti_2O_5$; $Fe_3O_4$; $Fe_2O_3$; $Co_3O_4$; CuO; Sb; Ge; P; $TiO_2$; $KTiO_2$; SnSb; organic-based compounds, such as polyacethylene (PAc), polyanthracene, polyparaphenylene (PPP), 1,4-benzene dicarboxylate(BDC), polyaniline (Pan), polypyrrole (PPy), polythiophene (PTh), tetraethylthiuram disulfide (TETD), poly(2,5-dimercapto-1,3,4-thiadiazole) (PDMcT), poly(2,2'-dithiodianyline) (PDTDA), poly(5,8-dihydro-1H, 4H-2,3,6,7-tetrathia-anthracene) (PDTTA), poly(2,2,6,6-tetramethylpiperidine-1-oxyl-4-yl methacrylate) (PTMA), $K_2C_6H_4O_4$, $K_2C_{10}H_2O_4$, $K_2C_5O_5 \cdot 2H_2O$, $K_4C_8H_2O_6$, $K_2C_6H_4O_4$, $K_2C_{10}H_2O_4$, $K_2C_{14}H_6O_4$, $K_4C_6O_6$, $K_4C_{24}H_8O_8$, $K_4C_6O_6$, $K_2C_6O_6$, $K_2C_6H_2O_4$, $K_2C_{14}H_6O_4$, $K_2C_8H_4O_4$, $K_2C_{14}H_4N_2O_4$, $K_2C_6H_4O_4$, $K_2C_{18}H_{12}O_8$, $K_2C_{16}H_8O_4$, and $K_2C_{10}H_2N_2O_4$; etc. Examples of potassium alloys include alloys containing potassium and aluminum as constituent elements, alloys containing potassium and zinc as constituent elements, alloys containing potassium and manganese as constituent elements, alloys containing potassium and bismuth as constituent components, alloys containing potassium and nickel as constituent elements, alloys containing potassium and antimony as constituent elements, alloys containing potassium and tin as constituent elements, and alloys containing potassium and indium as constituent elements; quaternary layered carbon or nitrogen compounds, such as MXene-based alloys comprising metal (scandium, titanium, vanadium, chromium, zirconium, niobium, molybdenum, hafnium, tantalum, etc.) and carbon as constituent elements, $M^5_xBC_3$-based alloys ($M^5$: scandium, titanium, vanadium, chromium, zirconium, niobium, molybdenum, hafnium, tantalum, etc.), etc.; alloys containing potassium and lead as constituent elements; etc.

The negative electrode can be formed of a negative electrode active material or can take a structure in which a negative electrode material containing a negative electrode active material, a conductive material, and optionally a binder is supported on a negative electrode current collector. When the structure in which a negative electrode material is supported on a negative electrode current collector is taken, a negative electrode mixture containing a negative electrode active material, a conductive material, and optionally a binder is applied to a negative electrode current collector, thus producing a negative electrode.

When a negative electrode is formed of a negative electrode active material, the negative electrode active material mentioned above can be formed into a shape (e.g., plate) that is suitable for the electrode.

When the structure in which a negative electrode material is supported on a negative electrode current collector is used, the types of the conductive material and binder, and the contents of the negative electrode active material, conductive material, and binder, are the same as those mentioned for the positive electrode. Examples of materials composing the negative electrode current collector include aluminum, copper, nickel, stainless steel, etc. Of these, since potassium does not form an alloy with aluminum, a low-cost aluminum negative electrode current collector can be used rather than an expensive copper negative electrode current collector. Examples of the shape of the negative electrode current collector include a porous body, foil, plate, mesh formed of fiber, etc. It is preferable that the application amount of the negative electrode material relative to the negative electrode current collector is suitably determined in accordance with the use etc. of the potassium ion secondary battery.

Any separator can be used as long as the separator is made of a material capable of isolating the positive electrode and the negative electrode in a battery, and retaining an electrolyte solution to ensure ion conductivity between the positive electrode and the negative electrode. Examples of separators include materials in the form of a porous film, non-woven fabric, and woven fabric that are made of polyolefin resin, such as polyethylene, polypropylene, polyimide, polyvinyl alcohol, and terminated amino polyethylene oxide; fluororesin, such as polytetrafluoroethylene; acrylic resin; nylon; aromatic aramid; inorganic glass; ceramics; etc.

Nonaqueous electrolyte solutions preferably contain potassium ions. Examples of such electrolyte solutions include potassium salt solutions, ion liquids formed of a potassium-containing inorganic material, etc.

Examples of potassium salts include potassium inorganic salt compounds, such as potassium halides (e.g., potassium chloride, potassium bromide, and potassium iodide), potassium perchlorate, potassium tetrafluoroborate, potassium hexafluorophosphorate, and potassium hexafluoroarsenate; potassium organic salt compounds, such as potassium bis(trifluoromethylsulfonyl) imide, potassium bis(perfluoroethanesulfony)imide, potassium benzoate, potassium salicylate, potassium phthalate, potassium acetate, potassium propionate, and Grignard reagent; etc.

Examples of solvents include carbonate compounds, such as propylene carbonate, ethylene carbonate, dimethyl carbonate, ethylmethyl carbonate, and diethyl carbonate; lactone compounds such as γ-butyrolactone and γ-valerolactone; ether compounds, such as tetrahydrofuran, 2-methyltetrahydrofuran, diethylether, diisopropyl ether, dibutyl ether, methoxy methane, N,N-dimethylformamide, glyme, N-propyl-N-methyl pyrrolidinium bis(trifluoromethane sulfonyl) imide, dimethoxyethane, dimethoxymethane, diethoxymethane, diethoxyethane, and propyleneglycol dimethyl ether; acetonitrile; etc.

A solid electrolyte can also be used in place of the nonaqueous electrolyte solution. Examples of solid electrolytes include potassium ion conductors, such as $KH_2PO_4$, $KZr_2(PO_4)_3$, $K_9Fe(MoO_4)_6$, $K_4Fe_3(PO_4)_2P_{27}$, and $K_3MnTi(PO_4)_3$.

Because of the use of the potassium compound of the present invention, the potassium ion secondary battery of the present invention ensures higher potential and energy density in an oxidation reduction reaction (charge-discharge reaction), and moreover, it is highly safe (polyanion skeleton) and useful. Accordingly, the potassium ion secondary battery of the present invention is, for example, suitably used in devices that are desired to have a smaller size and higher performance.

EXAMPLES

The present invention is explained in detail below with reference to Examples and Comparative Examples. The present invention is, needless to say, not limited to these.

The following reagents were used in the Examples.
K$_2$CO$_3$ (produced by Rare Metallic Co., Ltd., 99.9% (3N))
FeO (produced by Wako Pure Chemical Industries, Ltd., 99.5%)
FeC$_2$O$_4$.2H$_2$O (produced by Junsei Chemical Co., Ltd., 99.9% (3N))
SiO$_2$ (produced by Kanto Chemical Co., Inc., 99.9% (3N), sedimentary (amorphous))
GeO$_2$ (produced by Kanto Chemical Co., Inc. 99.99% (4N))
TiO$_2$(A) (produced by Rare Metallic, 99.99% (4N))
MnO$_2$ (produced by Rare Metallic, 99.99% (4N))
MnO (produced by Kojundo Chemical Laboratory Co., Ltd., 99.9% (3N))
MnC$_2$O$_4$ (produced by Kojundo Chemical Laboratory Co., Ltd., 99.9% (3N))
CoC$_2$O$_4$ (produced by Kojundo Chemical Laboratory Co., Ltd., 99% (2N))
CoO (produced by Rare Metallic, 99.9% (3N))
NiO (produced by Wako Pure Chemical Industries, Ltd., 99.9% (3N))
Ni(OH)$_2$ (produced by Kojundo Chemical Laboratory Co., Ltd., 99.9% (3N))
CuO (produced by Kojundo Chemical Laboratory Co., Ltd., 99.99% (4N))

Measurement of Powder X-Ray Diffraction (XRD)

X-ray diffraction measurements were used for the identification of samples obtained by synthesis and the collection of structure analysis data. The X-ray diffraction measurement device used was RINT2200 (produced by Rigaku). The X radiation source used was CuKα monochromatized by a monochromator. Data were collected under measurement conditions in which the tube voltage was 50 kV and the tube current was 300 mA. The scanning rate was set so that the intensity was about 10000 counts. Samples used for measurement were sufficiently ground so that uniform particles were obtained. Rietveld analysis was conducted for structure analysis, and JANA-2006 was used as the analyzing program.

Example 1

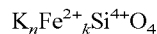

Example 1-1

K$_2$CO$_3$, FeO, and SiO$_2$ were used as starting material powders. Operation was performed in a dry room in order to prevent water absorption of K$_2$CO$_3$.

K$_2$CO$_3$, FeO, and SiO$_2$ were weighed so that the molar ratio of potassium, iron, and silicon was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product (K$_2$Fe$^{2+}$Si$^{4+}$O$_4$) was confirmed by X-ray diffraction.

Example 1-2

K$_2$CO$_3$, SiO$_2$, and FeC$_2$O$_4$.2H$_2$O as starting material powders were weighed so that the molar ratio of potassium, iron, and silicon was 2:1:1, and they were placed in a chromium steel container together with 10 zirconia balls (diameter: 15 mm). Acetone was added, and grinding and mixing were performed with a planetary ball mill (Fritsch; P-6) at 600 rpm for 6 hours. After the acetone was removed under reduced pressure, the collected powder was formed into pellets at 40 MPa, and fired in an Ar flow at 700° C., 800° C., or 850° C. for 2 hours. The heating rate in this case was set to 400° C./h. The cooling rate was 100° C./h until 300° C., followed by natural cooling to room temperature. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction patterns confirmed that the obtained product (K$_2$Fe$^{2+}$Si$^{4+}$O$_4$) was the same as the product obtained in Example 1-1. FIG. 1 shows the results.

Example 1-3

Figure 2:
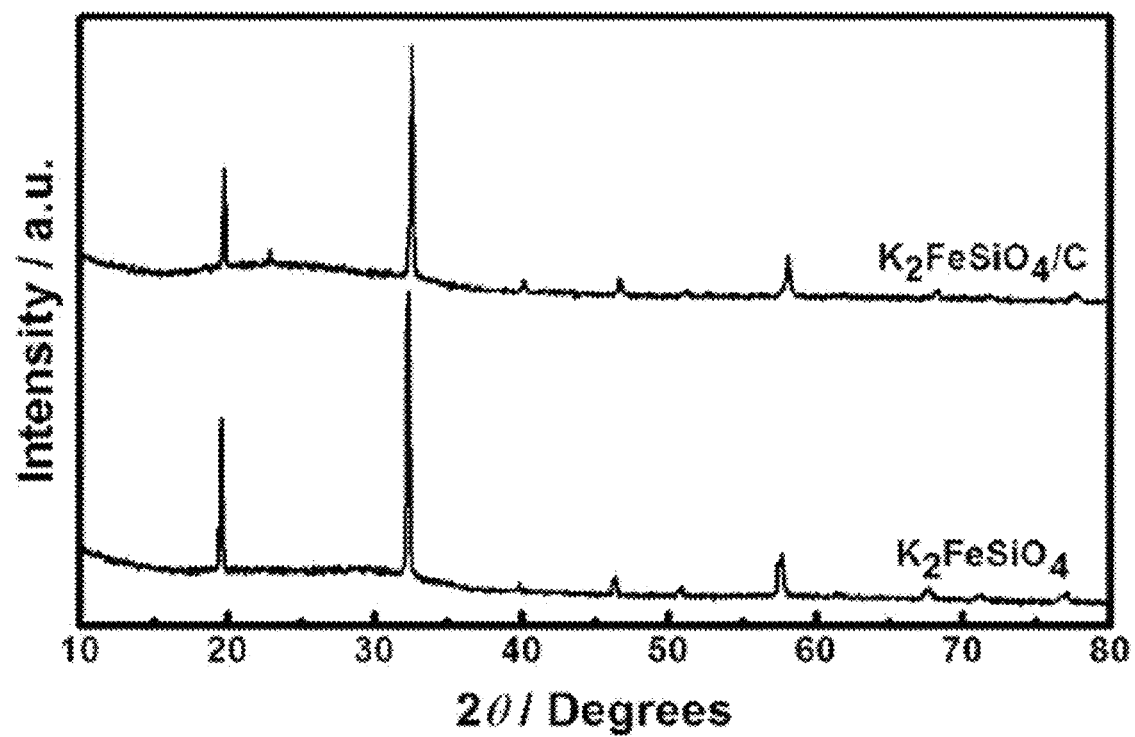
FIG. 2 shows X-ray diffraction patterns of $K_2Fe^{2+}Si^{4+}O_4$ obtained in Example 1-3.

When a target substance is mixed with a carbon material that functions as a conductive material, and the resulting mixture is fired, the target substance and the carbon material spontaneously form a uniform composite, and the carbon material suppresses the grain growth during firing; thus, it is possible to synthesize fine particles having excellent electrode characteristics. K$_2$CO$_3$, SiO$_2$, and FeC$_2$O$_4$.2H$_2$O were weighed so that the molar ratio of potassium, iron, and silicon was 2:1:1. Further, acetylene black was added as a conductive material so that 10% mass ratio of carbon remained in the final product, and the mixture was placed in a chromium steel container together with 10 zirconia balls (diameter: 15 mm). Acetone was added, and grinding and mixing were performed with a planetary ball mill (Fritsch; P-6) at 400 rpm for 24 hours. After the acetone was removed under reduced pressure, the collected powder was formed into pellets by hand pressing, and fired in an Ar flow at 800° C. for 2 hours. The heating rate in this case was set to 400° C./h until 800° C. The cooling rate was 100° C./h until 300° C., followed by natural cooling to room temperature. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction patterns confirmed that the obtained product (K$_2$Fe$^{2+}$Si$^{4+}$O$_4$) was the same as the products obtained in Examples 1-1 and 1-2. FIG. 2 shows the results.

According to the results shown in FIGS. 1 and 2, when the firing temperature was 650° C. or more, multiple main peaks were observed at least at a 2θ value of 19 to 35°. Since these peaks correspond to single-phase K$_2$Fe$^{2+}$Si$^{4+}$O$_4$, it is found that single-phase K$_2$Fe$^{2+}$Si$^{4+}$O$_4$ is obtained as a product. Moreover, the peaks observed at a 2θ value of 30 to 35° are higher at a higher firing temperature; thus, it is found that a higher firing temperature is preferable.

Figure 3:
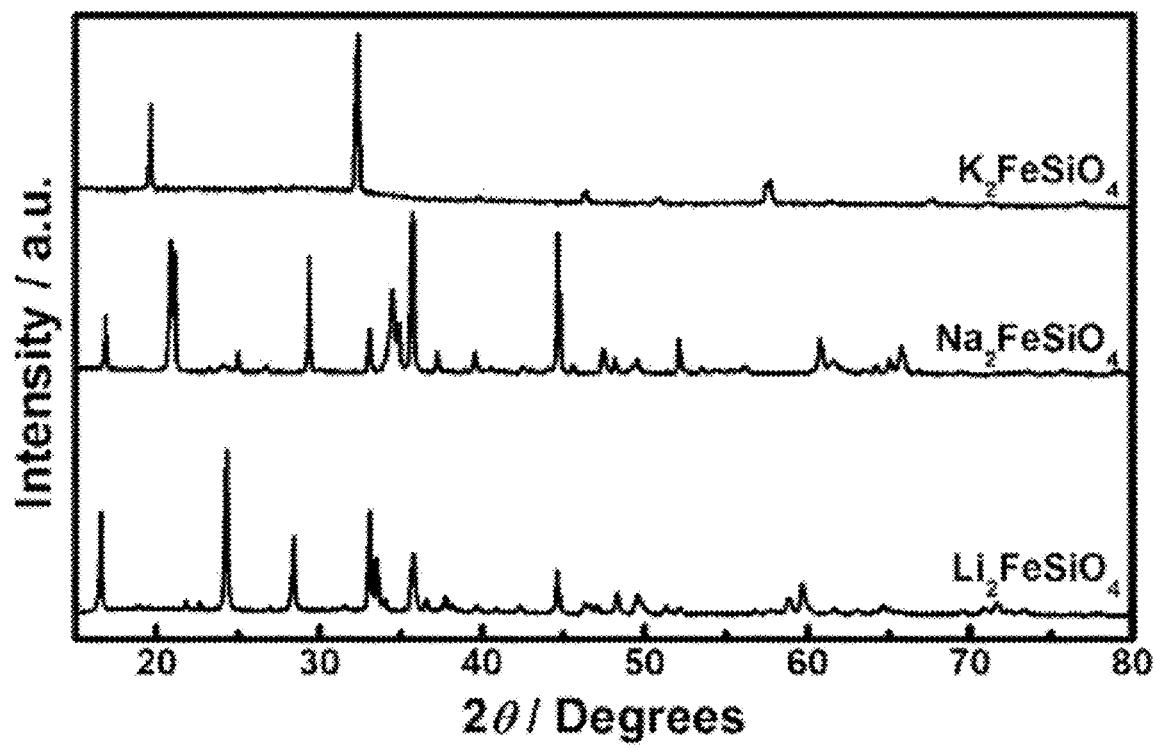
FIG. 3 shows the results of comparing the X-ray diffraction pattern of $K_2Fe^{2+}Si^{4+}O_4$ obtained in Example 1-2 with those of other iron silicate compounds.

FIG. 3 shows the results of comparing K$_2$Fe$^{2+}$Si$^{4+}$O$_4$ obtained in Example 1-2 with other iron silicate compounds (Na$_2$Fe$^{2+}$Si$^{4+}$O$_4$ and Li$_2$Fe$^{2+}$Si$^{4+}$O$_4$). Na$_2$Fe$^{2+}$Si$^{4+}$O$_4$ and Li$_2$Fe$^{2+}$Si$^{4+}$O$_4$ are samples synthesized as in Example 1-2, except that starting material compounds were changed, and firing was performed at 800° C. for 2 hours. As a result, the X-ray diffraction pattern of K$_2$Fe$^{2+}$Si$^{4+}$O$_4$ is clearly different from those of the other iron silicate compounds (Na$_2$Fe$^{2+}$Si$^{4+}$O$_4$ and Li$_2$Fe$^{2+}$Si$^{4+}$O$_4$); thus, it can be understood that a new crystal phase is formed.

Figure 4:
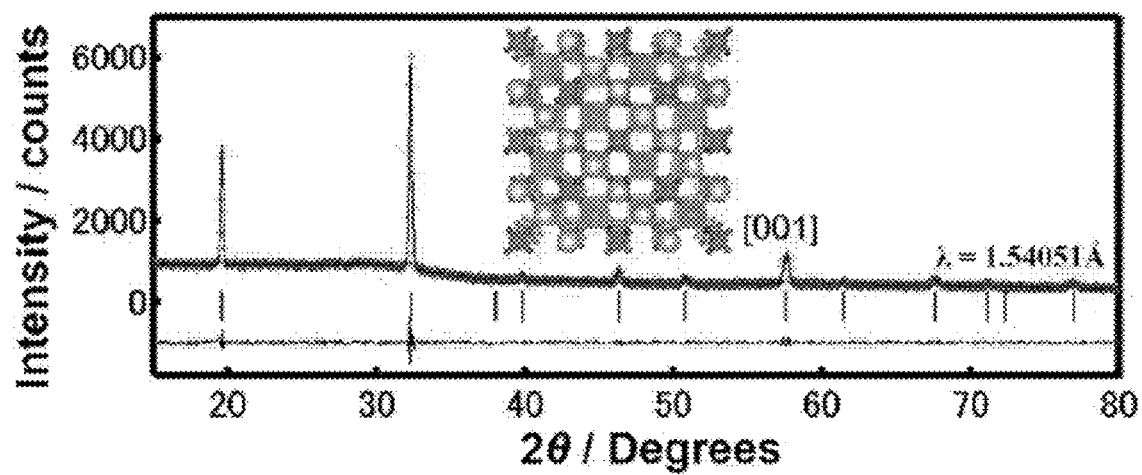
FIG. 4 shows X-ray diffraction patterns of $K_2Fe^{2+}Si^{4+}O_4$ obtained in Example 1-2 determined by powder X-ray diffraction.
Figure 7:
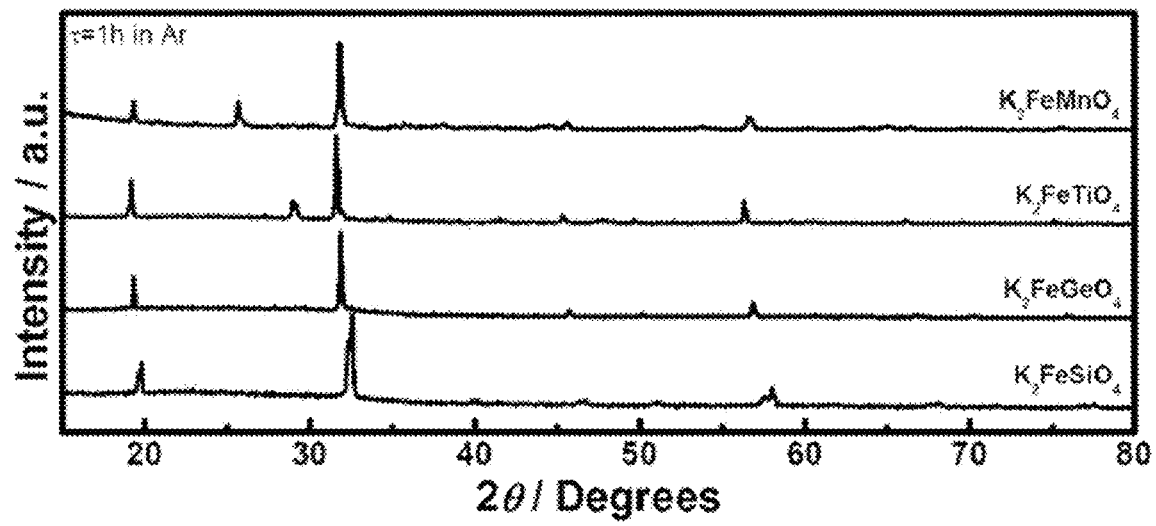
FIG. 7 shows X-ray diffraction patterns of $K_2Fe^{2+}Si^{4+}O_4$ obtained in Example 1-2, $K_2Fe^{2+}Ge^{4+}O_4$ obtained in Example 2-1, $K_2Fe^{2+}Ti^{4+}O_4$ obtained in Example 3-1, and $K_2Fe^{2+}Mn^{4+}O_4$ obtained in Example 4-1.
Figure 8:
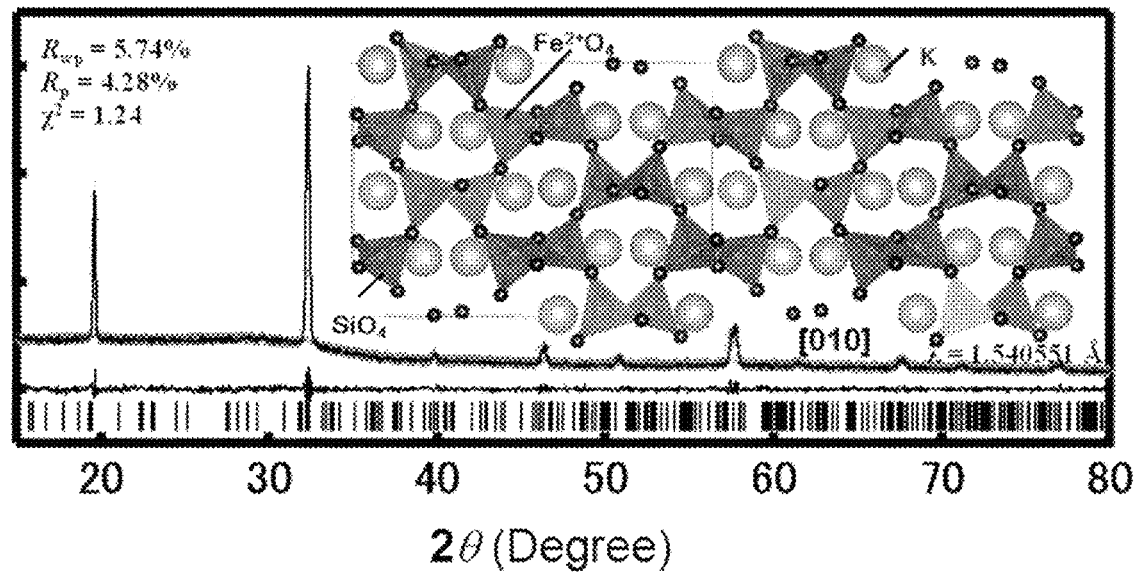
FIG. 8 shows a Rietveld X-ray diffraction pattern of $K_2Fe^{2+}Si^{4+}O_4$ obtained in Example 1-2.
Figure 9:
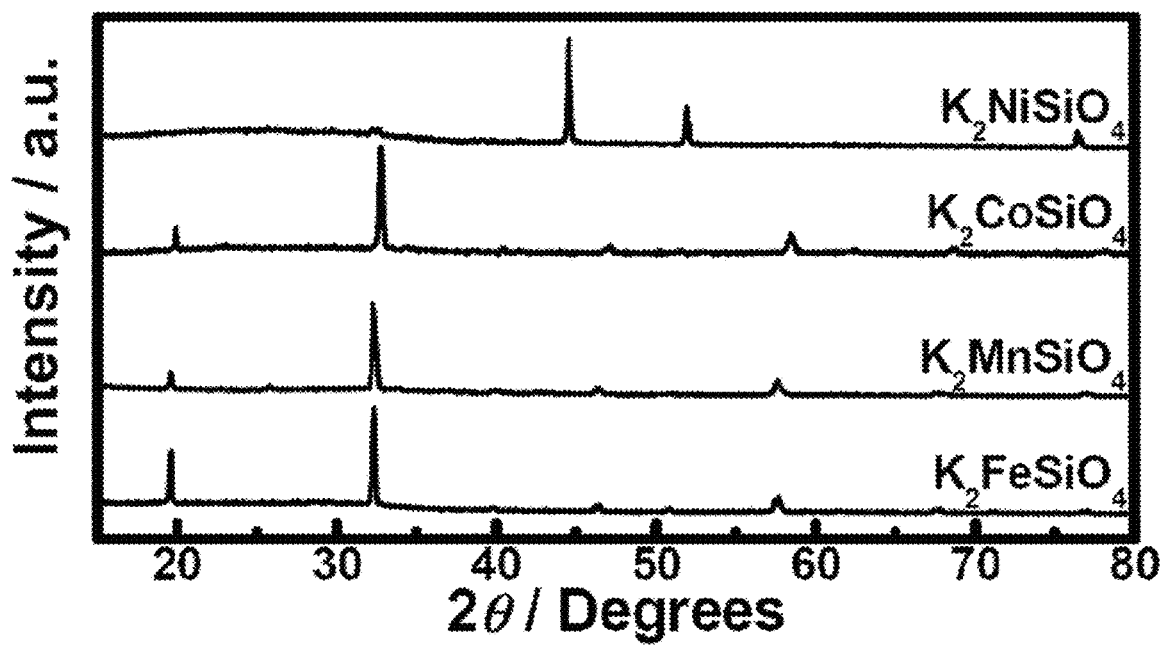
FIG. 9 shows X-ray diffraction patterns of $K_2Fe^{2+}Si^{4+}O_4$ obtained in Example 1-2, $K_2Co^{2+}Si^{4+}O_4$ obtained in Example 5-1, $K_2Ni^{2+}Si^{4+}O_4$ obtained in Example 8-2, and $K_2Mn^{2+}Si^{4+}O_4$ obtained in Example 10-1.
Figure 10:
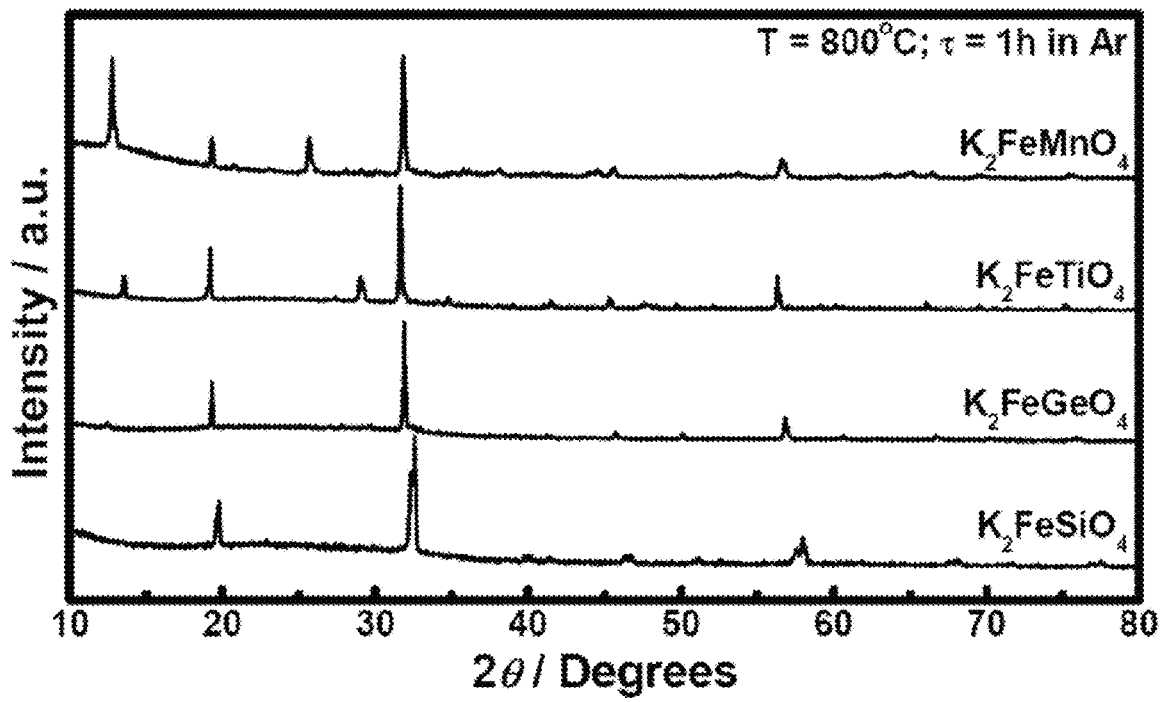
FIG. 10 shows X-ray diffraction patterns of $K_2Fe^{2+}Si^{4+}O_4$ obtained in Example 1-2, $K_2Fe^{2+}Ge^{4+}O_4$ obtained in Example 2-1, $K_2Fe^{2+}Ti^{4+}O_4$ obtained in Example 3-1, and $K_2Fe^{2+}Mn^{4+}O_4$ obtained in Example 4-3.

Moreover, FIGS. 4 and 7 show the X-ray diffraction patterns of K$_2$Fe$^{2+}$Si$^{4+}$O$_4$ obtained in Example 1-2 determined by powder X-ray diffraction. The results reveal that the crystals of the obtained $K_2Fe^{2+}Si^{4+}O_4$ have the strongest peak at a diffraction angle, represented by 2θ, of 31.5 to 33.0°, and further have peaks at a diffraction angle of 19.0 to 20.3°, 39.3 to 40.4°, 45.5 to 47.2°, 48.2 to 49.0°, 50.4 to 51.6°, 53.3 to 53.8°, 57.0 to 58.4°, 57.9 to 58.8°, 61.0 to 62.1°, 66.7 to 68.7°, and 76.4 to 77.9°. These results reveal that the crystals of the obtained $K_2Fe^{2+}Si^{4+}O_4$ have a cubic structure (space group Fd-3 m), that the lattice constants are a=b=c=7.8297(6)Å and α=β=γ=90°, and that the unit lattice volume (V) is 480.01(3)Å$^3$. The reliability factors were as follows: $R_{wp}$=4.09%, $R_p$=3.01%, $\chi^2$=1.24. FIGS. 8 to 10 show the results of confirming the obtained product ($K_2Fe^{2+}Si^{4+}O_4$) in more detail using Rietveld X-ray diffraction patterns. The results confirmed that the obtained $K_2Fe^{2+}Si^{4+}O_4$ had an orthorhombic structure (space group Pca2$_1$ S.G), and that the lattice constants were as follows: a=11.1023 (19)Å, b=5.5338(4)Å, c=15.7469(29)Å, and V=967.4(2)Å$^3$. Thus, it can be understood that the obtained sample has an orthorhombic structure.

Figure 5:
FIG. 5 shows an SEM image of $K_2Fe^{2+}Si^{4+}O_4$ obtained in Example 1-2.
Figure 11:
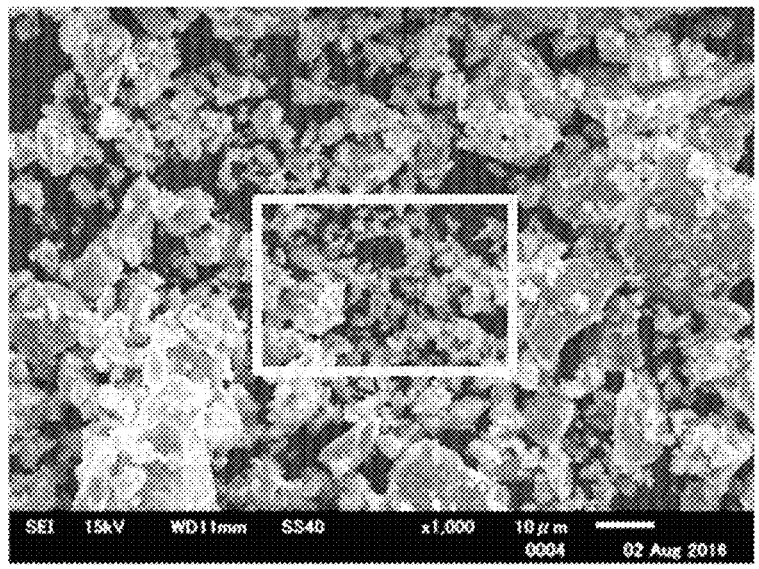
FIG. 11 shows SEM images of $K_2Fe^{2+}Si^{4+}O_4$ obtained in Example 1-2.
Figure 11:
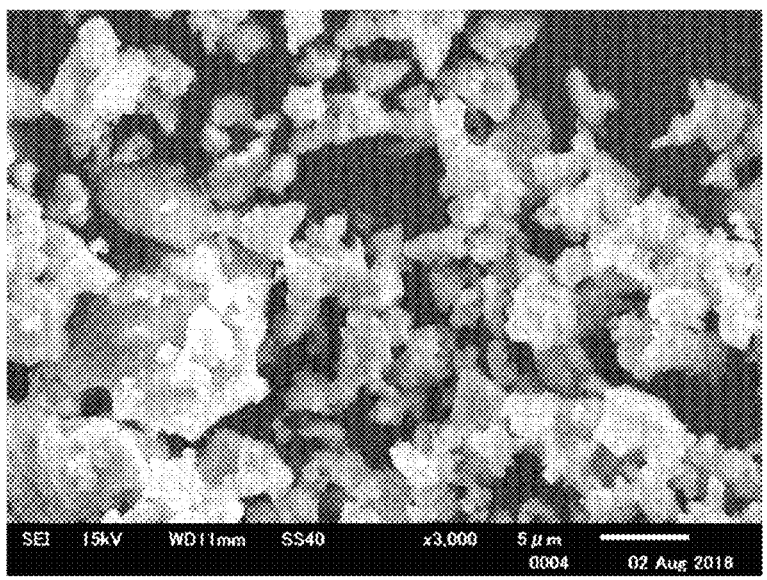
Figure 12:
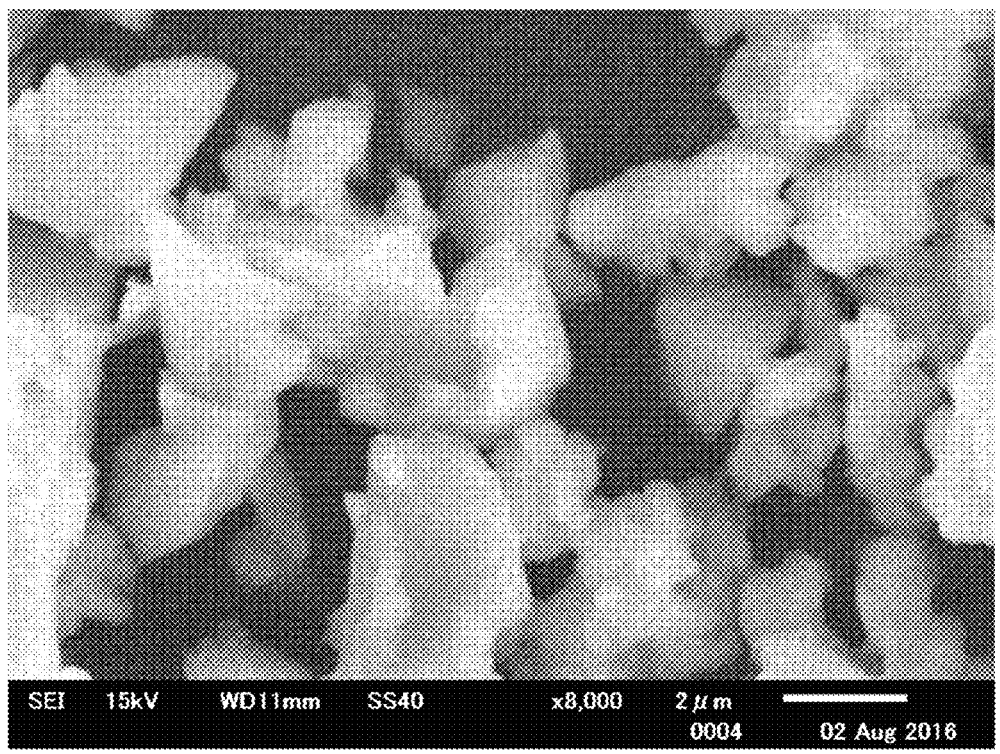
FIG. 12 shows a high-resolution SEM image of $K_2Fe^{2+}Si^{4+}O_4$ obtained in Example 1-2.
Figure 13:
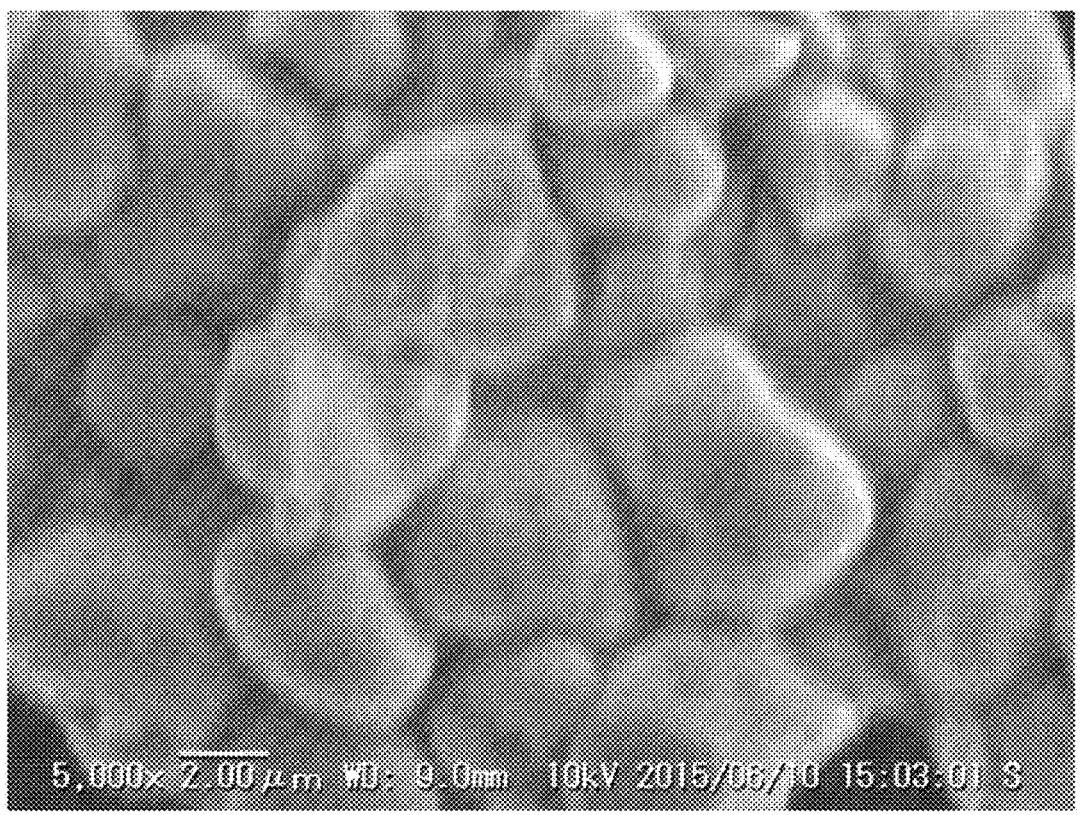
FIG. 13 shows a high-resolution SEM image of $K_2Fe^{2+}Si^{4+}O_4$ obtained in Example 1-2.

Further, $K_2Fe^{2+}Si^{4+}O_4$ obtained in Example 1-2 was observed using a scanning electron microscope. FIG. 5 shows the results. In FIG. 5, the scale bar represents 0.5 µm. The results shown in FIG. 5 reveal that $K_2Fe^{2+}Si^{4+}O_4$ having a particle diameter of around 20 µm was obtained. Further, $K_2Fe^{2+}Si^{4+}O_4$ obtained in Example 1-2 was observed using a scanning electron microscope and a high-resolution scanning electron microscope. FIGS. 11 to 13 show the results. The results shown in FIGS. 11 to 13 reveal that $K_2Fe^{2+}Si^{4+}O_4$ having a particle diameter of around 5 µm was obtained.

Figure 6:
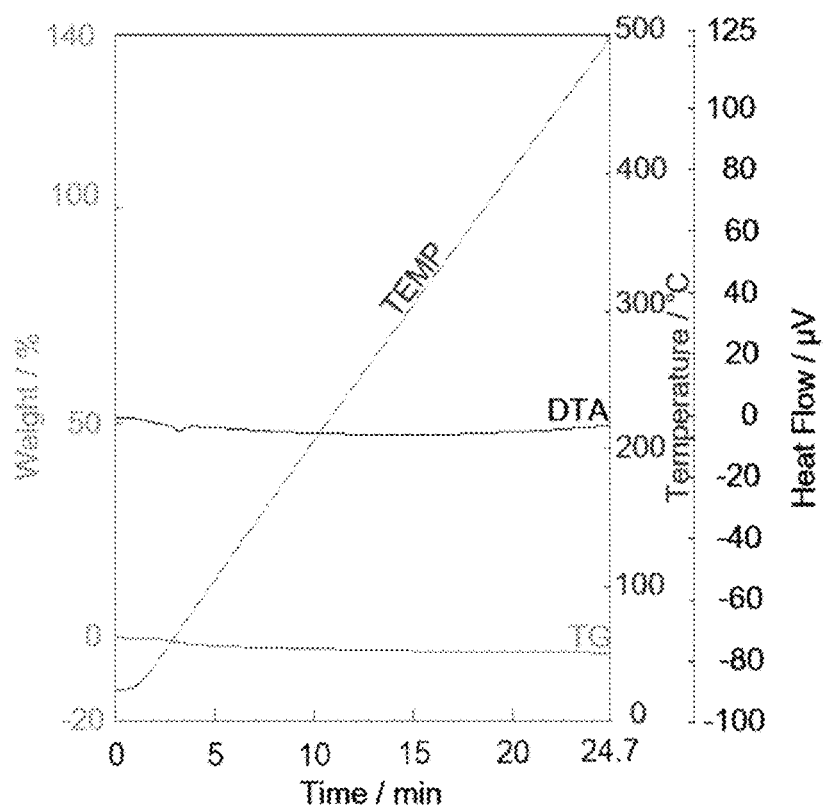
FIG. 6 shows the results of thermal stability measurement by TG-DTA of $K_2Fe^{2+}Si^{4+}O_4$ obtained in Example 1-2.

Moreover, the thermal stability measurement of $K_2Fe^{2+}Si^{4+}O_4$ obtained in Example 1-2 was performed using TG-DTA. FIG. 6 shows the results. As a result, the obtained $K_2Fe^{2+}Si^{4+}O_4$ was stable in a wide temperature range (a temperature range up to 500° C.). A battery having high-level thermal stability can be constructed using this material as a battery material.

Figure 14:
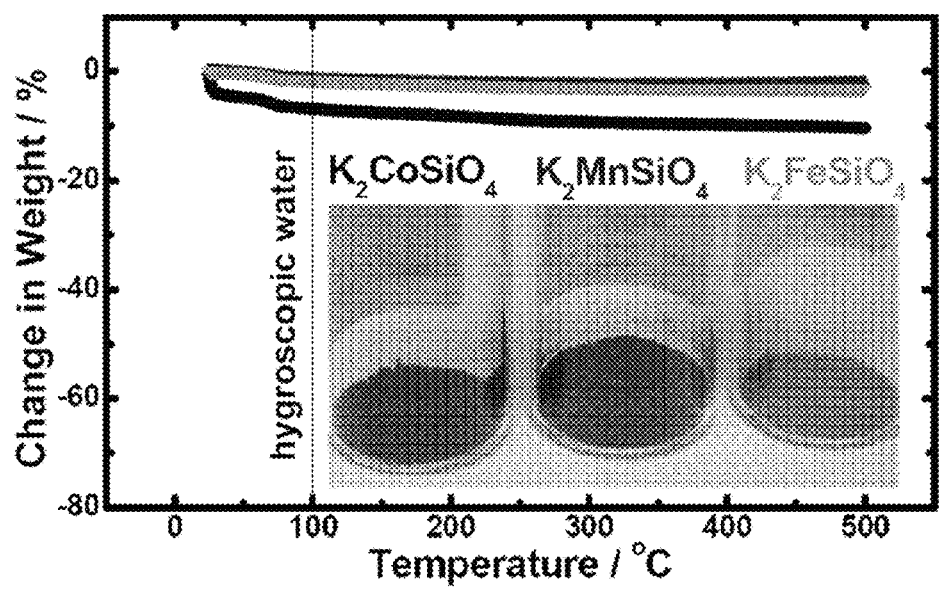
FIG. 14 shows the thermal stability and color tone after heating of $K_2Fe^{2+}Si^{4+}O_4$ obtained in Example 1-2, $K_2Co^{2+}Si^{4+}O_4$ obtained in Example 5-1, and $K_2Mn^{2+}Si^{4+}O_4$ obtained in Example 10-1. $K_2Mn^{2+}Si^{4+}O_4$ (purple crystals), $K_2Fe^{2+}Si^{4+}O_4$ (yellowish-brown crystals), and $K_2Co^{2+}Si^{4+}O_4$ (dark green crystals) are shown in ascending order of weight loss.

Further, $K_2Fe^{2+}Si^{4+}O_4$ obtained in Example 1-2 was gradually heated, and the thermal stability and color tone were observed. FIG. 14 shows the results. As a result, it can be understood that the thermal stability of $K_2Fe^{2+}Si^{4+}O_4$ was superior to that of $K_2Co^{2+}Si^{4+}O_4$.

Example 2

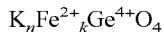
$K_nFe^{2+}{}_kGe^{4+}O_4$

Example 2-1

$K_2CO_3$, $FeC_2O_4 \cdot 2H_2O$, and $GeO_2$ were used as starting material powders. Operation was performed in a dry room in order to prevent the water absorption of $K_2CO_3$.

$K_2CO_3$, $FeC_2O_4 \cdot 2H_2O$, and $GeO_2$ (produced by Kanto Chemical Co., Inc., 99.99% (4 N)) were weighed so that the molar ratio of potassium, iron, and germanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Fe^{2+}Ge^{4+}O_4$) was confirmed by X-ray diffraction.

Example 2-2

$K_2CO_3$, FeO, and $GeO_2$ were used as starting material powders. Operation was performed in a dry room in order to prevent the water absorption of $K_2CO_3$.

$K_2CO_3$, FeO, and $GeO_2$ were weighed so that the molar ratio of potassium, iron, and germanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction pattern confirmed that the obtained product ($K_2Fe^{2+}Ge^{4+}O_4$) was the same as the product obtained in Example 2-1.

FIG. 7 shows the X-ray diffraction pattern of $K_2Fe^{2+}Ge^{4+}O_4$ obtained in Example 2-1. The results of FIG. 7 reveal that the crystals of the obtained $K_2Fe^{2+}Ge^{4+}O_4$ have the strongest peak at a diffraction angle, represented by 2θ, of 31.2 to 33.9° in the X-ray diffraction pattern determined by powder X-ray diffraction, and further have peaks at a diffraction angle of 18.5 to 20.1°, 36.2 to 40.2°, 40.8 to 43.6°, 45.1 to 46.7°, 49.5 to 50.9°, 56.0 to 58.2°, 59.9 to 61.7°, 65.9 to 68.3°, 69.8 to 71.2°, and 75.0 to 77.4°. These results reveal that the crystals of the obtained $K_2Fe^{2+}Ge^{4+}O_4$ have an orthorhombic structure, that the lattice constants are a=3.951 Å, b=7.167 Å, c=11.918 Å, and α=β=γ=90°, and that the unit lattice volume (V) is 337.5 Å$^3$.

The product ($K_2Fe^{2+}Ge^{4+}O_4$) obtained in Example 2-1 was confirmed by X-ray diffraction patterns. FIG. 10 shows the results. The results confirmed that the same results as FIG. 7 were obtained.

Figure 15:
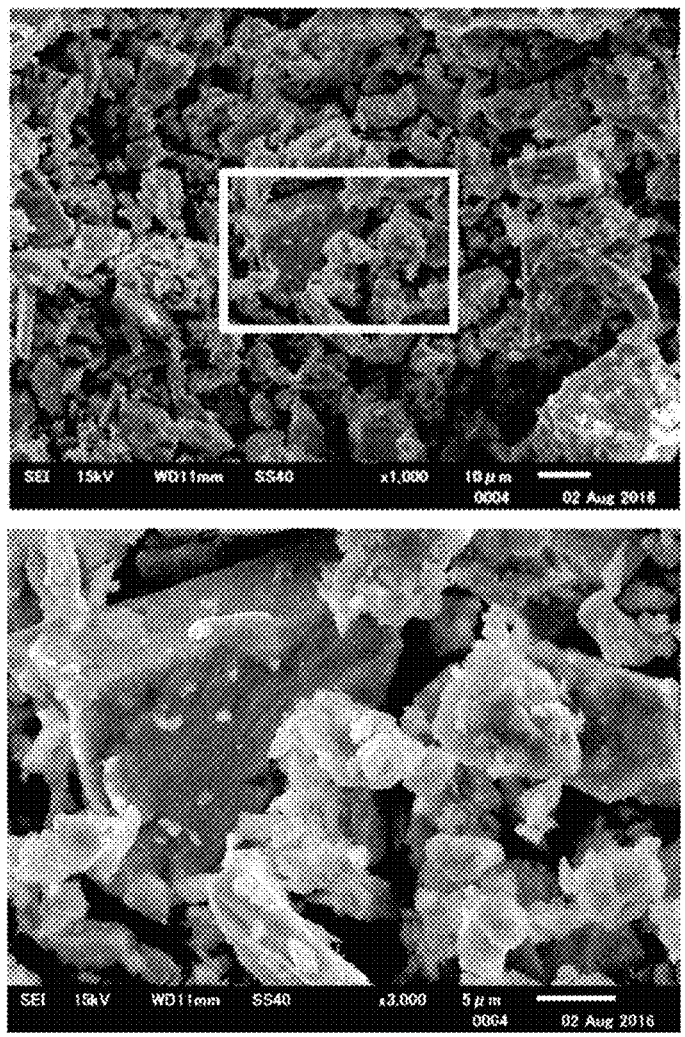
FIG. 15 shows SEM images of $K_2Fe^{2+}Ge^{4+}O_4$ obtained in Example 2-1.
Figure 16:
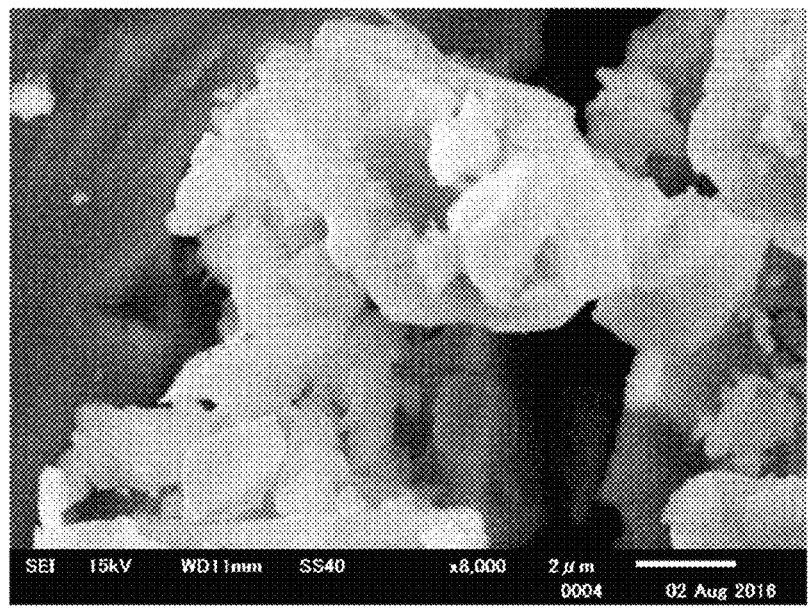
FIG. 16 shows a high-resolution SEM image of $K_2Fe^{2+}Ge^{4+}O_4$ obtained in Example 2-1.

$K_2Fe^{2+}Ge^{4+}O_4$ obtained in Example 2-1 was observed using a scanning electron microscope and a high-resolution scanning electron microscope. FIGS. 15 and 16 show the results. The results shown in FIGS. 15 and 16 reveal that $K_2Fe^{2+}Ge^{4+}O_4$ having a particle diameter of around 7 µm was obtained.

Example 3

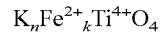
$K_nFe^{2+}{}_kTi^{4+}O_4$

Example 3-1

$K_2CO_3$, $FeC_2O_4 \cdot 2H_2O$, and $TiO_2$ (A) were used as starting material powders. Operation was performed in a dry room in order to prevent the water absorption of $K_2CO_3$.

$K_2CO_3$, $FeC_2O_4 \cdot 2H_2O$, and $TiO_2$ (A) were weighed so that the molar ratio of potassium, iron, and titanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Fe^{2+}Ti^{4+}O_4$) was confirmed by X-ray diffraction.

FIG. 7 shows the X-ray diffraction pattern of $K_2Fe^{2+}Ti^{4+}O_4$ obtained in Example 3-1. The results of FIG. 7 reveal that the crystals of the obtained $K_2Fe^{2+}Ti^{4+}O_4$ have the strongest peak at a diffraction angle, represented by 2θ, of 31.0 to 33.0° in the X-ray diffraction pattern determined by powder X-ray diffraction, and further have peaks at a diffraction angle of 18.5 to 20.2°, 28.3 to 30.0°, 34.0 to 35.6°, 38.7 to 40.0°, 40.5 to 42.7°, 44.7 to 46.1°, 49.0 to 50.6°, 55.7 to 57.4°, 59.5 to 60.9°, 65.2 to 67.2°, 68.9 to 70.4°, and 74.2 to 76.2°. These results reveal that the crystals of the obtained $K_2Fe^{2+}Ti^{4+}O_4$ have an orthorhombic structure (space group Fddd), that the lattice constants are a=6.979 Å, b=7.989 Å, c=11.918 Å, and α=β=γ=90°, and that the unit lattice volume (V) is 337.5 Å$^3$.

Example 3-2

$K_2CO_3$, FeO, and $TiO_2$(A) were used as starting material powders. Operation was performed in a dry room in order to prevent the water absorption of $K_2CO_3$.

$K_2CO_3$, FeO, and $TiO_2$(A) were weighed so that the molar ratio of potassium, iron, and titanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction pattern confirmed that the obtained product ($K_2Fe^{2+}Ti^{4+}O_4$) was the same as the product obtained in Example 3-1.

The product ($K_2Fe^{2+}Ti^{4+}O_4$) obtained in Example 3-1 was confirmed by X-ray diffraction pattern. FIG. 10 shows the results. As a result, it was confirmed that the same results as FIG. 7 were obtained.

Figure 17:
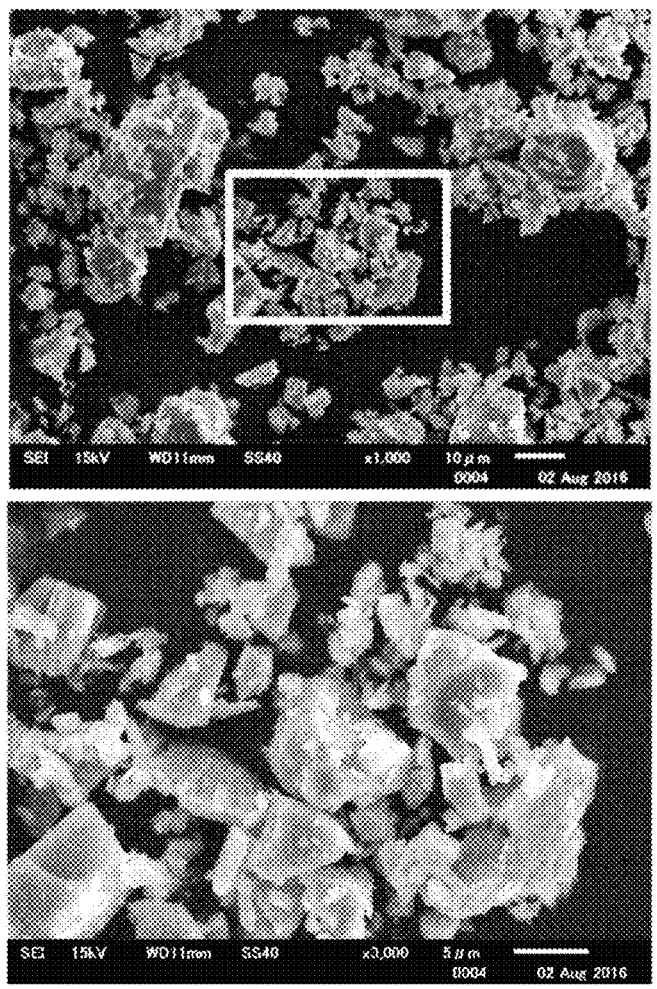
FIG. 17 shows SEM images of $K_2Fe^{2+}Ti^{4+}O_4$ obtained in Example 3-1.
Figure 18:
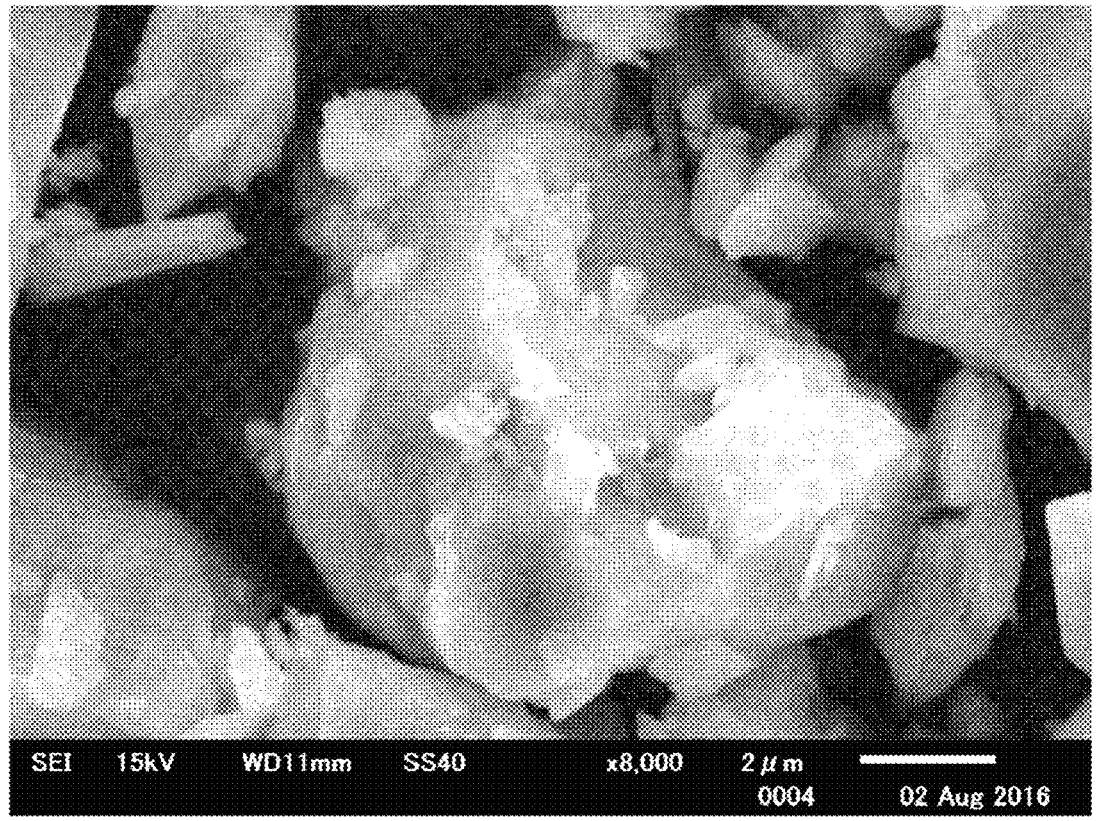
FIG. 18 shows a high-resolution SEM image of $K_2Fe^{2+}Ti^{4+}O_4$ obtained in Example 3-1.

$K_2Fe^{2+}Ti^{4+}O_4$ obtained in Example 3-1 was observed using a scanning electron microscope and a high-resolution scanning electron microscope. FIGS. 17 and 18 show the results. The results shown in FIGS. 17 and 18 reveal that $K_2Fe^{2+}Ti^{4+}O_4$ having a particle diameter of around 7 μm was obtained.

Example 4

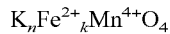
$K_nFe^{2+}{}_kMn^{4+}O_4$

Example 4-1

$K_2CO_3$, $FeC_2O_4 \cdot 2H_2O$, and $MnO_2$ were used as starting material powders. Operation was performed in a dry room in order to prevent the water absorption of $K_2CO_3$.

$K_2CO_3$, $FeC_2O_4 \cdot 2H_2O$, and $MnO_2$ were weighed so that the molar ratio of potassium, iron, and manganese was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Fe^{2+}Mn^{4+}O_4$) was confirmed by X-ray diffraction.

FIG. 7 shows the X-ray diffraction pattern of $K_2Fe^{2+}Mn^{4+}O_4$ obtained in Example 4-1. The results of FIG. 7 reveal that the crystals of the obtained $K_2Fe^{2+}Mn^{4+}O_4$ have the strongest peak at a diffraction angle, represented by 2θ, of 30.8 to 33.9° in the X-ray diffraction pattern determined by powder X-ray diffraction, and further have peaks at a diffraction angle of 18.4 to 21.5°, 24.8 to 27.1°, 35.1 to 37.2°, 37.6 to 39.5°, 43.5 to 46.6°, 55.2 to 58.3°, 63.0 to 67.4°, 68.7 to 72.2°, and 74.5 to 77.4°. These results reveal that the crystals of the obtained $K_2Fe^{2+}Mn^{4+}O_4$ have an orthorhombic structure, that the lattice constants are a=4.806 Å, b=4.609 Å, c=6.945 Å, and α=β=γ=90°, and that the unit lattice volume (V) is 153.8 Å$^3$.

Example 4-2

$K_2CO_3$, FeO, and $MnO_2$ were used as starting material powders. Operation was performed in a dry room in order to prevent the water absorption of $K_2CO_3$.

$K_2CO_3$, FeO, and $MnO_2$ were weighed so that the molar ratio of potassium, iron, and manganese was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction pattern confirmed that the obtained product ($K_2Fe^{2+}Mn^{4+}O_4$) was the same as the product obtained in Example 4-1.

Example 4-3

$K_2CO_3$, $FeC_2O_4 \cdot 2H_2O$, and $MnO_2$ were used as starting material powders. Operation was performed in a dry room in order to prevent the water absorption of $K_2CO_3$.

Figure 19:
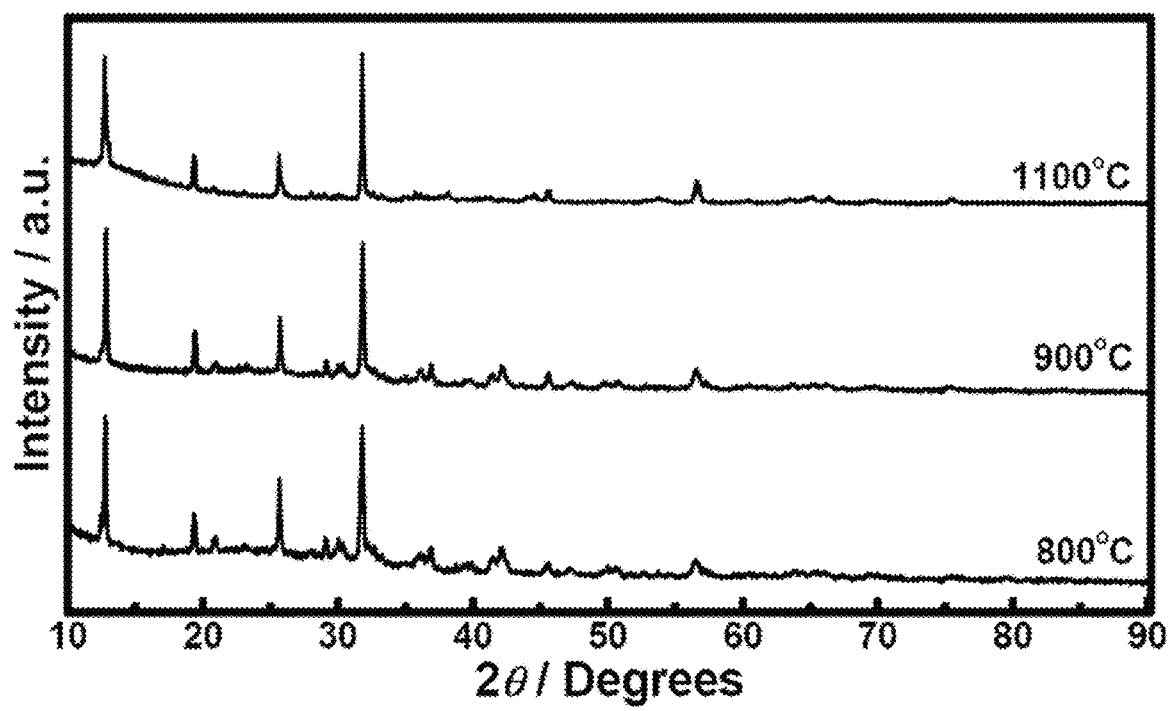
FIG. 19 shows X-ray diffraction patterns of $K_2Fe^{2+}Mn^{4+}O_4$ obtained in Example 4-3.

$K_2CO_3$, $FeC_2O_4 \cdot 2H_2O$, and $MnO_2$ were weighed so that the molar ratio of potassium, iron, and manganese was 2:1:1, and mixed in an agate mortar for about 30 minutes. The mixture was formed into pellets, and fired in an electric furnace in argon at 800 to 1100° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Fe^{2+}Mn^{4+}O_4$) was confirmed by X-ray diffraction. FIG. 19 shows the results. The results reveal that the same crystals as those of Examples 4-1 and 4-2 were obtained at any temperature.

Figure 20:
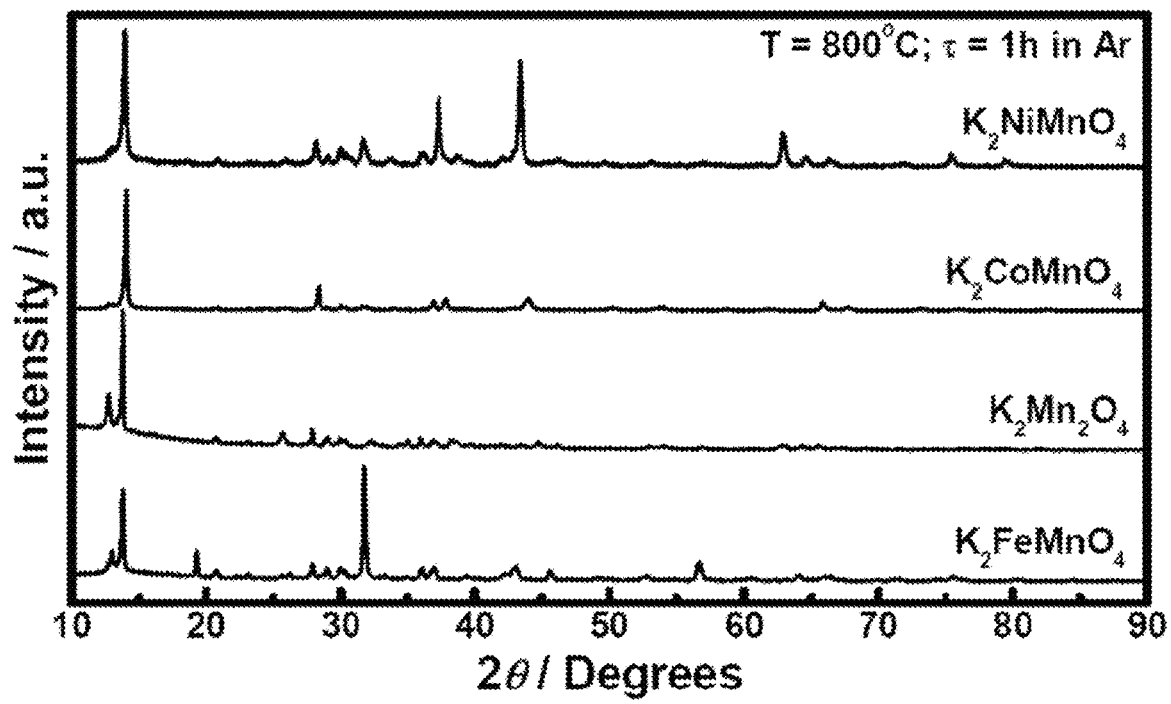
FIG. 20 show X-ray diffraction patterns (800° C.) of $K_2Fe^{2+}Mn^{4+}O_4$ obtained in Example 4-3, $K_2Mn^{2+}Mn^{4+}O_4$ obtained in Example 13, $K_2Ni^{2+}Mn^{4+}O_4$ obtained in Example 14-1, and $K_2Co^{2+}Mn^{4+}O_4$ obtained in Example 15-1.
Figure 21:
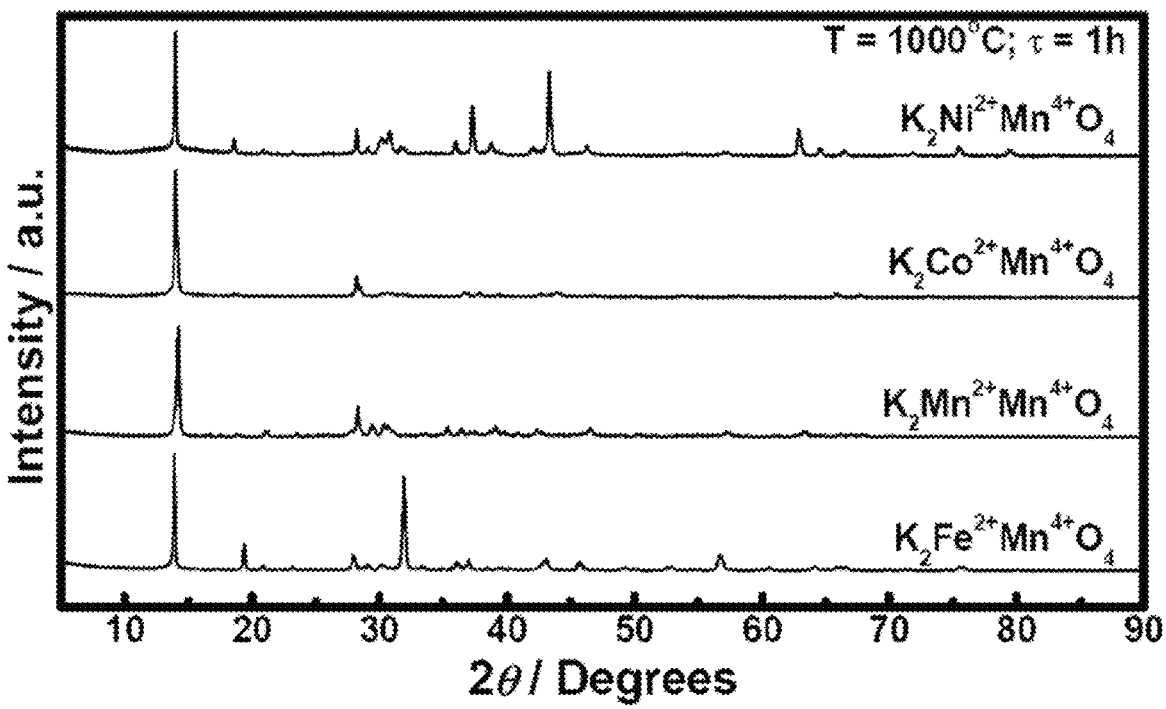
FIG. 21 shows X-ray diffraction patterns (1000° C.) of $K_2Fe^{2+}Mn^{4+}O_4$ obtained in Example 4-3, $K_2Mn^{2+}Mn^{4+}O_4$ obtained in Example 13, $K_2Ni^{2+}Mn^{4+}O_4$ obtained in Example 14-1, and $K_2Co^{2+}Mn^{4+}O_4$ obtained in Example 15-1.

The product ($K_2Fe^{2+}Mn^{4+}O_4$) obtained by firing at 800° C. or 1000° C. was confirmed by X-ray diffraction patterns. FIGS. 10, 20, and 21 show the results. The results confirmed that the obtained $K_2Fe^{2+}Mn^{4+}O_4$ was the same crystals as those of Examples 4-1 and 4-2.

Figure 22:
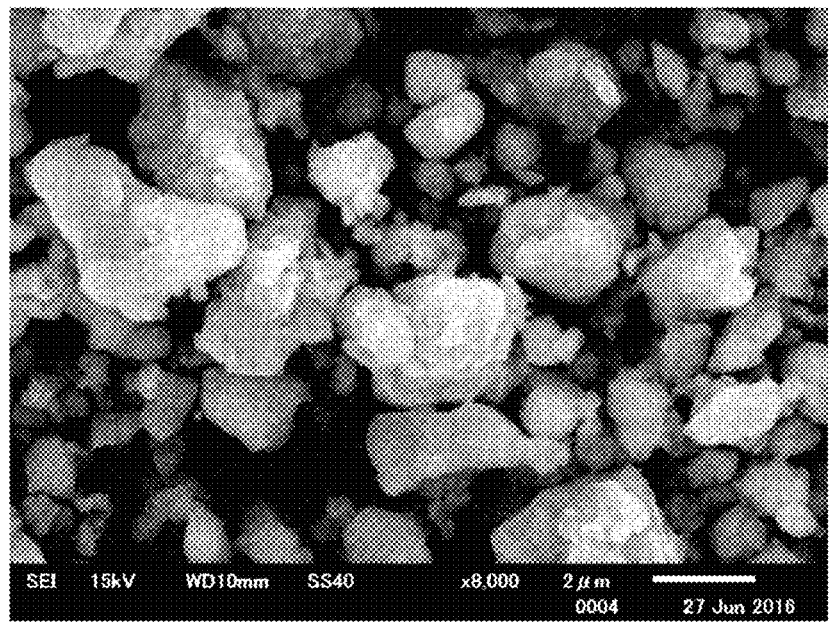
FIG. 22 shows an SEM image of $K_2Fe^{2+}Mn^{4+}O_4$ obtained in Example 4-3.

$K_2Fe^{2+}Mn^{4+}O_4$ obtained in Example 4-3 was observed using a scanning electron microscope. FIG. 22 shows the results. The results shown in FIG. 22 reveal that $K_2Fe^{2+}Mn^{4+}O_4$ having a particle diameter of around 3 μm was obtained.

Figure 23:
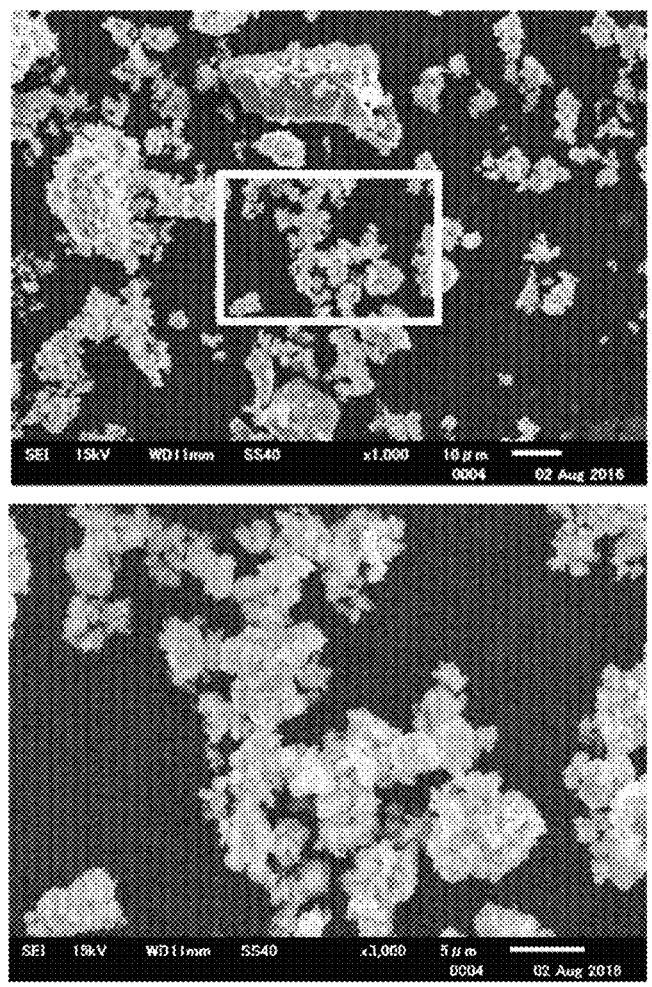
FIG. 23 shows SEM images of $K_2Fe^{2+}Mn^{4+}O_4$ obtained in Example 4-1.
Figure 24:
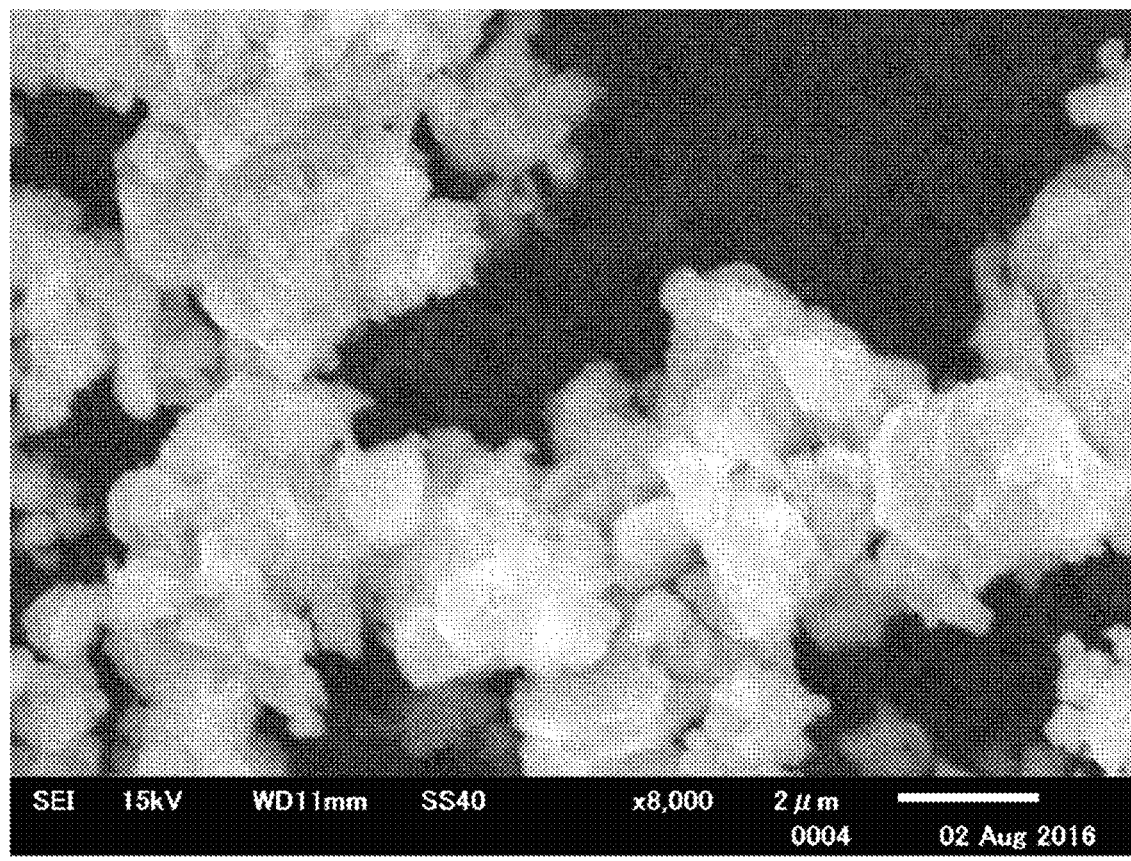
FIG. 24 shows a high-resolution SEM image of $K_2Fe^{2+}Mn^{4+}O_4$ obtained in Example 4-1.

$K_2Fe^{2+}Mn^{4+}O_4$ obtained in Example 4-1 was observed using a scanning electron microscope and a high-resolution scanning electron microscope. FIGS. 23 and 24 show the results. The results shown in FIGS. 23 and 24 reveal that $K_2Fe^{2+}Mn^{4+}O_4$ having a particle diameter of around 3 μm was obtained.

Example 5

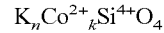
$K_nCo^{2+}{}_kSi^{4+}O_4$

Example 5-1

$K_2CO_3$, $CoC_2O_4$, and $SiO_2$ were used as starting material powders. Operation was performed in a dry room in order to prevent the water absorption of $K_2CO_3$.

Figure 25:
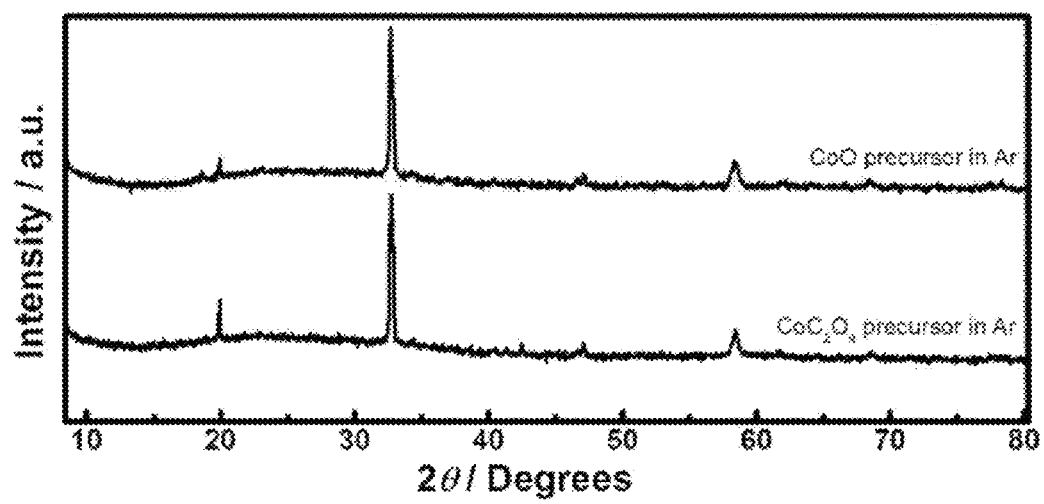
FIG. 25 shows X-ray diffraction patterns of $K_2Co^{2+}Si^{4+}O_4$ obtained in Examples 5-1 and 5-2.

$K_2CO_3$, $CoC_2O_4$, and $SiO_2$ were weighed so that the molar ratio of potassium, cobalt, and silicon was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Co^{2+}Si^{4+}O_4$) was confirmed by X-ray diffraction. FIG. 25 shows the results.

Figure 28:
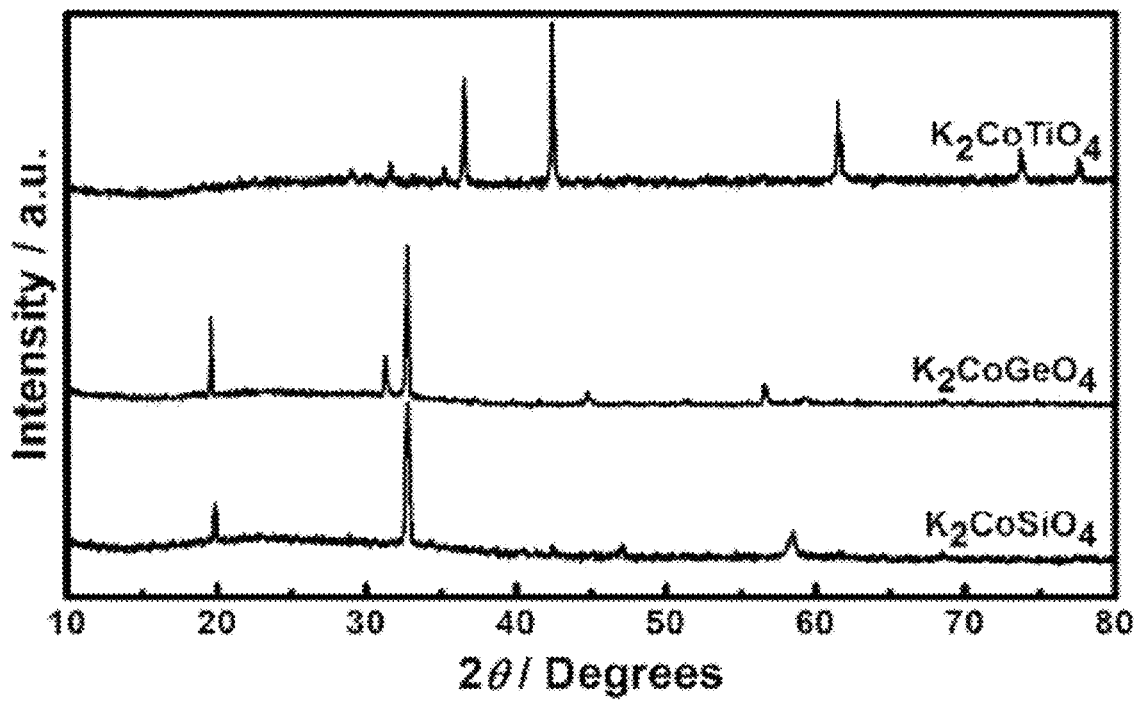
FIG. 28 shows X-ray diffraction patterns of $K_2Co^{2+}Si^{4+}O_4$ obtained in Example 5-1, $K_2Co^{2+}Ge^{4+}O_4$ obtained in Example 6-1, and $K_2Co^{2+}Ti^{4+}O_4$ obtained in Example 7-1.

FIGS. 9, 25, and 28 show the X-ray diffraction patterns of $K_2Co^{2+}Si^{4+}O_4$ obtained in Example 5-1. The results shown in FIGS. 25 and 28 reveal that the crystals of the obtained $K_2Co^{2+}Si^{4+}O_4$ have the strongest peak at a diffraction angle, represented by $2\theta$, of 32.1 to 33.6° in the X-ray diffraction patterns determined by powder X-ray diffraction, and further have peaks at a diffraction angle of 19.4 to 20.6°, 39.7 to 41.1°, 46.0 to 47.7°, 50.9 to 52.4°, 57.8 to 58.3°, 67.9 to 69.5°, and 77.2 to 79.0°. These results reveal that the crystals of the obtained $K_2CoSiO_4$ have an orthorhombic structure (space group Fd-3m), that the lattice constants are a=b=c=7.735 Å and $\alpha=\beta=\gamma=90°$, and that the unit lattice volume (V) is 462.8 Å$^3$.

Figure 26:
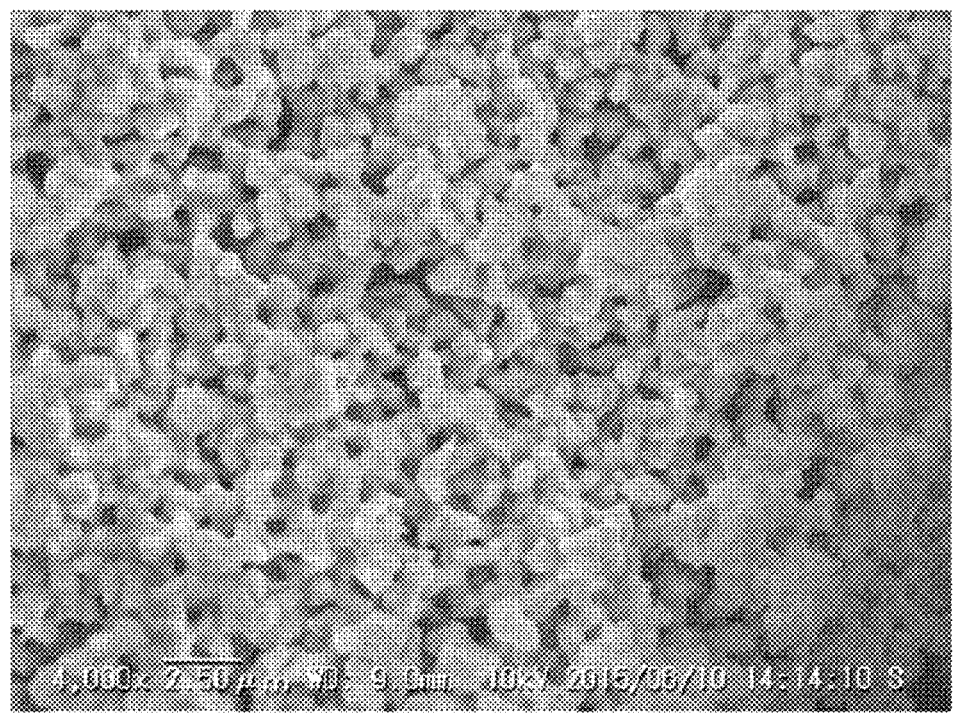
FIG. 26 shows an SEM image of $K_2Co^{2+}Si^{4+}O_4$ obtained in Example 5-1.

Further, $K_2Co^{2+}Si^{4+}O_4$ obtained in Example 5-1 was observed using a scanning electron microscope. FIG. 26 shows the results. In FIG. 26, the scale bar represents 2.5 μm. The results shown in FIG. 26 reveal that $K_2CoSiO_4$ having a particle diameter of around 1.0 μm was obtained.

Figure 27:
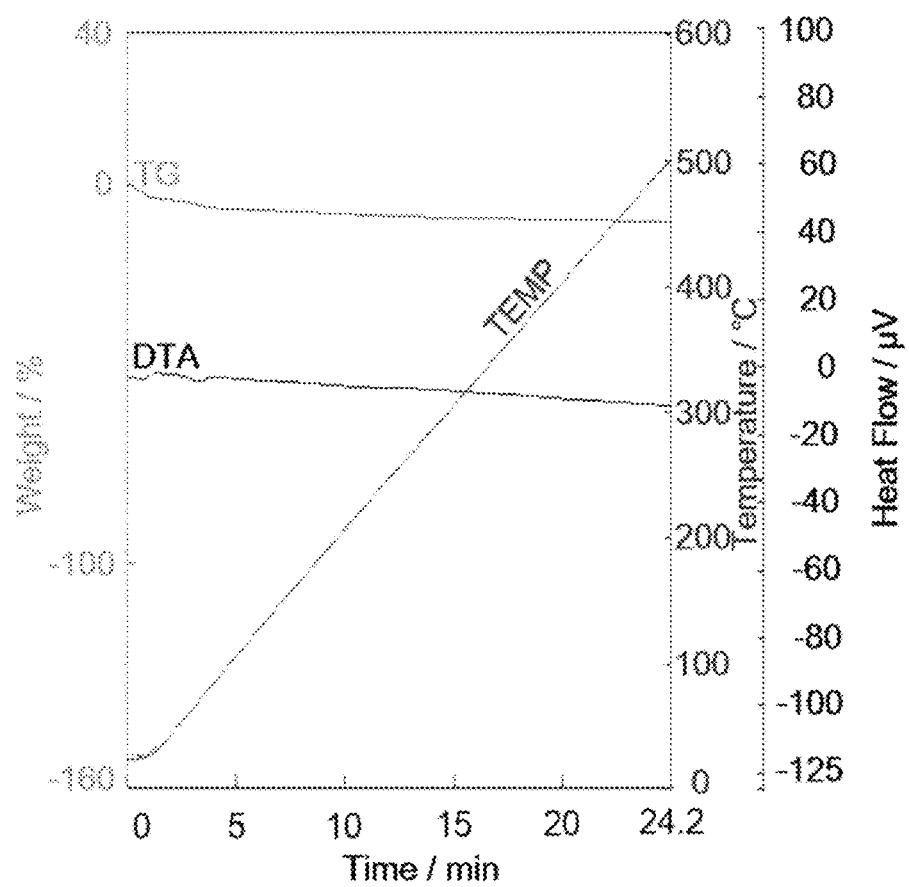
FIG. 27 shows the results of thermal stability measurement by TG-DTA of $K_2Co^{2+}Si^{4+}O_4$ obtained in Example 5-1.

Moreover, the thermal stability measurement of $K_2Co^{2+}Si^{4+}O_4$ obtained in Example 5-1 was performed using TG-DTA. FIG. 27 shows the results. As a result, the obtained $K_2Co^{2+}Si^{4+}O_4$ was stable in a wide temperature range (a temperature range up to 500° C.). A battery having high-level thermal stability can be constructed using this material as a battery material.

Example 5-2

$K_2CO_3$, CoO, and $SiO_2$ were used as starting material powders. Operation was performed in a dry room in order to prevent the water absorption of $K_2CO_3$.

$K_2CO_3$, CoO, and $SiO_2$ were weighed so that the molar ratio of potassium, cobalt, and silicon was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction patterns confirmed that the obtained product ($K_2Co^{2+}Si^{4+}O_4$) was the same as the product obtained in Example 5-1. FIG. 25 shows the results.

Figure 29:
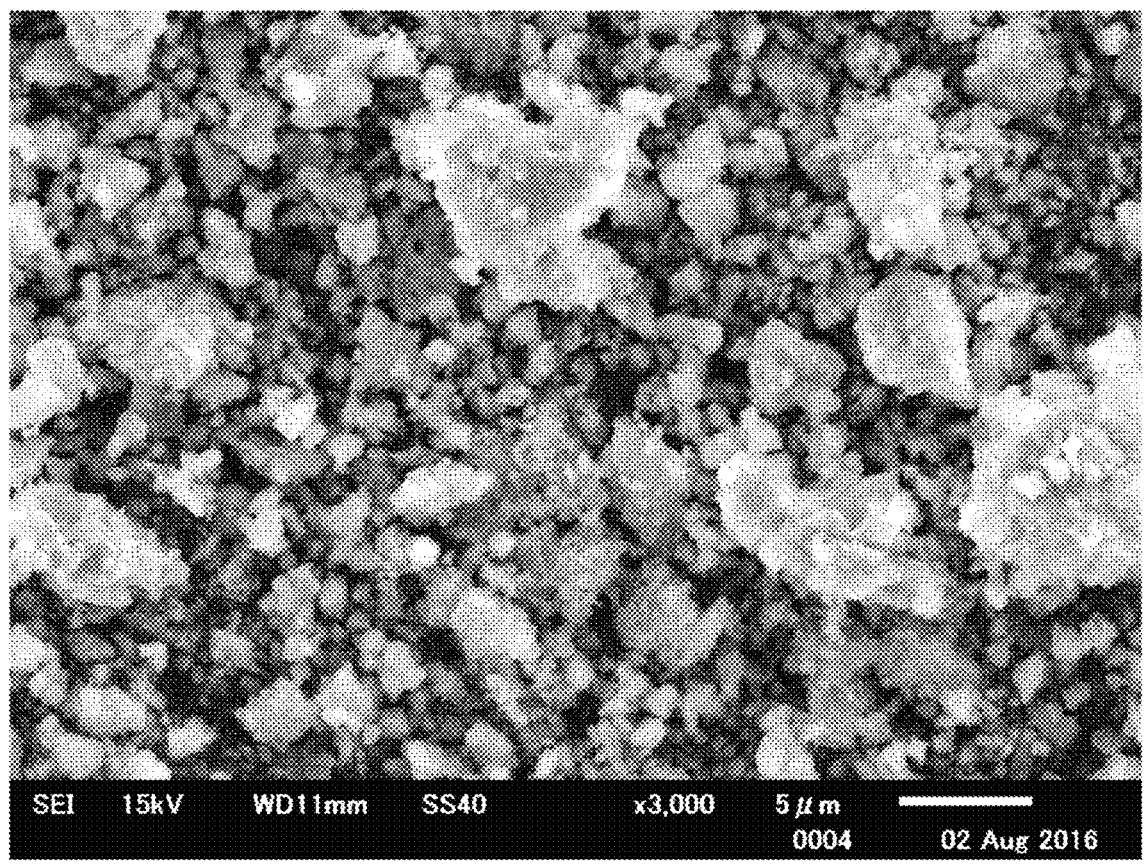
FIG. 29 shows an SEM image of $K_2Co^{2+}Si^{4+}O_4$ obtained in Example 5-1.
Figure 30:
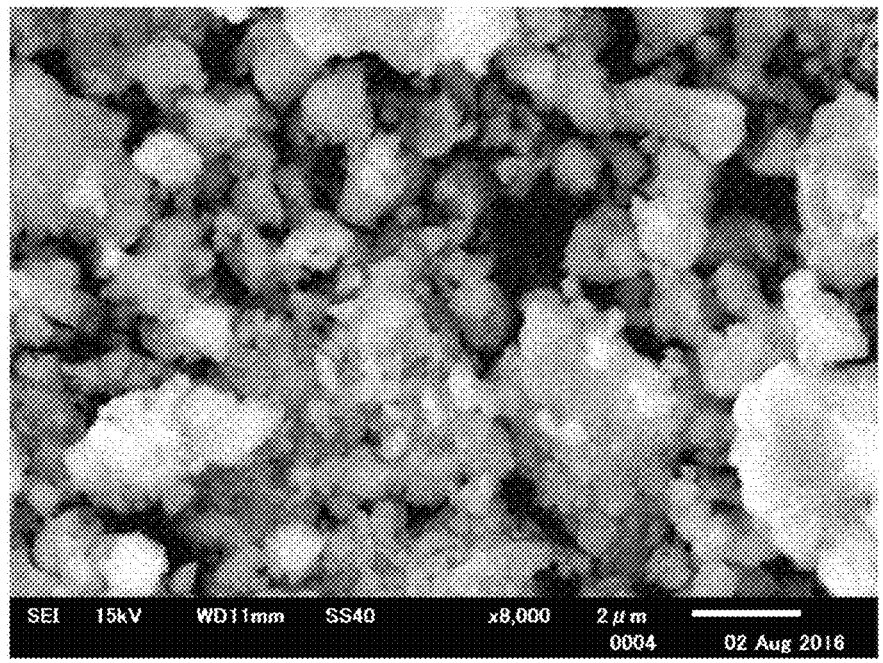
FIG. 30 shows a high-resolution SEM image of $K_2Co^{2+}Si^{4+}O_4$ obtained in Example 5-1.

$K_2Co^{2+}Si^{4+}O_4$ obtained in Example 5-1 was observed using a scanning electron microscope and a high-resolution scanning electron microscope. FIGS. 29 and 30 show the results. The results shown in FIGS. 29 and 30 reveal that $K_2Co^{2+}Si^{4+}O_4$ having a particle diameter of around 3 μm was obtained.

Further, $K_2Co^{2+}Si^{4+}O_4$ obtained in Example 5-1 was gradually heated, and the thermal stability and color tone were observed. FIG. 14 shows the results. As a result, the thermal stability of $K_2Co^{2+}Si^{4+}O_4$ was not excellent as those of $K_2Mn^{2+}Si^{4+}O_4$ and $K_2Fe^{2+}Si^{4+}O_4$.

Example 6

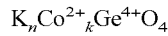

Example 6-1

$K_2CO_3$, $CoC_2O_4$, and $GeO_2$ were used as starting material powders. Operation was performed in a dry room in order to prevent the water absorption of $K_2CO_3$.

$K_2CO_3$, $CoC_2O_4$, and $GeO_2$ were weighed so that the molar ratio of potassium, cobalt, and germanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Co^{2+}Ge^{4+}O_4$) was confirmed by X-ray diffraction.

FIG. 28 shows the X-ray diffraction pattern of $K_2Co^{2+}Ge^{4+}O_4$ obtained in Example 6-1. The results shown in FIG. 28 reveal that the crystals of the obtained $K_2Co^{2+}Ge^{4+}O_4$ have the strongest peak at a diffraction angle, represented by $2\theta$, of 32.2 to 33.9° in the X-ray diffraction pattern determined by powder X-ray diffraction, and further have peaks at a diffraction angle of 18.8 to 20.6°, 30.6 to 32.0°, 36.3 to 38.9°, 44.2 to 45.8°, 50.3 to 52.8°, 55.5 to 57.8°, 58.4 to 60.7°, and 67.5 to 71.7°. These results reveal that the crystals of the obtained $K_2Co^{2+}Ge^{4+}O_4$ have a tetragonal structure, that the lattice constants are a=b=5.712 Å, c=7.434 Å, and $\alpha=\beta=\gamma=90°$, and that the unit lattice volume (V) is 242.5 Å$^3$.

Example 6-2

$K_2CO_3$, CoO, and $GeO_2$ were used as starting material powders. Operation was performed in a dry room in order to prevent the water absorption of $K_2CO_3$.

$K_2CO_3$, CoO, and $GeO_2$ were weighed so that the molar ratio of potassium, cobalt, and germanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction patterns confirmed that the obtained product ($K_2Co^{2+}Ge^{4+}O_4$) was the same as the product obtained in Example 6-1.

Figure 31:
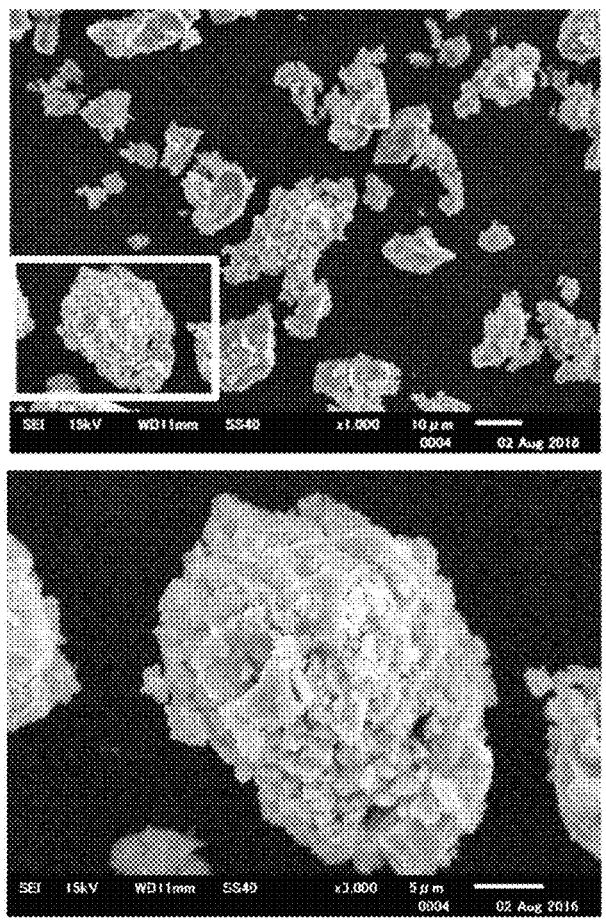
FIG. 31 shows SEM images of $K_2Co^{2+}Ge^{4+}O_4$ obtained in Example 6-1.
Figure 32:
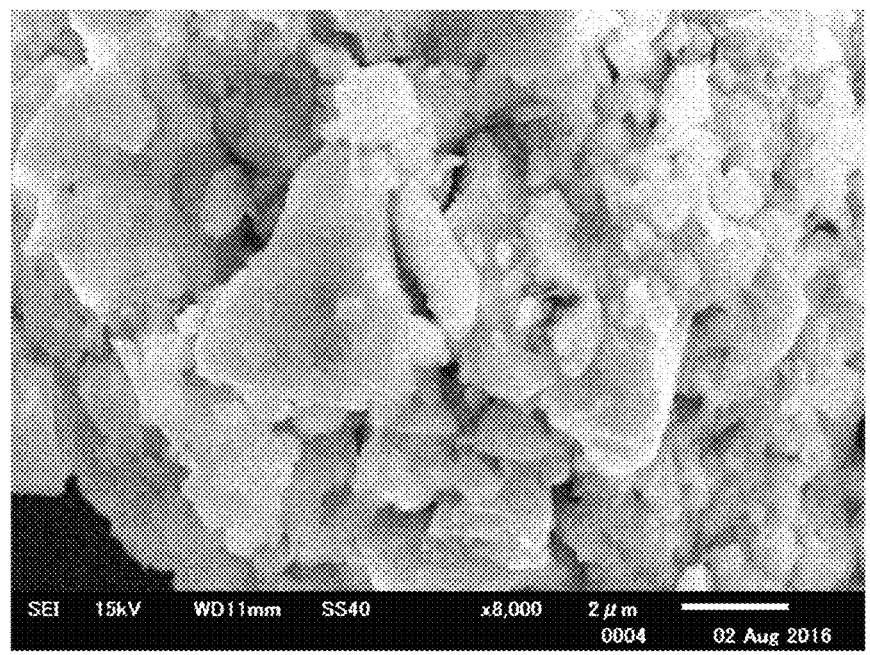
FIG. 32 shows high-resolution SEM images of $K_2Co^{2+}Ge^{4+}O_4$ obtained in Example 6-1.

$K_2Co^{2+}Ge^{4+}O_4$ obtained in Example 6-1 was observed using a scanning electron microscope and a high-resolution scanning electron microscope. FIGS. 31 and 32 show the results. The results shown in FIGS. 31 and 32 reveal that $K_2Co^{2+}Ge^{4+}O_4$ having a particle diameter of around 5 μm was obtained.

Example 7

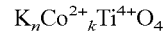

Example 7-1

$K_2CO_3$, $CoC_2O_4$, and $TiO_2$ (A) were used as starting material powders. Operation was performed in a dry room in order to prevent the water absorption of $K_2CO_3$.

$K_2CO_3$, $CoC_2O_4$, and $TiO_2$(A) were weighed so that the molar ratio of potassium, cobalt, and titanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Co^{2+}Ti^{4+}O_4$) was confirmed by X-ray diffraction.

FIG. 28 shows the X-ray diffraction pattern of $K_2Co^{2+}Ti^{4+}O_4$ obtained in Example 7-1. The results shown in FIG. 28 reveal that the crystals of the obtained $K_2Co^{2+}Ti^{4+}O_4$ have the strongest peak at a diffraction angle, represented by 2θ, of 41.5 to 43.7° in the X-ray diffraction pattern determined by powder X-ray diffraction, and further have peaks at a diffraction angle of 28.1 to 30.7°, 31.1 to 32.6°, 34.7 to 35.6°, 35.9 to 37.6°, 60.8 to 63.3°, 73.1 to 74.7°, and 76.8 to 78.8°. These results reveal that the crystals of the obtained $K_2Co^{2+}Ti^{4+}O_4$ have a monoclinic structure, that the lattice constants are a=5.047 Å, b=5.659 Å, c=6.269 Å, and β=100.44°, and that the unit lattice volume (V) is 176.1 Å³.

Example 7-2

$K_2CO_3$, CoO, and $TiO_2$(A) were used as starting material powders. Operation was performed in a dry room in order to prevent the water absorption of $K_2CO_3$.

$K_2CO_3$, CoO, and $TiO_2$(A) were weighed so that the molar ratio of potassium, cobalt, and titanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction pattern confirmed that the obtained product ($K_2Co^{2+}Ti^{4+}O_4$) was the same as the product obtained in Example 7-1.

Figure 33:
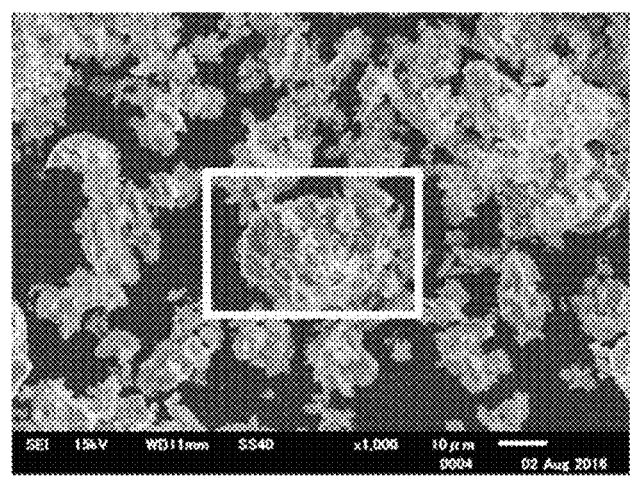
FIG. 33 shows a high-resolution SEM image of $K_2Co^{2+}Ti^{4+}O_4$ obtained in Example 7-1.
Figure 33:
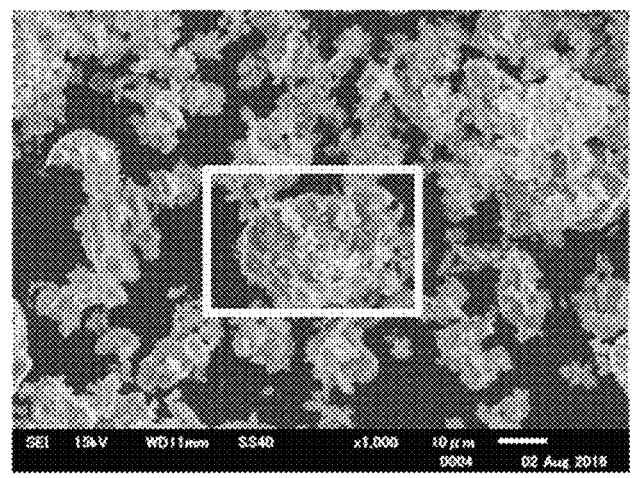

$K_2Co^{2+}Ti^{4+}O_4$ obtained in Example 7-1 was observed using a scanning electron microscope. FIG. 33 shows the results. The results shown in FIG. 33 reveal that $K_2Co^{2+}Ti^{4+}O_4$ having a particle diameter of around 20 μm was obtained.

Example 8

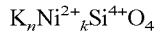

Example 8-1

$K_2CO_3$, NiO, and $SiO_2$ were used as starting material powders. Operation was performed in a dry room in order to prevent the water absorption of $K_2CO_3$.

$K_2CO_3$, NiO, and $SiO_2$ were weighed so that the molar ratio of potassium, nickel, and silicon was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Ni^{2+}Si^{4+}O_4$) was confirmed by X-ray diffraction.

Figure 34:
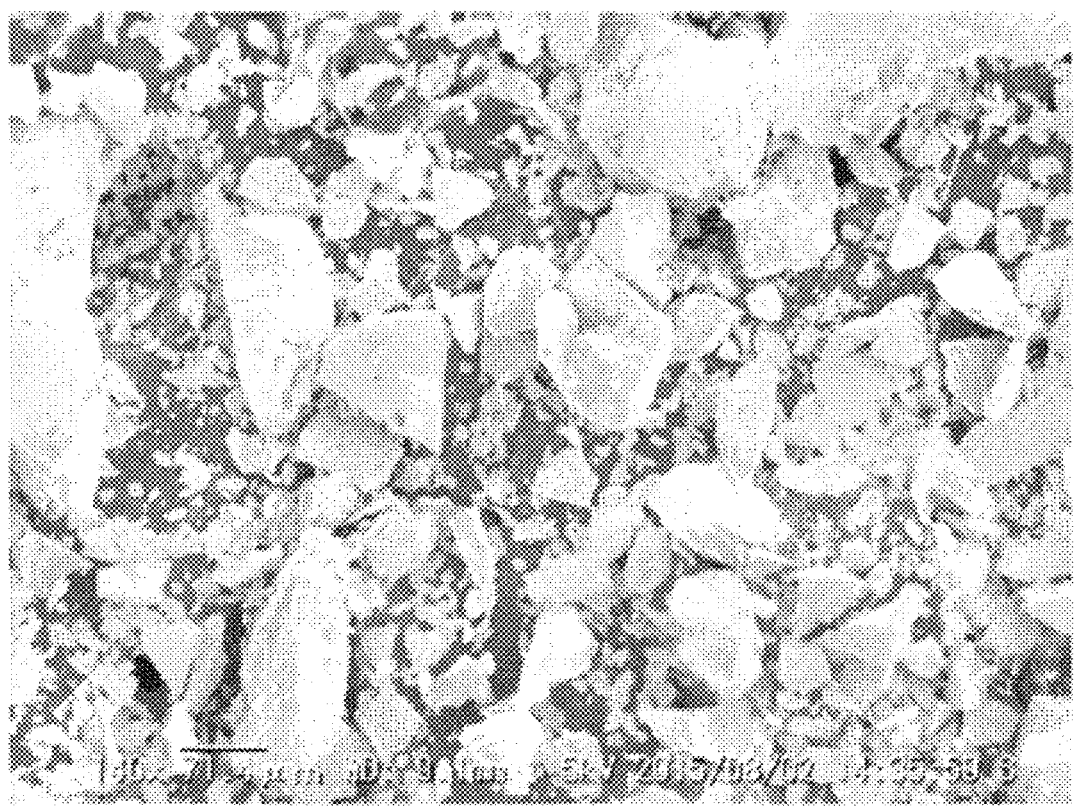
FIG. 34 shows an SEM image of $K_2Ni^{2+}Si^{4+}O_4$ obtained in Example 8-1.

$K_2Ni^{2+}Si^{4+}O_4$ obtained in Example 8-1 was observed using a scanning electron microscope. FIG. 34 shows the results. In FIG. 34, the scale bar represents 71.4 μm. The results shown in FIG. 34 reveal that $K_2Ni^{2+}Si^{4+}O_4$ having a particle diameter of around 100 μm was obtained.

Example 8-2

$K_2CO_3$, Ni(OH)$_2$, and $SiO_2$ were used as starting material powders. Operation was performed in a dry room in order to prevent the water absorption of $K_2CO_3$.

$K_2CO_3$, Ni(OH)$_2$, and $SiO_2$ were weighed so that the molar ratio of potassium, nickel, and silicon was 2:1:1, and mixed in an agate mortar for about 30 minutes. The mixture was formed into pellets, and fired in an electric furnace in argon at 800° C. and 900° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction patterns confirmed that the obtained product ($K_2Ni^{2+}Si^{4+}O_4$) was the same as the product obtained in Example 8-1.

Figure 35:
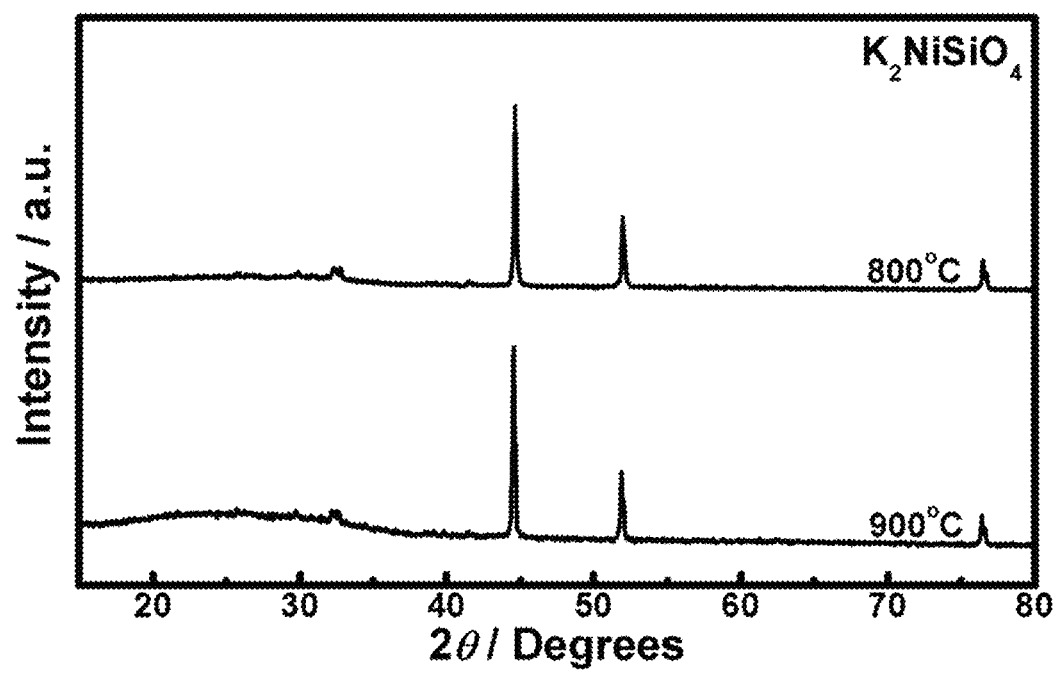
FIG. 35 shows X-ray diffraction patterns of $K_2Ni^{2+}Si^{4+}O_4$ obtained in Example 8-2.

FIGS. 9 and 35 show the X-ray diffraction patterns of $K_2Ni^{2+}Si^{4+}O_4$ obtained in Example 8-2. The obtained $K_2Ni^{2+}Si^{4+}O_4$ showed multiple main peaks at least at a 2θ value of 25 to 65°. Since these peaks correspond to single-phase $K_2Ni^{2+}Si^{4+}O_4$, it is found that single-phase $K_2Ni^{2+}Si^{4+}O_4$ is obtained as a product. It is also revealed that the crystals of the obtained $K_2Ni^{2+}Si^{4+}O_4$ have the strongest peak at a diffraction angle, represented by 2θ, of 44.0 to 45.0° in the X-ray diffraction patterns determined by powder X-ray diffraction, and further have peaks at a diffraction angle of 25.38 to 26.63°, 31.83 to 33.50°, 51.48 to 52.55°, and 75.96 to 77.17°. These results reveal that the crystals of the obtained $K_2Ni^{2+}Si^{4+}O_4$ have a tetragonal structure (space group I4$_1$/a c d), that the lattice constants are a=b=5.576 Å, c=3.534 Å, and α=β=γ=90°, and that the unit lattice volume (V) is 109.9 Å³.

Figure 36:
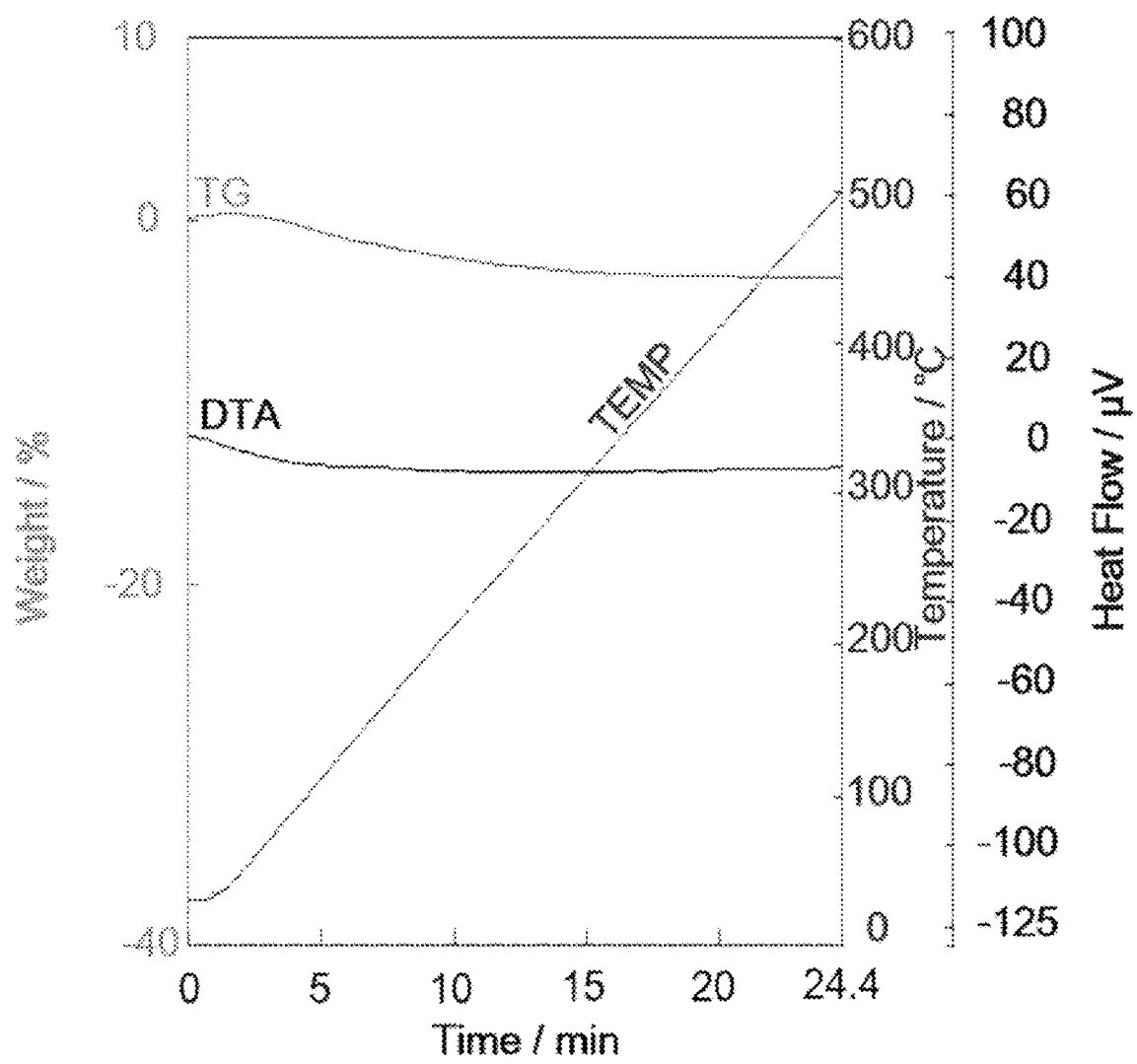
FIG. 36 shows the results of thermal stability measurement by TG-DTA of $K_2Ni^{2+}Si^{4+}O_4$ obtained in Example 8-2.

Moreover, the thermal stability measurement of $K_2Ni^{2+}Si^{4+}O_4$ obtained in Example 8-2 was performed using TG-DTA. FIG. 36 shows the results. As a result, the obtained $K_2Ni_{2+}Si^{4+}O_4$ was stable in a wide temperature range (a temperature range up to 500° C.). A battery having high-level thermal stability can be constructed using this material as a battery material.

Figure 37:
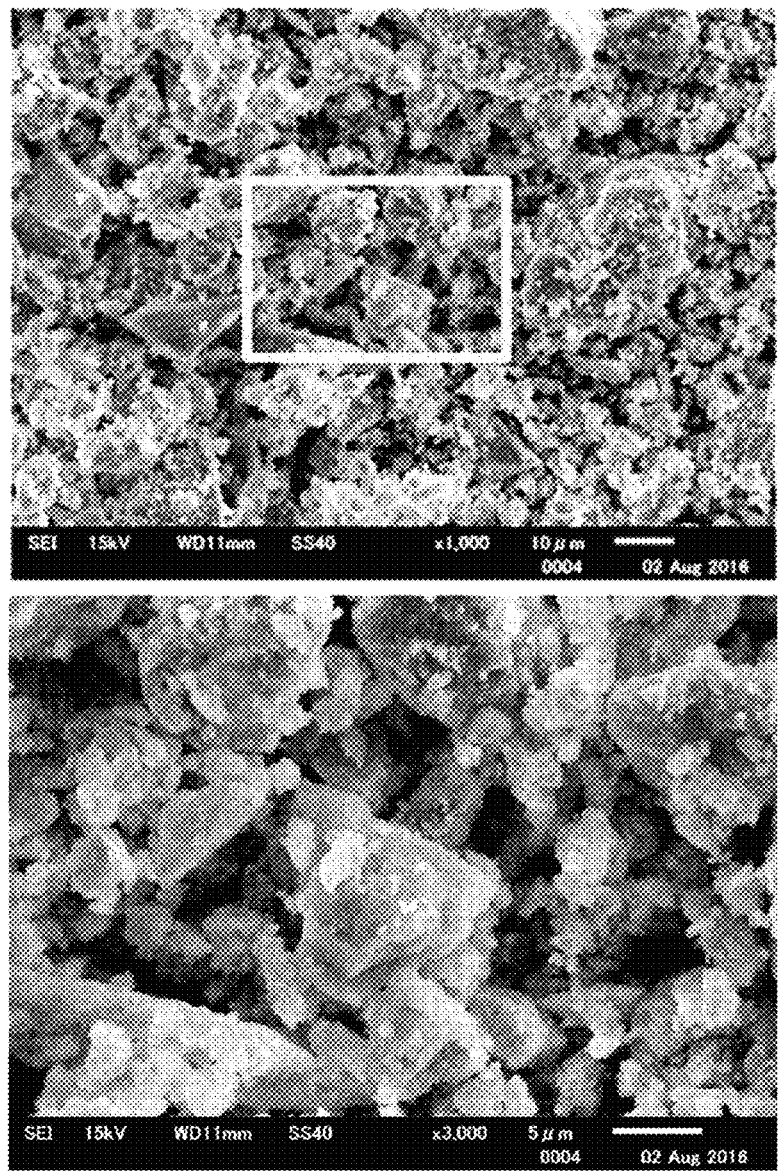
FIG. 37 shows SEM images of $K_2Ni^{2+}Si^{4+}O_4$ obtained in Example 8-2.
Figure 38:
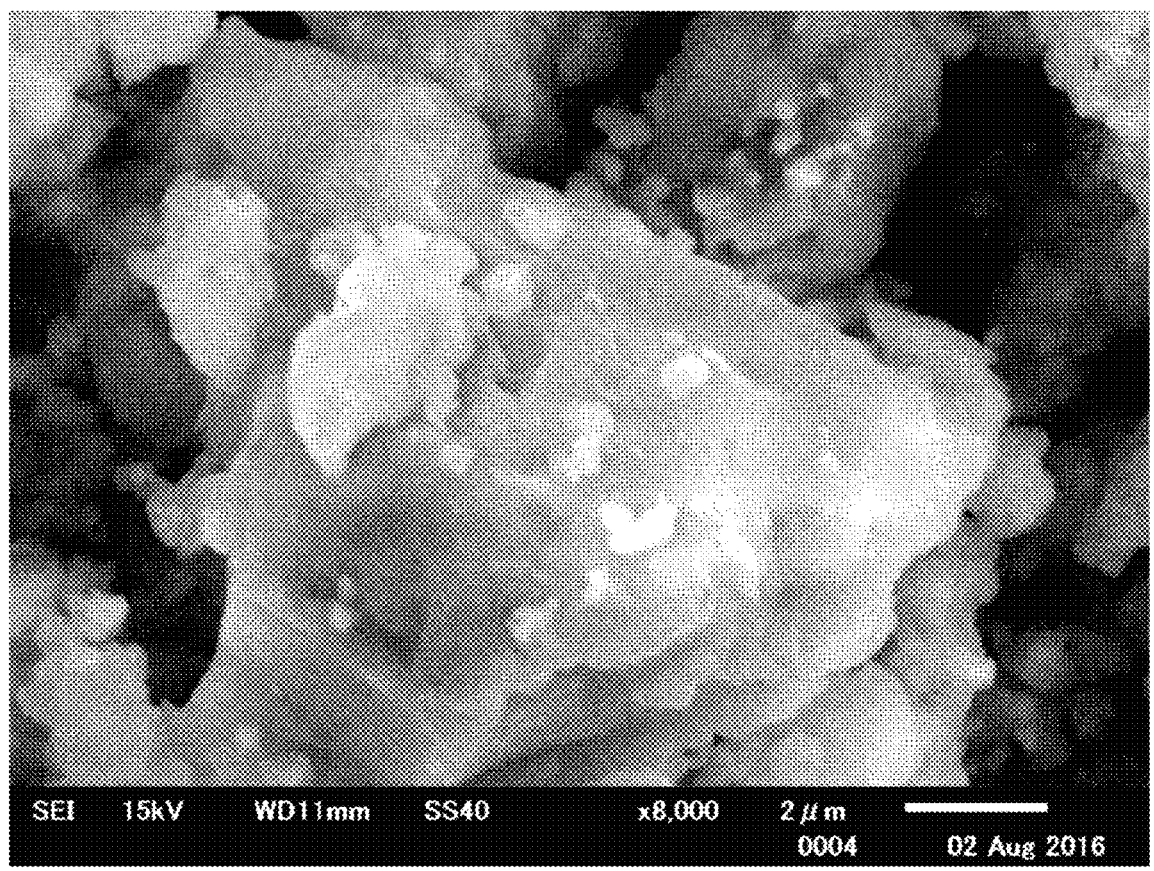
FIG. 38 shows a high-resolution SEM image of $K_2Ni^{2+}Si^{4+}O_4$ obtained in Example 8-2.

$K_2Ni^{2+}Si^{4+}O_4$ obtained in Example 8-2 was observed using a scanning electron microscope and a high-resolution scanning electron microscope. FIGS. 37 and 38 show the results. The results shown in FIGS. 37 and 38 reveal that $K_2Ni^{2+}Si^{4+}O_4$ having a particle diameter of around 10 μm was obtained.

Example 9

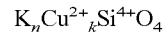

Example 9-1

$K_2CO_3$, CuO, and $SiO_2$ were used as starting material powders. Operation was performed in a dry room in order to prevent the water absorption of $K_2CO_3$.

$K_2CO_3$, CuO, and $SiO_2$ were weighed so that the molar ratio of potassium, copper, and silicon was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Cu^{2+}Si^{4+}O_4$) was confirmed by X-ray diffraction.

Example 9-2

Treatment was performed as in Example 9-1, except that firing was conducted in an air atmosphere, not an argon atmosphere. The X-ray diffraction pattern confirmed that the obtained product ($K_2Cu^{2+}Si^{4+}O_4$) was the same as the product obtained in Example 9-1.

Figure 39:
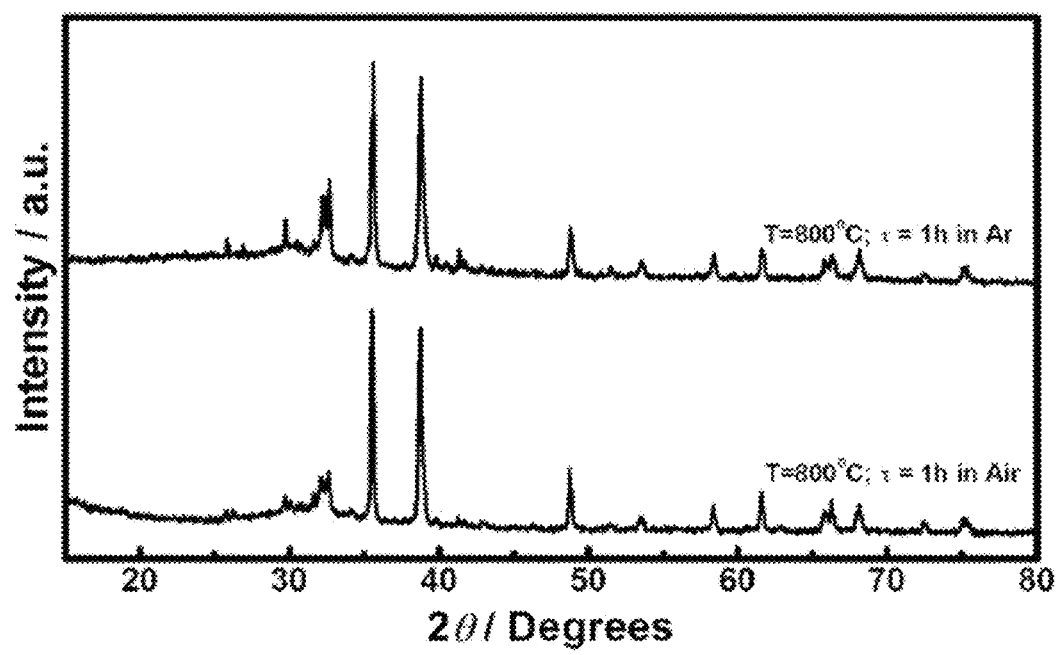
FIG. 39 shows X-ray diffraction patterns of $K_2Cu^{2+}Si^{4+}O_4$ obtained in Examples 11-1 and 11-2.

FIG. 39 shows the X-ray diffraction patterns of $K_2Cu^{2+}Si^{4+}O_4$ obtained in Examples 9-1 and 9-2. The results shown in FIG. 39 reveal that the crystals of the obtained $K_2Cu^{2+}Si^{4+}O_4$ have the strongest peak at a diffraction angle, represented by 2θ, of 34.7 to 36.6° in the X-ray diffraction patterns determined by powder X-ray diffraction, and further have peaks at a diffraction angle of 24.6 to 27.7°, 28.8 to 30.6°, 31.2 to 33.6°, 37.9 to 44.6°, 47.8 to 50.3°, 51.2 to 52.6°, 53.0 to 54.9°, 57.4 to 59.1°, 60.9 to 62.9°, 65.0 to 69.4°, 71.6 to 73.3°, 74.5 to 76.8°, 79.5 to 81.6°, and 82.0 to 84.6°. These results reveal that the crystals of the obtained $K_2Cu^{2+}Si^{4+}O_4$ have a monoclinic structure, that the lattice constants are a=4.634 Å, b=3.420 Å, c=6.321 Å, and β=90.34°, and the unit lattice volume (V) is 100.2 Å³.

Example 10

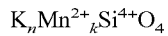

Example 10-1

$K_2CO_3$, $MnC_2O_4$, and $SiO_2$ were used as starting material powders. Operation was performed in a dry room in order to prevent the water absorption of $K_2CO_3$.

$K_2CO_3$, $MnC_2O_4$, and $SiO_2$ were weighed so that the molar ratio of potassium, manganese, and silicon was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the obtained product, the product obtained after firing was placed in a glove box in which an Ar atmosphere was maintained, and stored in an environment without contact with air. The product ($K_2Mn^{2+}Si^{4+}O_4$) was confirmed by X-ray diffraction.

Example 10-2

$K_2CO_3$, MnO, and $SiO_2$ were used as starting material powders. Operation was performed in a dry room in order to prevent the water absorption of $K_2CO_3$.

$K_2CO_3$, MnO, and $SiO_2$ were weighed so that the molar ratio of potassium, manganese, and silicon was 2:1:1, and mixed in an agate mortar for about 30 minutes. The mixture was formed into pellets, and fired in an electric furnace in a nitrogen gas atmosphere at 700° C., 800° C., or 900° C. for 1 hour. As a sample preparation method for avoiding the influence of air exposure due to the hygroscopicity of the obtained product, the product obtained after firing was placed in a glove box in which an Ar atmosphere was maintained, and stored in an environment without contact with air. The X-ray diffraction patterns confirmed that the obtained product ($K_2Mn^{2+}Si^{4+}O_4$) was the same as the product obtained in Example 10-1.

Figure 40:
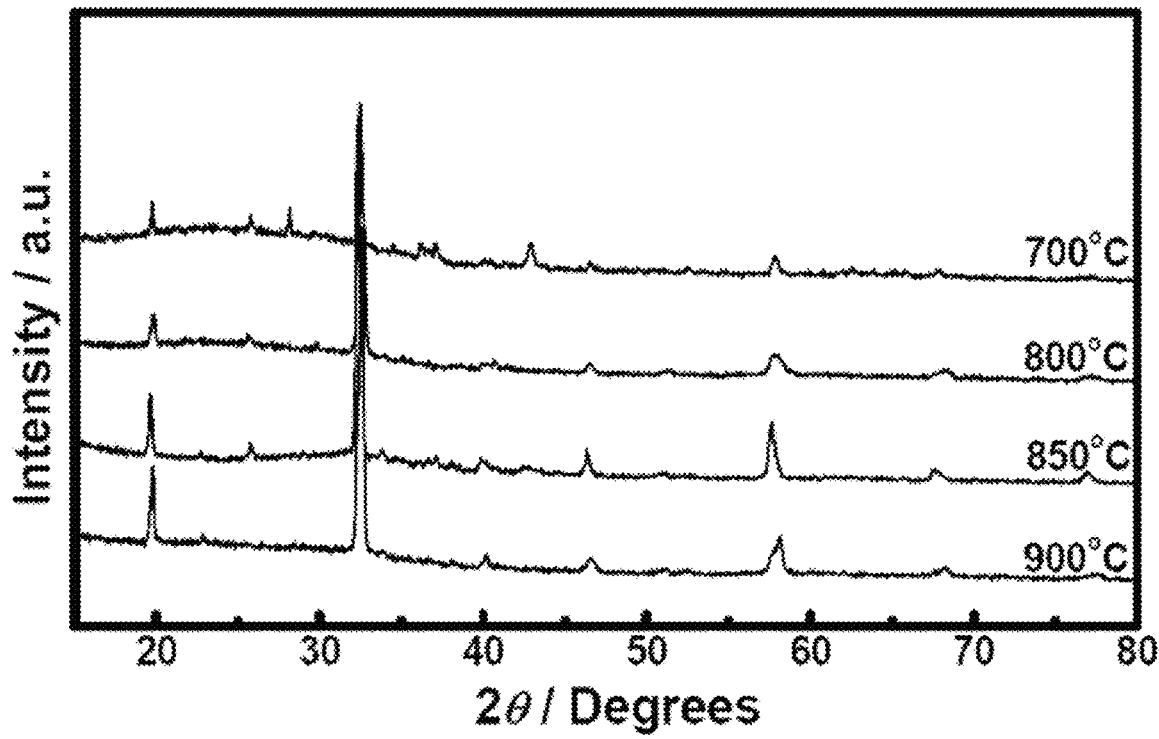
FIG. 40 shows X-ray diffraction patterns of $K_2Mn^{2+}Si^{4+}O_4$ obtained in Example 10-2.

FIG. 40 shows the X-ray diffraction patterns of $K_2Mn^{2+}Si^{4+}O_4$ obtained in Example 10-2. The results shown in FIG. 40 reveal that when the firing temperature is 650° C. or more, multiple main peaks are observed at least at a 2θ value of 19 to 68°. Since these peaks correspond to single-phase $K_2Mn^{2+}Si^{4+}O_4$, the results shown in FIG. 40 reveal that single-phase $K_2Mn^{2+}Si^{4+}O_4$ is obtained as a product. Moreover, the peaks observed at a 2θ value of 30 to 35° are higher at a higher firing temperature; thus, it is found that the firing temperature is 650° C. or more, and that a higher temperature is preferable. It is also revealed that the crystals of the obtained $K_2Mn^{2+}Si^{4+}O_4$ have the strongest peak at a diffraction angle, represented by 2θ, of 31.7 to 33.1° in the X-ray diffraction patterns determined by powder X-ray diffraction, and further have peaks at a diffraction angle of 19.1 to 20.4°, 39.3 to 40.6°, 45.8 to 47.1°, 50.4 to 51.5°, 56.9 to 58.7°, 66.8 to 68.5°, 69.7 to 70.9°, and 76.2 to 77.9°. These results reveal that the crystals of the obtained $K_2MnSiO_4$ have a cubic structure (space group Fd-3 m), that the lattice constants are a=b=c=7.826 Å and α=β=γ=90°, and that the unit lattice volume (V) is 479.3 Å³.

Figure 41:
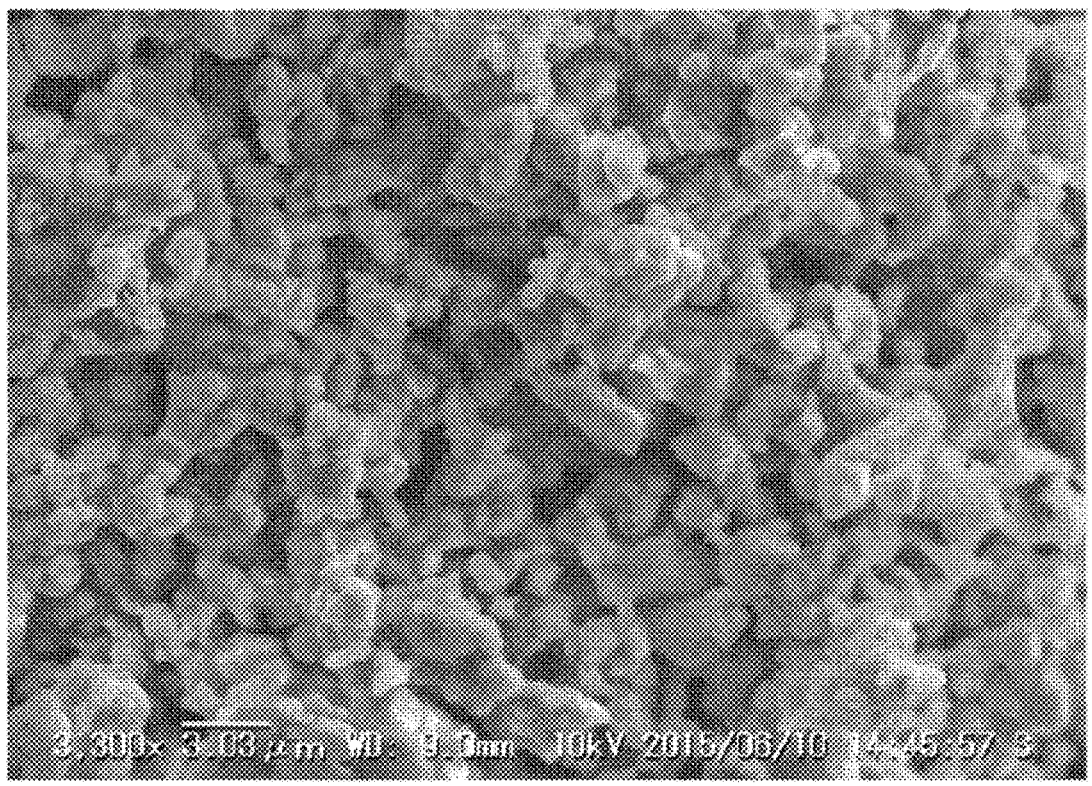
FIG. 41 shows an SEM image of $K_2Mn^{2+}Si^{4+}O_4$ obtained in Example 10-1.

Further, $K_2Mn^{2+}Si^{4+}O_4$ obtained in Example 10-1 was observed using a scanning electron microscope. FIG. 41 shows the results. In FIG. 41, the scale bar represents 3.0 μm. The results shown in FIG. 41 reveal that $K_2Mn^{2+}Si^{4+}O_4$ having a particle diameter of around 1.0 μm was obtained.

Figure 42:
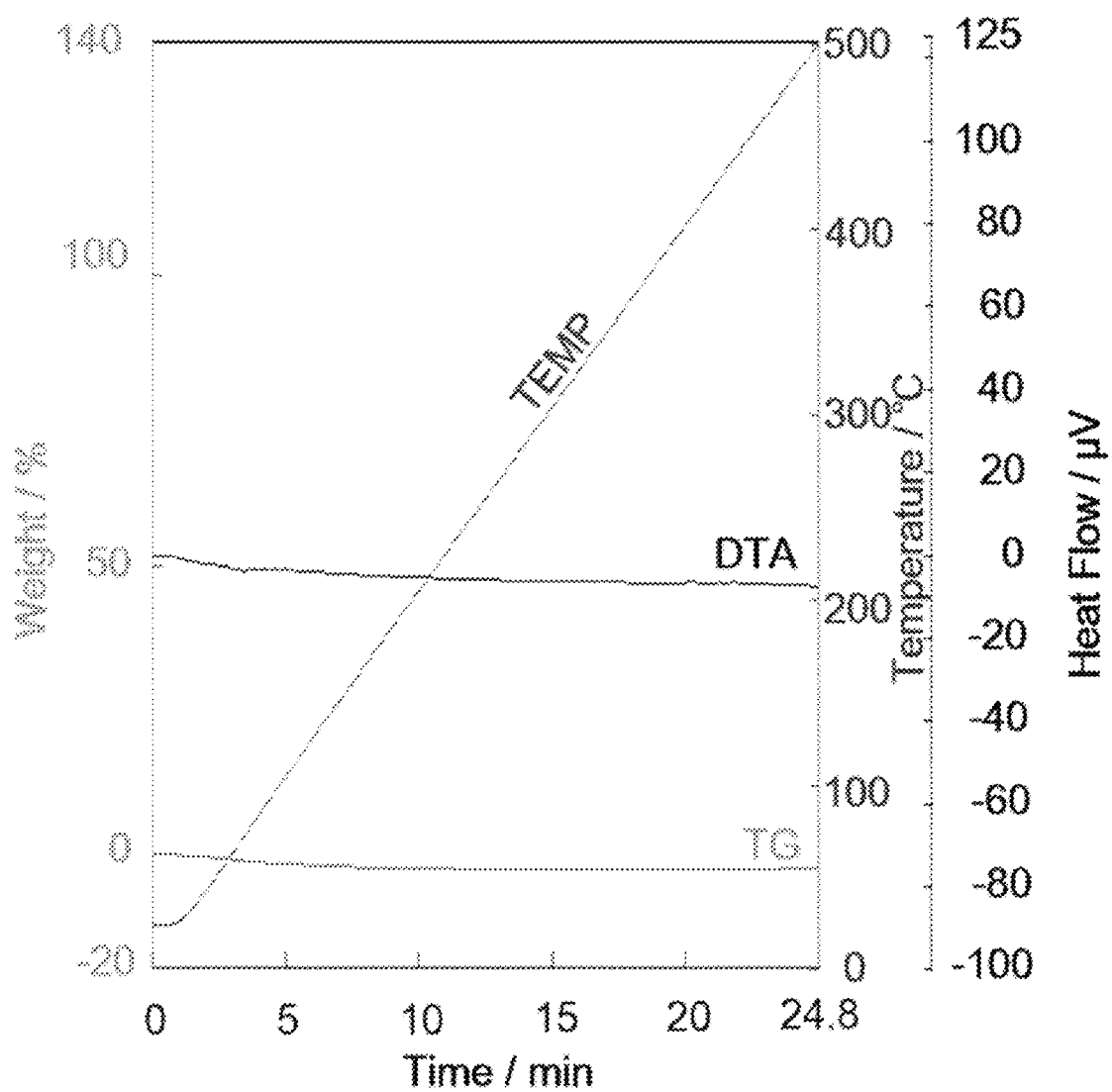
FIG. 42 shows the results of thermal stability measurement by TG-DTA of $K_2Mn^{2+}Si^{4+}O_4$ obtained in Example 10-1.

Moreover, the thermal stability measurement of $K_2Mn^{2+}Si^{4+}O_4$ obtained in Example 10-1 was performed using TG-DTA. FIG. 42 shows the results. As a result, the obtained $K_2Mn^{2+}Si^{4+}O_4$ was stable in a wide temperature range (a temperature range up to 500° C.). A battery having high-level thermal stability can be constructed using this material as a battery material.

Figure 43:
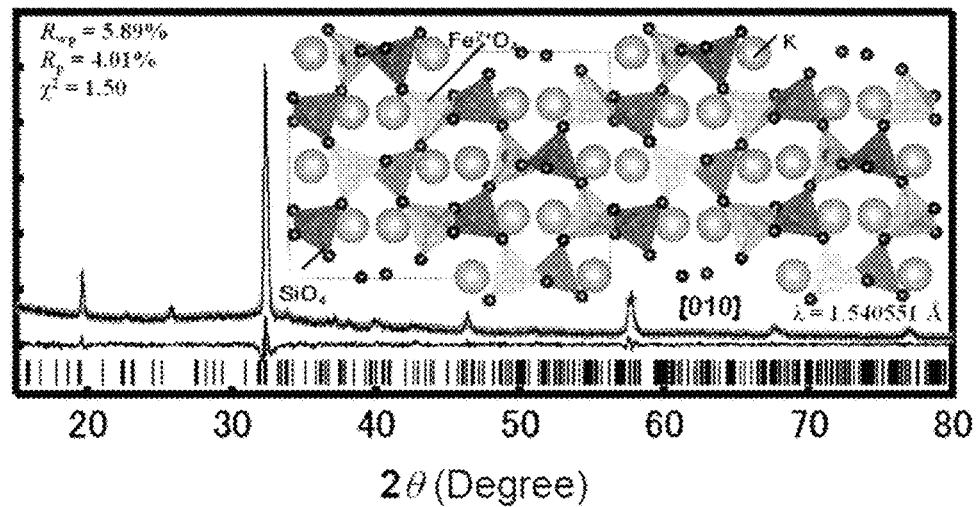
FIG. 43 shows a Rietveld X-ray diffraction pattern of $K_2Mn^{2+}Si^{4+}O_4$ obtained in Example 10-1.

The product ($K_2Mn^{2+}Si^{4+}O_4$) obtained in Example 10-1 was confirmed by Rietveld X-ray diffraction patterns. FIGS. 9 and 43 show the results. The results confirmed that the obtained $K_2Mn^{2+}Si^{4+}O_4$ had an orthorhombic structure (space group Pca2₁ S.G), and that the lattice constants were a=11.1306(3)Å, b=5.5334(1)Å, c=15.7817(29)Å, and V=972.1(4)Å³.

Figure 44:
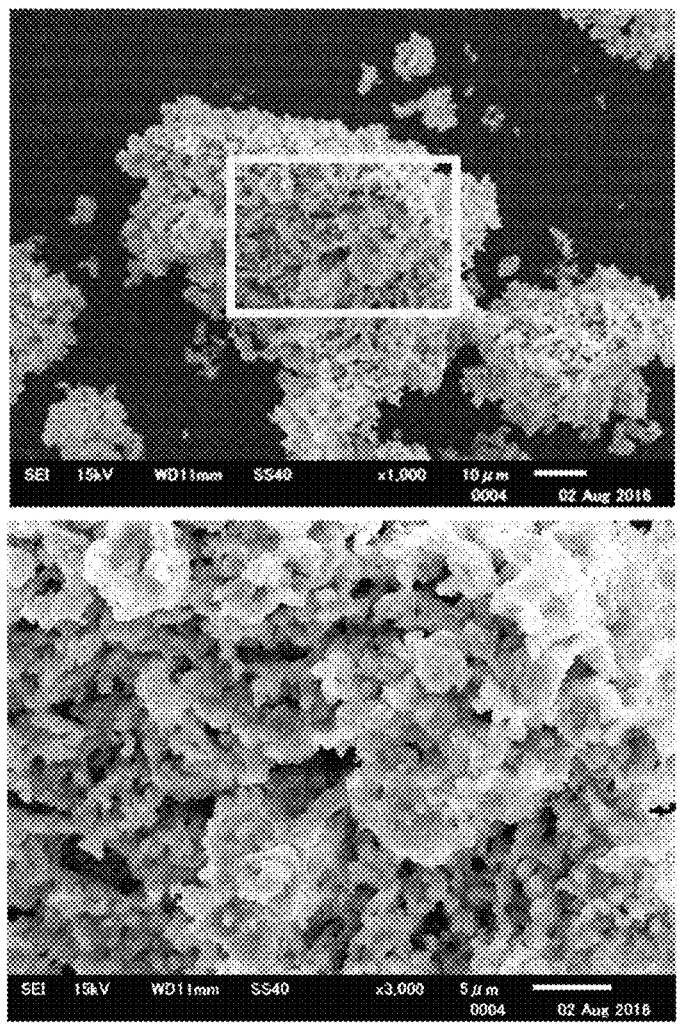
FIG. 44 shows SEM images of $K_2Mn^{2+}Si^{4+}O_4$ obtained in Example 10-1.
Figure 45:
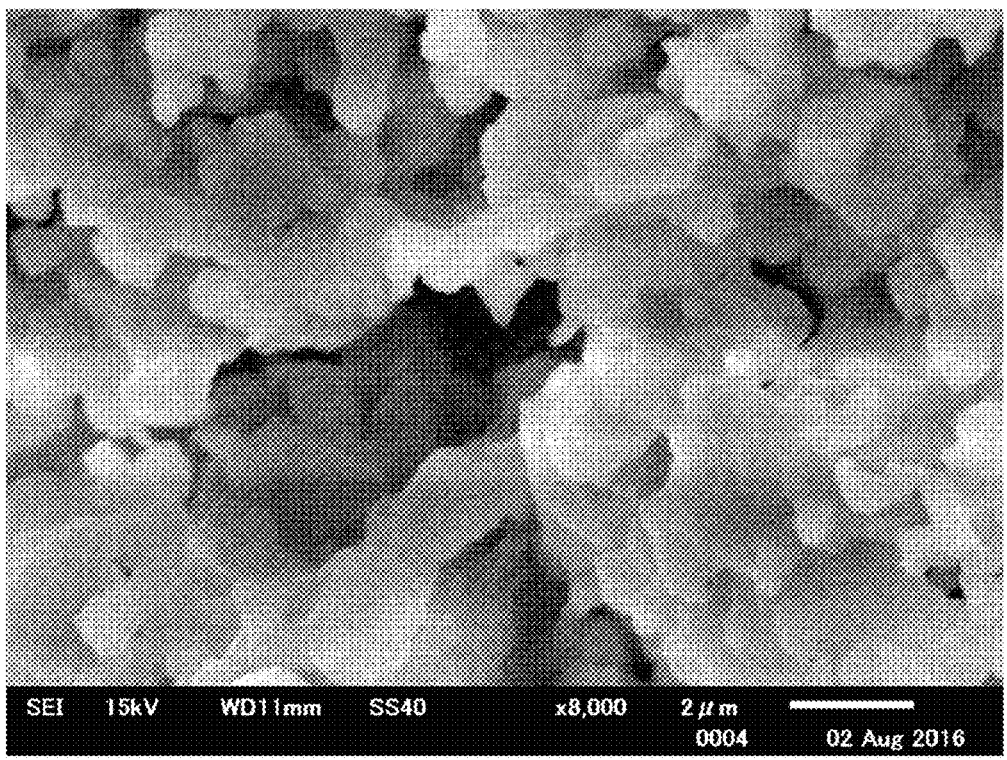
FIG. 45 shows a high-resolution SEM image of $K_2Mn^{2+}Si^{4+}O_4$ obtained in Example 10-1.
Figure 46:
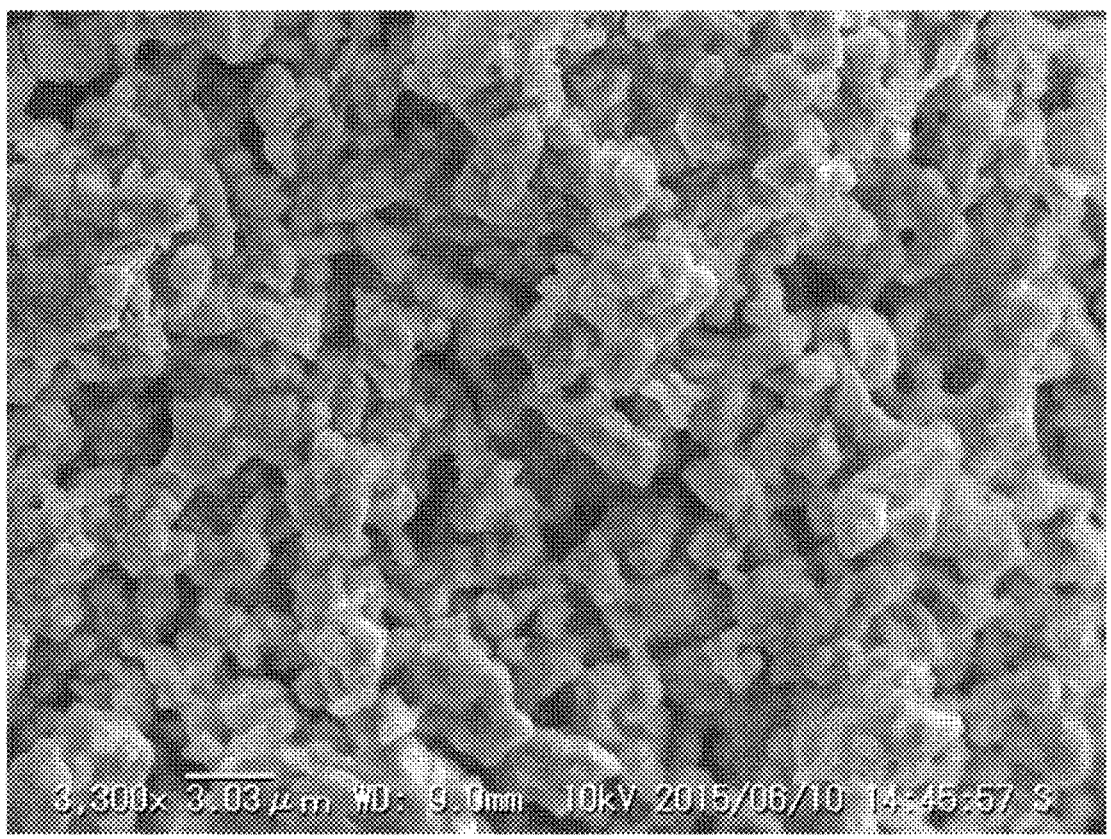
FIG. 46 shows a high-resolution SEM image of $K_2Mn^{2+}Si^{4+}O_4$ obtained in Example 10-1.

Moreover, $K_2Mn^{2+}Si^{4+}O_4$ obtained in Example 10-1 was observed using a scanning electron microscope and a high-resolution scanning electron microscope. FIGS. 44 to 46 show the results. The results shown in FIGS. 44 to 46 reveal that $K_2Mn^{2+}Si^{4+}O_4$ having a particle diameter of around 2 μm was obtained.

Further, $K_2Mn^{2+}Si^{4+}O_4$ obtained in Example 10-1 was gradually heated, and the thermal stability and color tone were observed. FIG. 14 shows the results. As a result, it can be understood that the thermal stability of $K_2Mn^{2+}Si^{4+}O_4$ was superior to that of $K_2Co^{2+}Si^{4+}O_4$.

Example 11

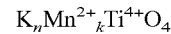

Example 11-1

$K_2CO_3$, $MnC_2O_4$, and $TiO_2$ (A) were used as starting material powders. Operation was performed in a dry room in order to prevent the water absorption of $K_2CO_3$.

$K_2CO_3$, $MnC_2O_4$, and $TiO_2$ (A) were weighed so that the molar ratio of potassium, manganese, and titanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Mn^{2+}Ti^{4+}O_4$) was confirmed by X-ray diffraction.

Example 11-2

$K_2CO_3$, MnO, and $TiO_2$(A) were used as starting material powders. Operation was performed in a dry room in order to prevent the water absorption of $K_2CO_3$.

$K_2CO_3$, MnO, and $TiO_2(A)$ were weighed so that the molar ratio of potassium, manganese, and titanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction pattern confirmed that the obtained product ($K_2Mn^{2+}Ti^{4+}O_4$) was the same as the product obtained in Example 11-1.

Example 12

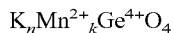

Example 12-1

$K_2CO_3$, $MnC_2O_4$, and $GeO_2$ were used as starting material powders. Operation was performed in a dry room in order to prevent the water absorption of $K_2CO_3$.

$K_2CO_3$, $MnC_2O_4$, and $GeO_2$ were weighed so that the molar ratio of potassium, manganese, and germanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Mn^{2+}Ge^{4+}O_4$) was confirmed by X-ray diffraction.

Example 12-2

$K_2CO_3$, MnO, and $GeO_2$ were used as starting material powders. Operation was performed in a dry room in order to prevent the water absorption of $K_2CO_3$.

$K_2CO_3$, $MnC_2O_4$, and $GeO_2$ were weighed so that the molar ratio of potassium, manganese, and germanium was 2:1:1, and mixed in an agate mortar for about 30 minutes. The mixture was formed into pellets, and fired in an electric furnace in argon at 800° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The X-ray diffraction pattern confirmed that the obtained product ($K_2Mn^{2+}Ge^{4+}O_4$) was the same as the product obtained in Example 12-1.

Figure 47:
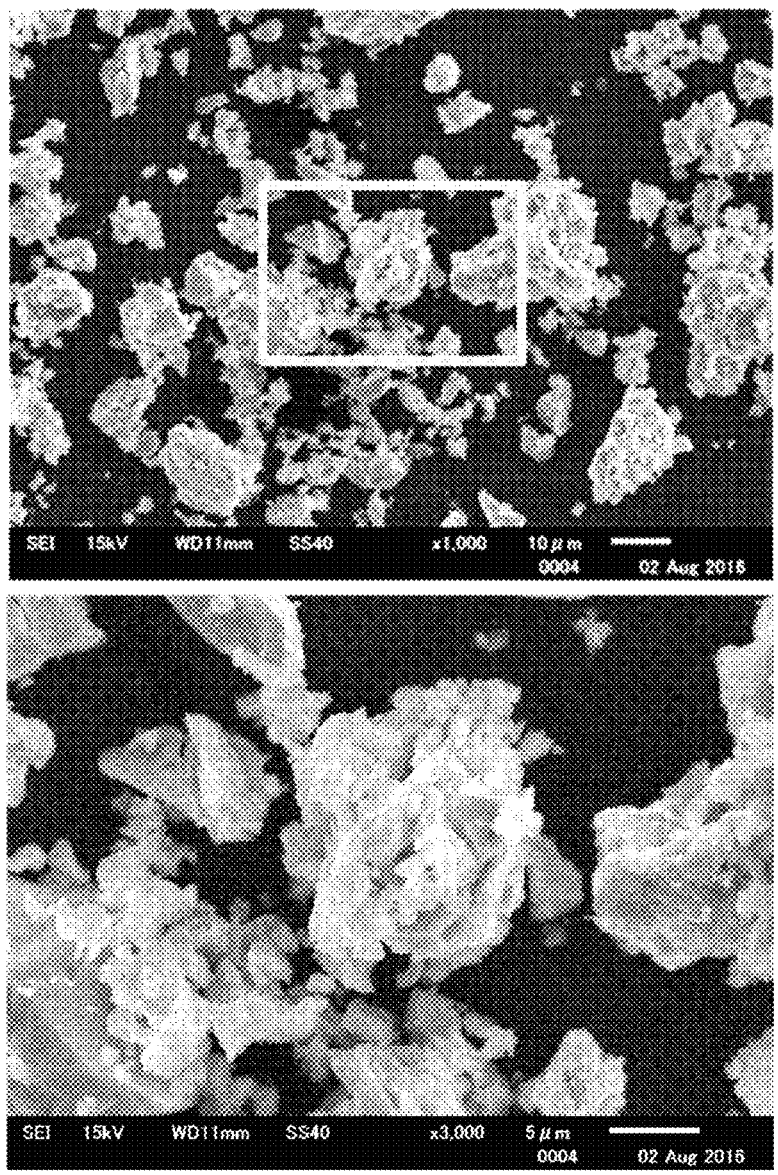
FIG. 47 shows SEM images of $K_2Mn^{2+}Ge^{4+}O_4$ obtained in Example 12-1.
Figure 48:
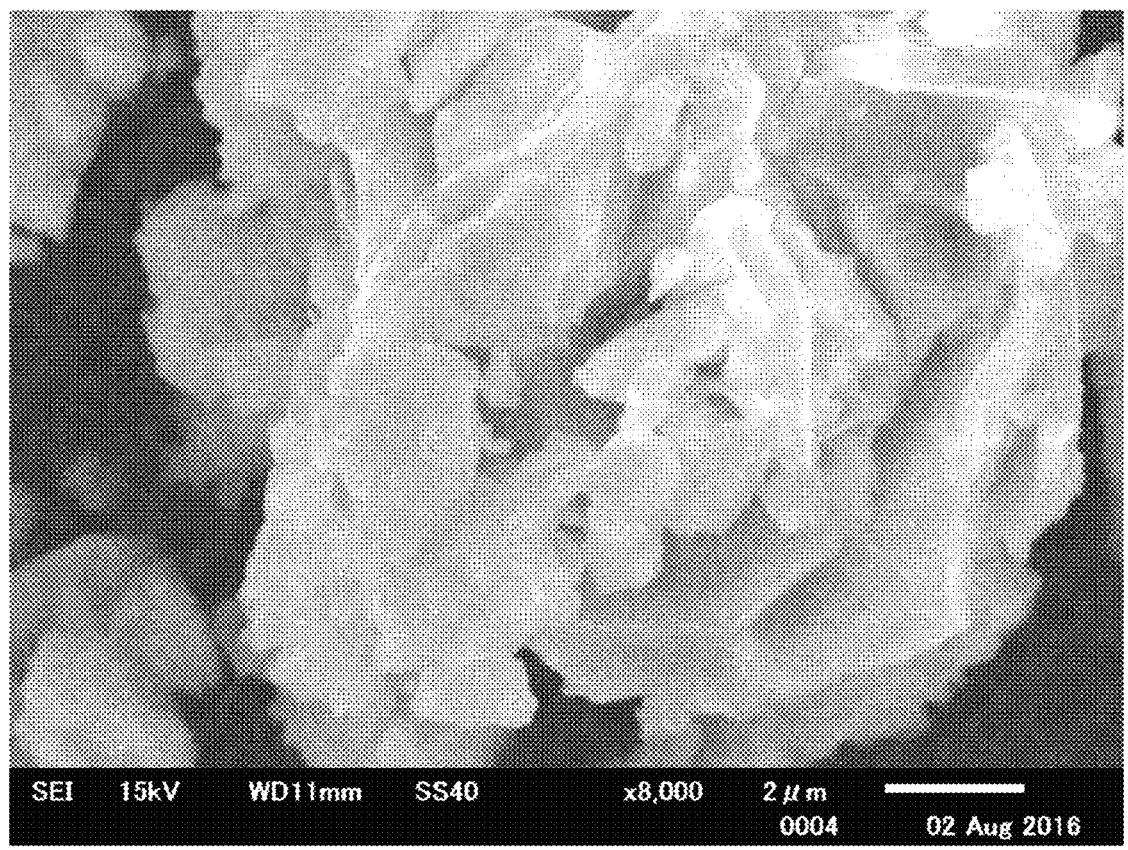
FIG. 48 shows a high-resolution SEM image of $K_2Mn^{2+}Ge^{4+}O_4$ obtained in Example 12-1.

$K_2Mn^{2+}Ge^{4+}O_4$ obtained in Example 12-1 was observed using a scanning electron microscope and a high-resolution scanning electron microscope. FIGS. 47 and 48 show the results. The results shown in FIGS. 47 and 48 reveal that $K_2Mn^{2+}Ge^{4+}O_4$ having a particle diameter of around 10 μm was obtained.

Figure 49:
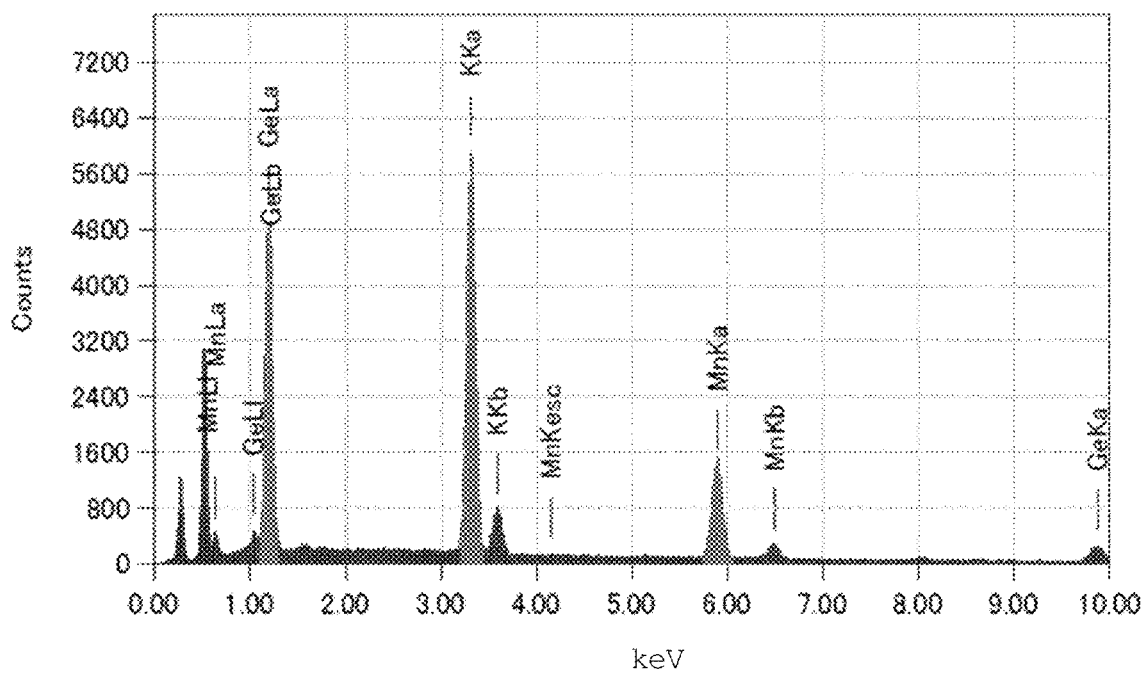
FIG. 49 shows the results of SEM-EDX of $K_2Mn^{2+}Ge^{4+}O_4$ obtained in Example 12-1.

The elemental analysis of $K_2Mn^{2+}Ge^{4+}O_4$ obtained in Example 12-1 was performed by SEM-EDX. FIG. 49 shows the results. The results reveal that the amount of K is 47.63 mass %, the amount of Mn is 29.67 mass %, and the amount of Ge is 22.70 mass %, based on 100 mass % of the total metal amount.

Example 13

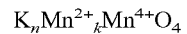

$K_2CO_3$, $MnO_2$, and $MnC_2O_4$ were used as starting material powders. Operation was performed in a dry room in order to prevent the water absorption of $K_2CO_3$.

$K_2CO_3$, $MnO_2$, and $MnC_2O_4$ were weighed so that the molar ratio of potassium, manganese (IV), and manganese (II) was 2:1:1, and they were placed in a chromium steel container together with 10 zirconia balls (diameter: 15 mm). Acetone was added, and grinding and mixing were performed with a planetary ball mill (Fritsch; P-6) at 600 rpm for 6 hours. After the acetone was removed under reduced pressure, the collected powder was formed into pellets at 40 MPa, and fired in an Ar flow at 700° C., 800° C., or 850° C. for 2 hours. The heating rate in this case was set to 400° C./h. The cooling rate was 100° C./h until 300° C., followed by natural cooling to room temperature. As a sample preparation method for avoiding the influence of air exposure due to the hygroscopicity of the product, the product obtained after firing was placed in a glove box in which an Ar atmosphere was maintained, and stored in an environment without contact with air. The product ($K_2Mn^{2+}Mn^{4+}O_4$) was confirmed by X-ray diffraction.

Figure 50:
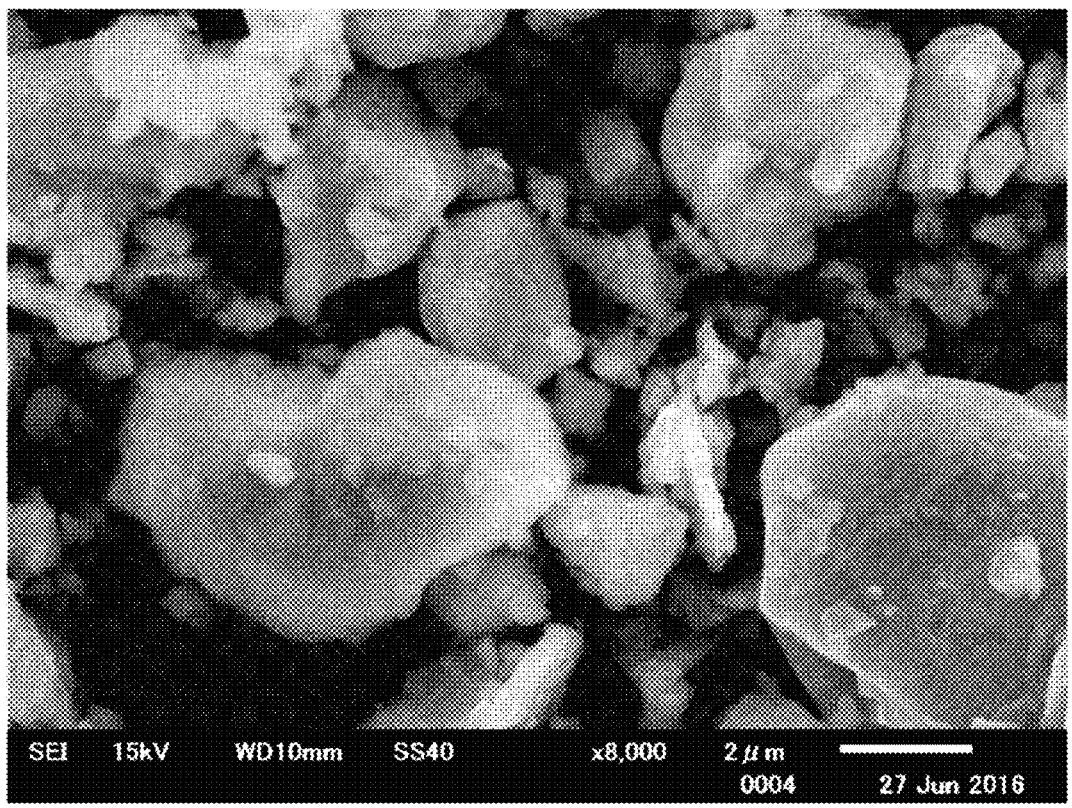
FIG. 50 shows an SEM image of $K_2Mn^{2+}Mn^{4+}O_4$ obtained in Example 13.
Figure 51:
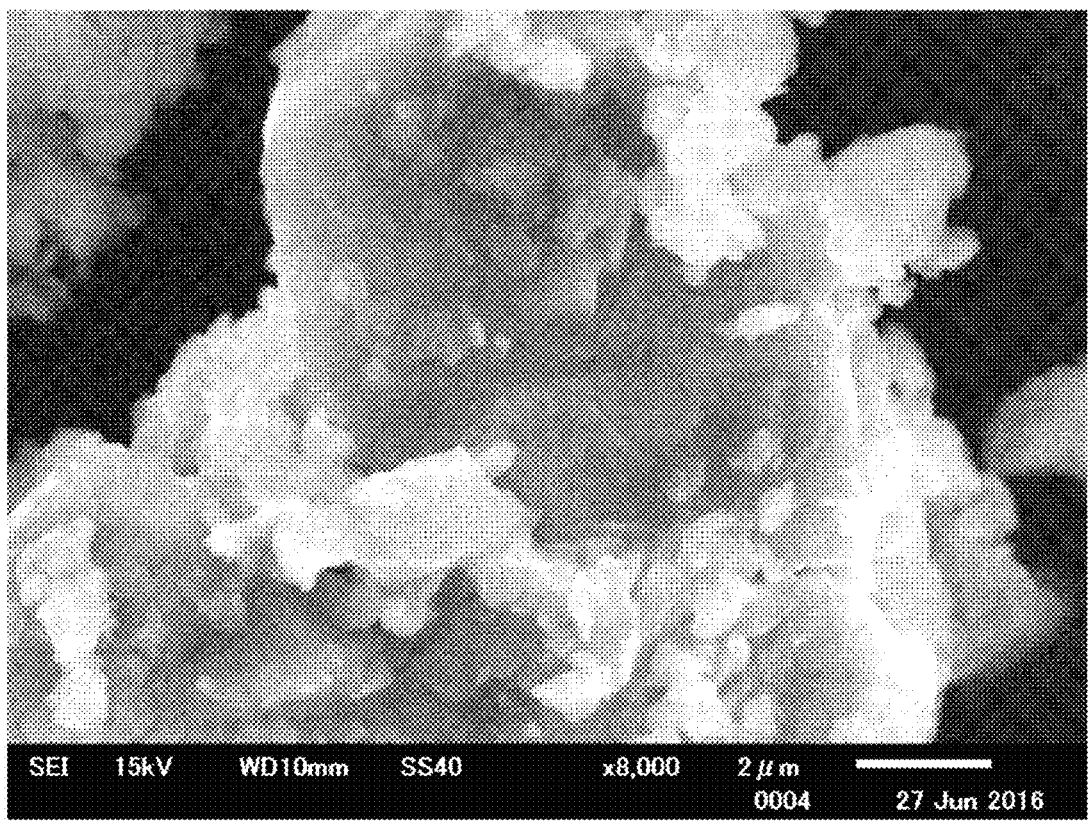
FIG. 51 shows a high-resolution SEM image of $K_2Mn^{2+}Mn^{4+}O_4$ obtained in Example 13.

$K_2Mn^{2+}Mn^{4+}O_4$ obtained in Example 13 was observed using a scanning electron microscope and a high-resolution scanning electron microscope. FIGS. 50 and 51 show the results. The results shown in FIGS. 50 and 51 reveal that $K_2Mn^{2+}Mn^{4+}O_4$ having a particle diameter of around 7 μm was obtained.

Figure 52:
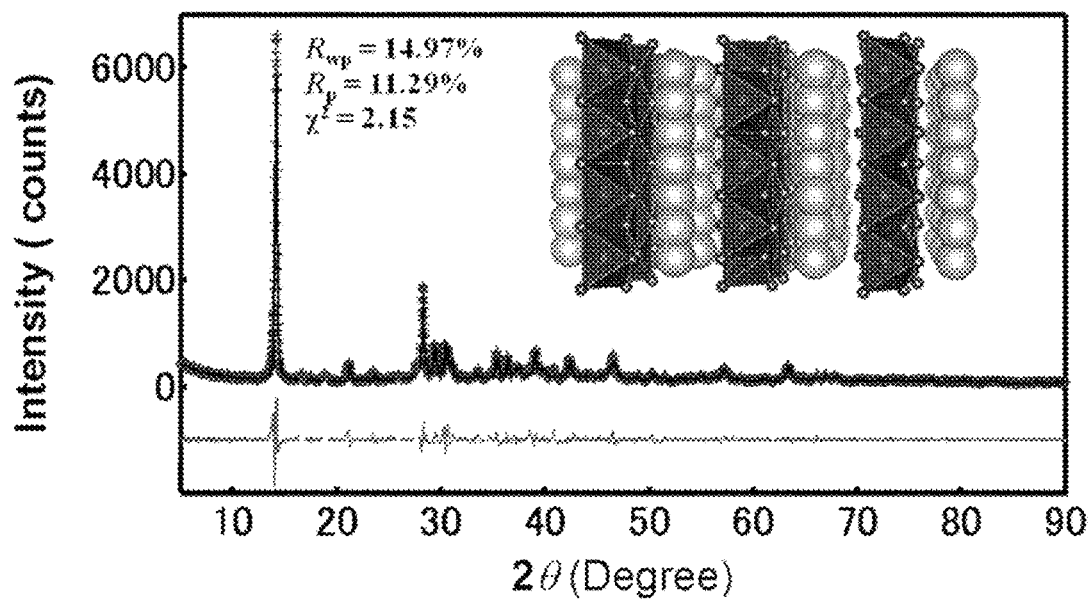
FIG. 52 shows a Rietveld X-ray diffraction pattern of $K_2Mn^{2+}Mn^{4+}O_4$ obtained in Example 13.

The product ($K_2Mn^{2+}Mn^{4+}O_4$) obtained by firing at 800° C. or 1000° C. was confirmed by Rietveld X-ray diffraction patterns. FIGS. 20, 21, and 52 show the results. The results confirmed that the obtained $K_2Mn^{2+}Mn^{4+}O_4$ had a monoclinic structure (space group C2/m S.G), and that the lattice constants were a=14.0040(20)Å, b=2.9564(2)Å, c=10.7458(8)Å, β=96.63(0)°, and V=441.9(1)Å$^3$.

Figure 53:
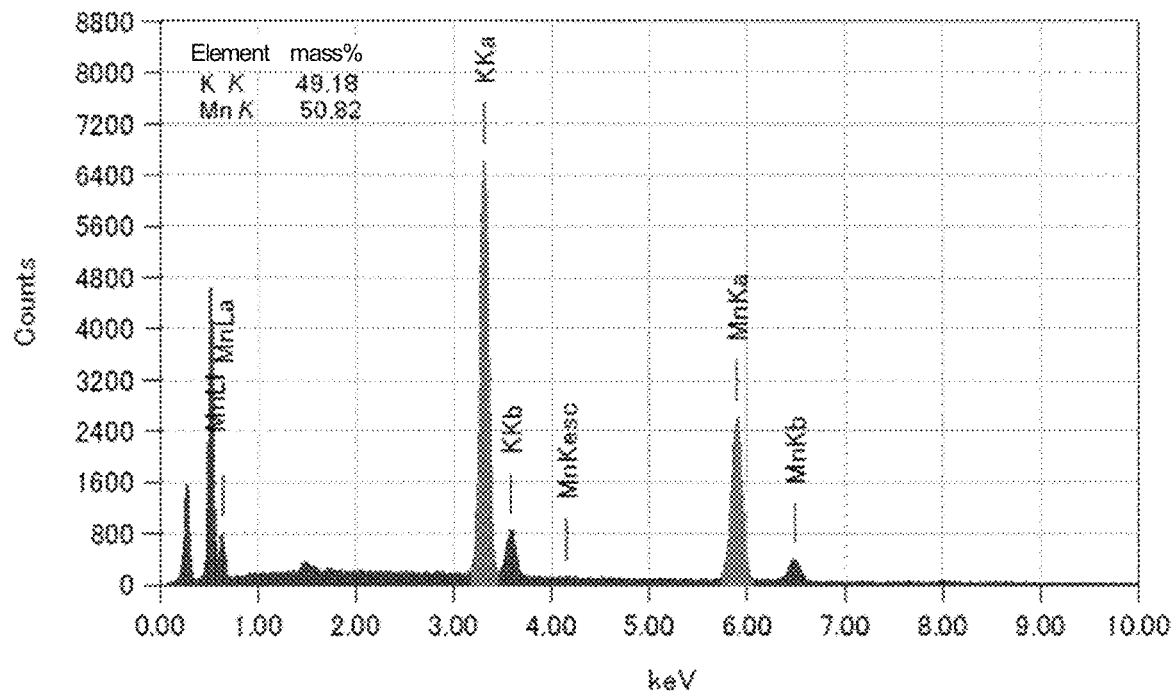
FIG. 53 shows the results of SEM-EDX of $K_2Mn^{2+}Mn^{4+}O_4$ obtained in Example 13.

The elemental analysis of $K_2Mn^{2+}Mn^{4+}O_4$ obtained in Example 13 was performed by SEM-EDX. FIG. 53 shows the results. The results reveal that the amount of K is 49.18 mass %, and the amount of Mn is 50.82 mass %, based on 100 mass % of the total metal amount.

Figure 54:
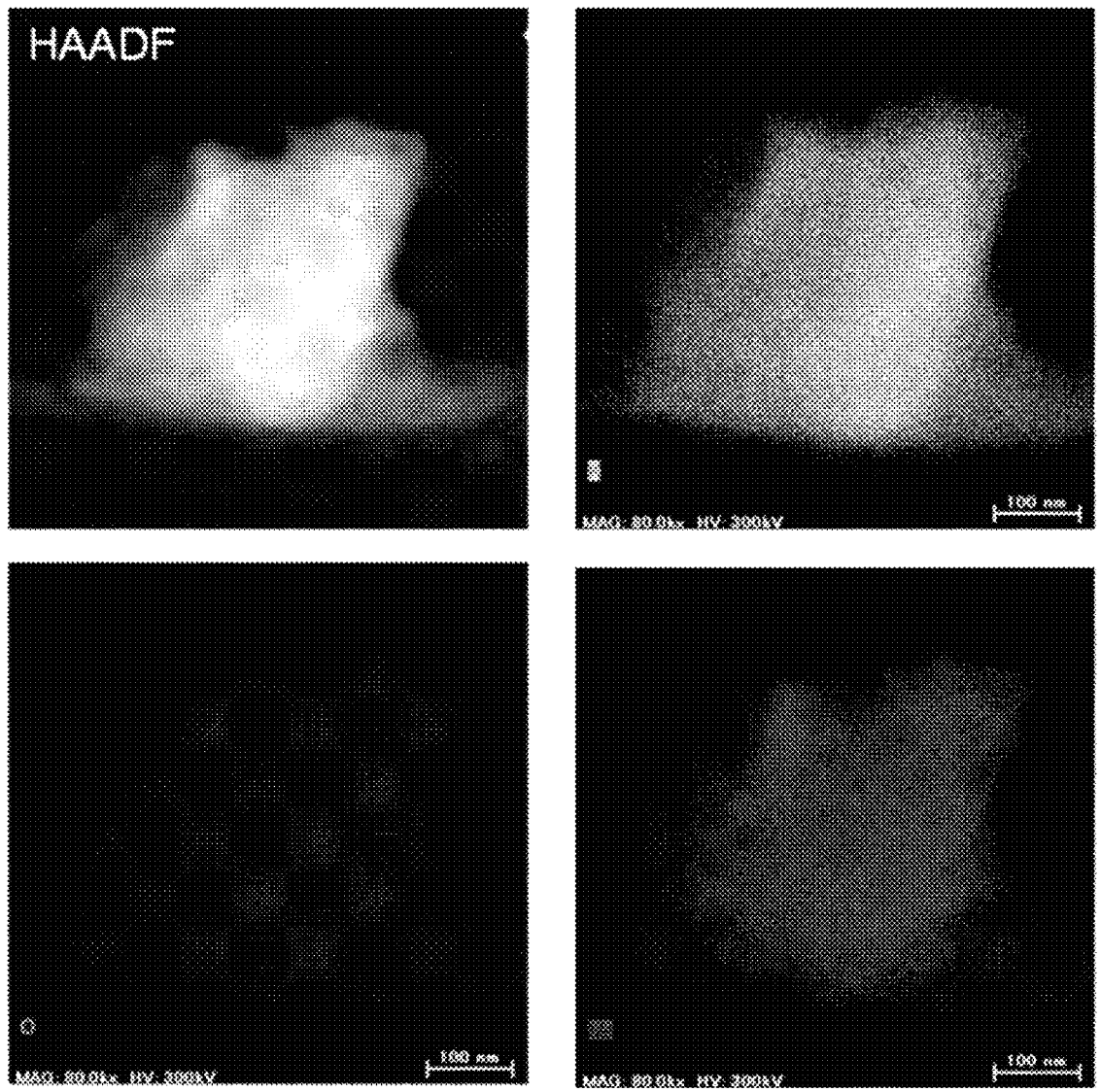
FIG. 54 shows HAADF-STEM images of $K_2Mn^{2+}Mn^{4+}O_4$ obtained in Example 13.

$K_2Mn^{2+}Mn^{4+}O_4$ obtained in Example 13 was evaluated by HAADF-STEM. FIG. 54 shows the results. As a result, it can be understood that all of the elements K, Mn, and O are uniformly present throughout the product.

Example 14

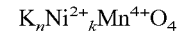

Example 14

$K_2CO_3$, $Ni(OH)_2$, and $MnO_2$ were used as starting material powders. Operation was performed in a dry room in order to prevent the water absorption of $K_2CO_3$.

$K_2CO_3$, $Ni(OH)_2$, and $MnO_2$ were weighed so that the molar ratio of potassium, nickel, and manganese was 2:1:1, and mixed in an agate mortar for about 30 minutes. The mixture was formed into pellets, and fired in an electric furnace in argon at 800 to 1000° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Ni^{2+}Mn^{4+}O_4$) was confirmed by X-ray diffraction.

The product ($K_2Mn^{2+}Mn^{4+}O_4$) obtained by firing at 800° C. or 1000° C. was confirmed by X-ray diffraction patterns. FIGS. 20 and 21 show the results.

Figure 55:
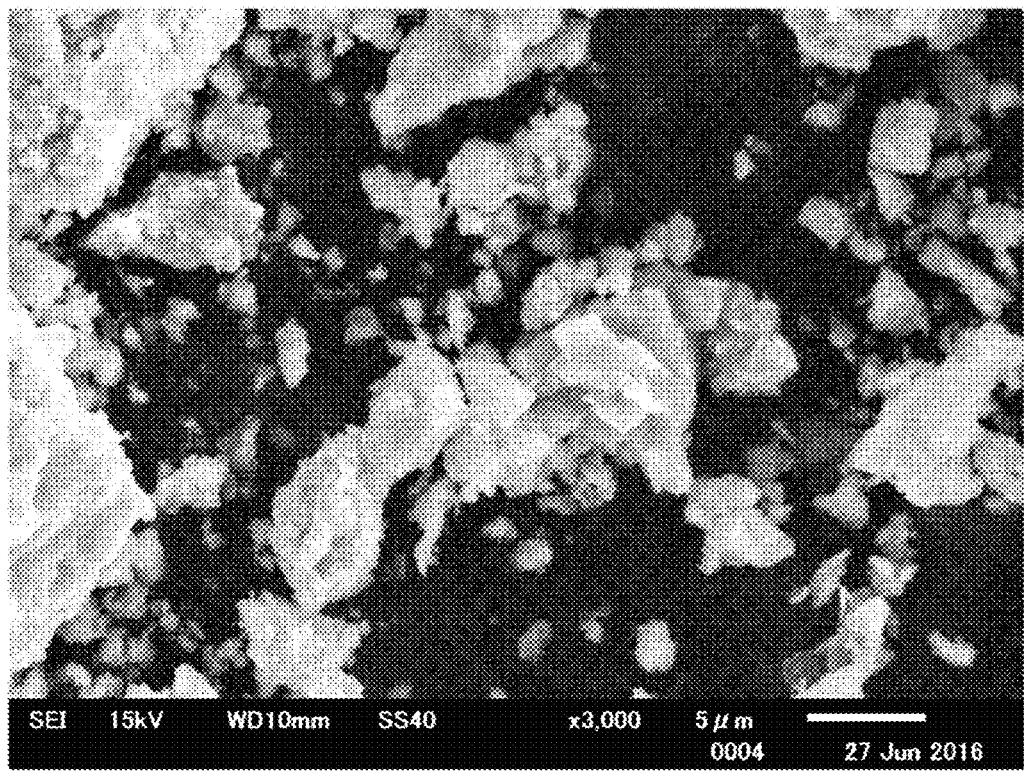
FIG. 55 shows an SEM image of $K_2Ni^{2+}Mn^{4+}O_4$ obtained in Example 14.
Figure 56:
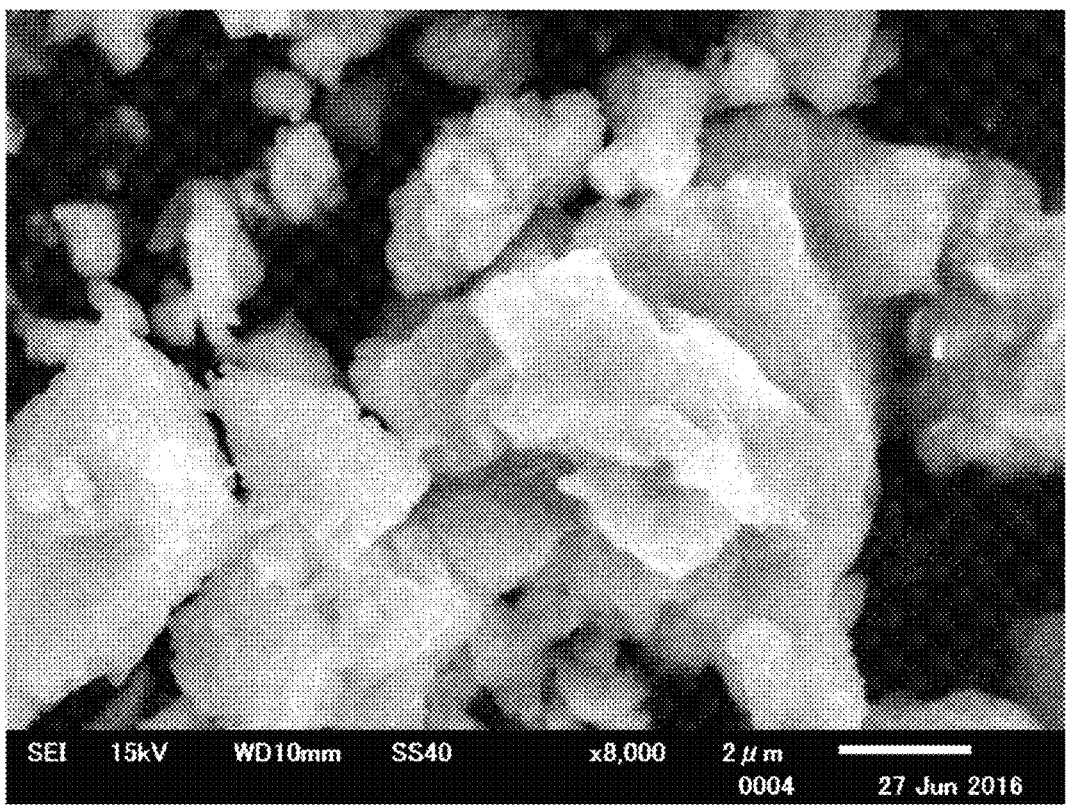
FIG. 56 shows a high-resolution SEM image of $K_2Ni^{2+}Mn^{4+}O_4$ obtained in Example 14.

$K_2Ni^{2+}Mn^{4+}O_4$ obtained in Example 14 was observed using a scanning electron microscope and a high-resolution scanning electron microscope. FIGS. 55 and 56 show the results. The results shown in FIGS. 55 and 56 reveal that $K_2Ni^{2+}Mn^{4+}O_4$ having a particle diameter of around 7 μm was obtained.

Figure 57:
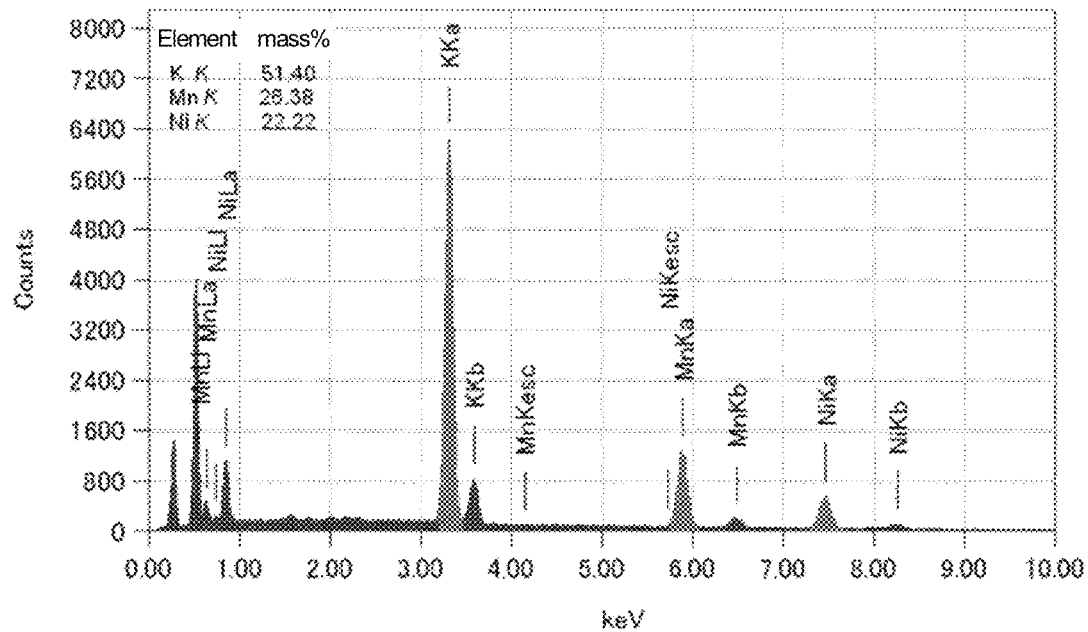
FIG. 57 shows the results of SEM-EDX of $K_2Ni^{2+}Mn^{4+}O_4$ obtained in Example 14.

The elemental analysis of $K_2Ni^{2+}Mn^{4+}O_4$ obtained in Example 14 was performed by SEM-EDX. FIG. 57 shows the results. The results reveal that the amount of K is 51.40 mass %, the amount of Mn is 26.38 mass %, and the amount of Ni is 22.22 mass %, based on 100 mass % of the total metal amount.

Example 15

$K_nCo^{2+}_kMn^{4+}O_4$ $K_2CO_3$, $CoC_2O_4$, and $MnO_2$ were used as starting material powders. Operation was performed in a dry room in order to prevent the water absorption of $K_2CO_3$.

$K_2CO_3$, $CoC_2O_4$, and $MnO_2$ were weighed so that the molar ratio of potassium, cobalt, and manganese was 2:1:1, and mixed in an agate mortar for about 30 minutes. The mixture was formed into pellets, and fired in an electric furnace in argon at 800 to 1000° C. for 1 hour. As a sample preparation method for avoiding the influence of air exposure due to the hygroscopicity of the product, the product obtained after firing was placed in a glove box in which an Ar atmosphere was maintained, and stored in an environment without contact with air. The product ($K_2Co^{2+}Mn^{4+}O_4$) was confirmed by X-ray diffraction.

Figure 58:
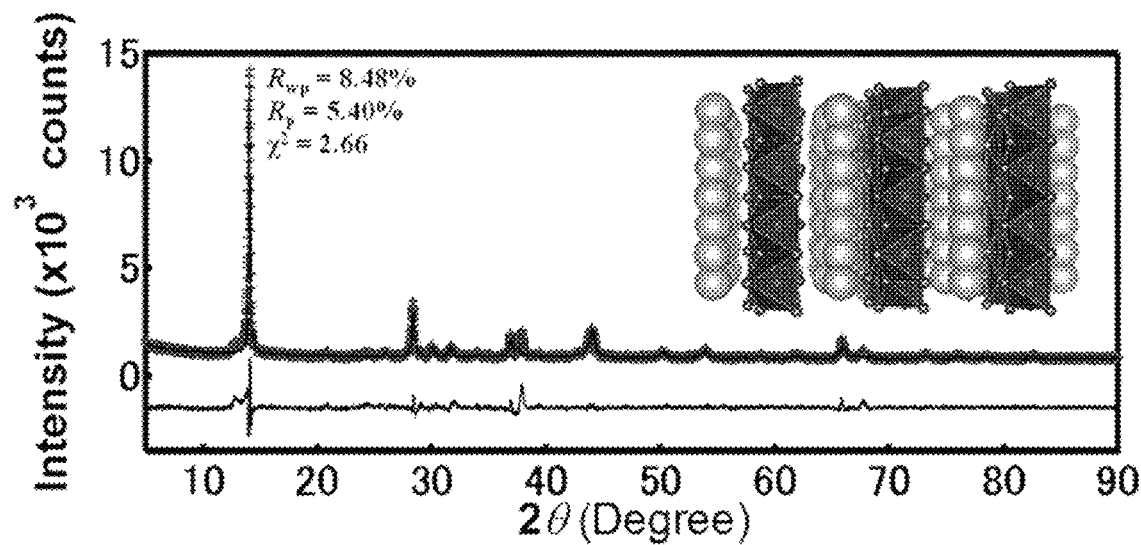
FIG. 58 shows a Rietveld X-ray diffraction pattern of $K_2Co^{2+}Mn^{4+}O_4$ obtained in Example 15.

The product ($K_2Mn^{2+}Mn^{4+}O_4$) obtained by firing at 800° C. or 1000° C. was confirmed by X-ray diffraction patterns. FIGS. 20, 21, and 58 show the results. The results confirmed that the obtained $K_2Co^{2+}Mn^{4+}O_4$ had a monoclinic structure (space group C2/m S.G), and that the lattice constants were a=12.9719(24)Å, b=2.8233(5)Å, c=10.4685(9)Å, β=95.22(1)°, and V=381.8(1)Å³.

Figure 59:
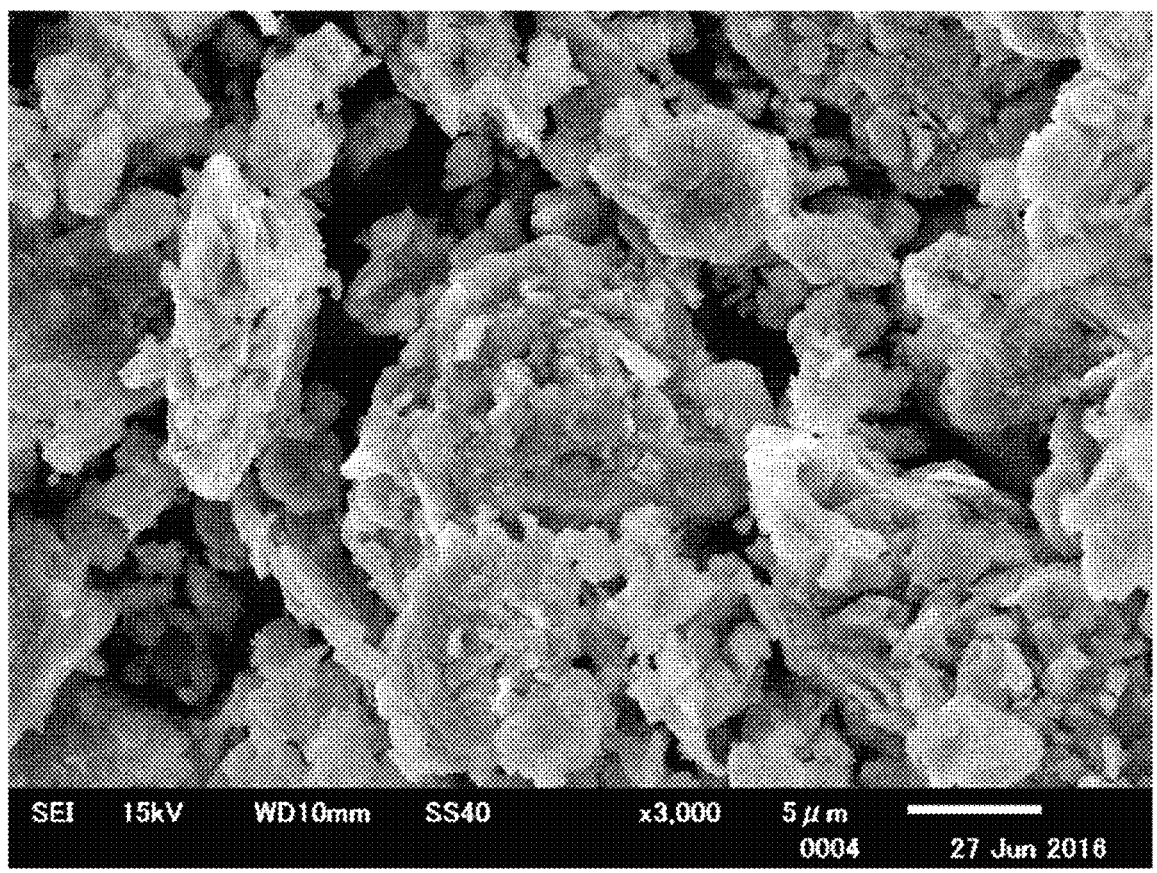
FIG. 59 shows an SEM image of $K_2Co^{2+}Mn^{4+}O_4$ obtained in Example 15.
Figure 60:
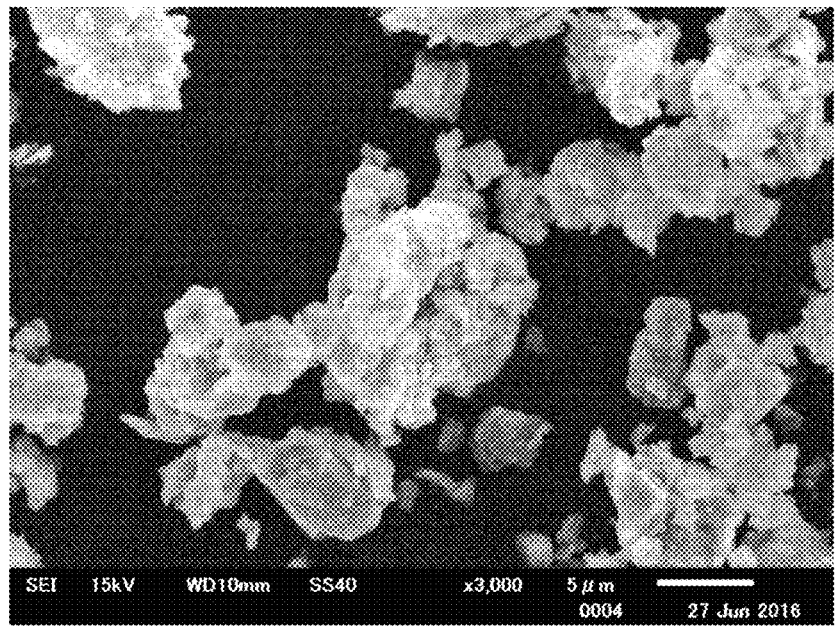
FIG. 60 shows high-resolution SEM images of $K_2Co^{2+}Mn^{4+}O_4$ obtained in Example 15.
Figure 60:
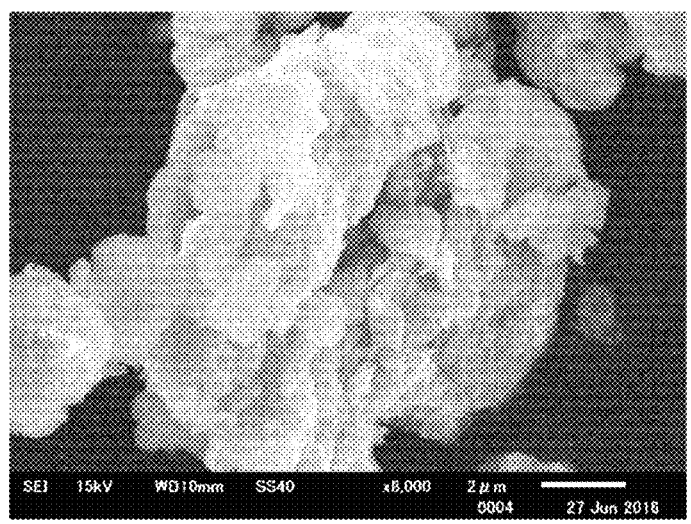

$K_2Co^{2+}Mn^{4+}O_4$ obtained in Example 15 was observed using a scanning electron microscope and a high-resolution scanning electron microscope. FIGS. 59 and 60 show the results. The results shown in FIGS. 59 and 60 reveal that $K_2Co^{2+}Mn^{4+}O_4$ having a particle diameter of around 6 μm was obtained.

Figure 61:
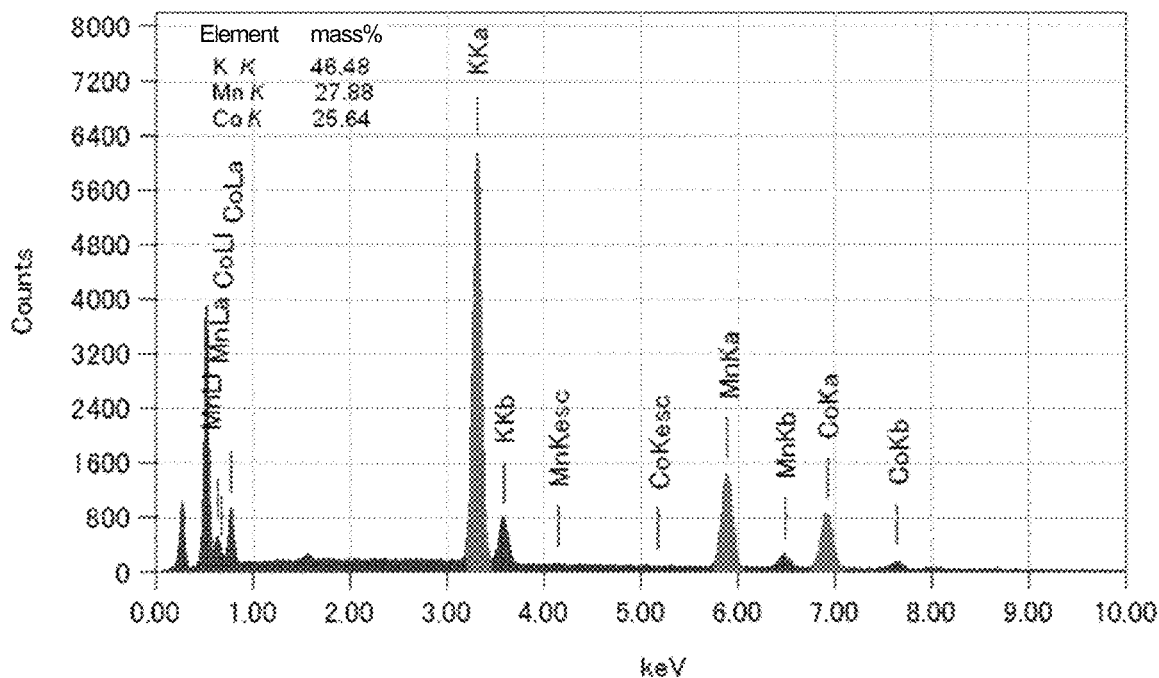
FIG. 61 shows the results of SEM-EDX of $K_2Co^{2+}Mn^{4+}O_4$ obtained in Example 15.

The elemental analysis of $K_2Co^{2+}Mn^{4+}O_4$ obtained in Example 15 was performed by SEM-EDX. FIG. 61 shows the results. The results reveal that the amount of K is 46.48 mass %, the amount of Mn is 27.88 mass %, and the amount of Co is 25.64 mass %, based on 100 mass % of the total metal amount.

Table 1 below collectively shows the lattice parameters of the materials obtained in the above Examples. In Table 1, β and V represent the angle and volume of lattice constant. The error of the lattice constant parameters a, b, and c is within 0.1 Å, and the error of β is within 15°.

Moreover, in Table 1 below, "capacity" refers to theoretical charge-discharge capacity during insertion and extraction of potassium, and is determined in the following manner.

The amount of 2 potassium ions extracted from $K_2A^{2+}B^{4+}O_4$ is represented by z, and the insertion reaction proceeds as shown in the following formula.

$$K_2A^{2+}B^{4+}O_4 \leftrightarrow A^{(2+2)+}B^{4+}O_4 + 2K^+ + 2e^-$$

This reaction is performed at a constant current I (A). When t (sec) represents the time of current flow, m (g) represents the weight of $K_2A^{2+}B^{4+}O_4$, M represents molecular weight, and F represents the Faraday constant, the capacity and the amount of reacted lithium z are represented as follows:

$$z \times \frac{m}{M} = \frac{it}{F} \Rightarrow z = \frac{itF}{Fm}$$

$$\text{Capacity/mAh} \cdot g^{-1} = \frac{it}{m} \times \frac{1000}{3600} = \frac{it}{3.6m}$$

Specifically, $$\text{Capacity[mAhg}^{-1}] = \frac{n \times F[Cmol^{-1}]}{M_w[gmol^{-1}]} = \frac{n \times 96485[C]}{M_w[g]} =$$

$$\frac{n \times 96485[As]}{M_w} = \frac{n \times 96485 \times \frac{1000}{3600}[mAh]}{M_w[g]} = \frac{26801 \times n}{M_w}[mAhg^{-1}]$$

$$K_2CoSiO_4 \leftrightarrow CoSiO_4 + 2e^- + 2K^+ (\therefore n = 2)$$

$$\therefore \text{Capacity} = \frac{26801 \times n(=2)}{M_w(=229.21)} \cong 234[mAhg^{-1}]$$

The theoretical capacity can be calculated from these formulas. In the case of $K_2Co^{2+}Si^{4+}O_4$, up to 2 potassium ions can be theoretically extracted; thus, the theoretical capacity is determined to be 233.9 mAh·g⁻¹.

TABLE 1

| compound | symmetry | lattice | a (Å) | b (Å) | c (Å) | β (°) | V (Å³) | capacity (mAhg⁻¹) |
|---|---|---|---|---|---|---|---|---|
| $K_2FeSiO_4$ | Ed-3m | cubic | 7.839 | 7.829 | 7.829 | 90.00 | 479.9 | 237 |
| $K_2FeGeO_4$ | | orthorhombic | 3.951 | 7.167 | 11.918 | 90.00 | 337.5 | 198 |
| $K_2FeTiO_4$ | Fddd | orthorhombic | 6.979 | 7.989 | 11.918 | 90.00 | 337.5 | 218 |
| $K_2FeMnO_4$ | | orthorhombic | 4.806 | 4.609 | 6.945 | 90.00 | 153.8 | 212 |
| $K_2MnSiO_4$ | Fd-3m | cubic | 7.826 | 7.826 | 7.826 | 90.00 | 479.3 | 238 |
| $K_2NiSiO_4$ | I41/a c d | tetragonal | 5.576 | 5.576 | 3.534 | 90.00 | 109.9 | 234 |
| $K_2CoSiO_4$ | Fd-3m | cubic | 7.735 | 7.735 | 7.735 | 90.00 | 462.8 | 234 |
| $K_2CuSiO_4$ | | monoclinic | 4.634 | 3.420 | 6.321 | 90.34 | 100.2 | 229 |
| $K_2CuMnO_4$ | | monoclinic | 4.658 | 3.169 | 11.579 | 106.39 | 163.9 | 206 |
| $K_2MnGeO_4$ | | orthorhombic | 11.131 | 5.533 | 15.782 | 90.00 | 972.1 | 199 |
| $K_2CoTiO_4$ | | monoclinic | 5.047 | 5.659 | 6.269 | 100.44 | 176.1 | 215 |
| $K_2CoGeO_4$ | | tetragonal | 5.712 | 5.712 | 7.434 | 90.00 | 242.5 | 196 |
| $K_2MnTiO_4$ | | monoclinic | 5.868 | 3.251 | 13.043 | 92.61 | 248.5 | 219 |

The elemental analysis of the materials obtained in the above Examples was performed by the ICP-AES method. Table 2 shows the results.

TABLE 2

| $K_2AB\ O_4$ | K (at wt) | A (at wt) | B (at wt) | K (mol wt) | A (mol wt) | B (mol wt) |
|---|---|---|---|---|---|---|
| $K_2FeSiO_4$ | 30.6 | 21.6 | 11.4 | 1.93 | 0.950 | 1.00 |
| $K_2FeMnO_4$ | 27.0 | 21.6 | 20.1 | 1.89 | 1.06 | 1.00 |
| $K_2FeTiO_4$ | 26.3 | 19.9 | 16.8 | 1.92 | 1.02 | 1.00 |
| $K_2MnSiO_4$ | 31.4 | 23.9 | 11.8 | 1.91 | 1.04 | 1.00 |
| $K_2CoSiO_4$ | 32.3 | 22.3 | 12.1 | 1.91 | 0.878 | 1.00 |
| $K_2FeGeO_4$ | 27.6 | 20.1 | 25.2 | 2.03 | 1.04 | 1.00 |
| $K_2CuSiO_4$ | 31.5 | 24.9 | 10.8 | 2.11 | 1.02 | 1.00 |
| $K_2CoTiO_4$ | 27.9 | 19.9 | 17.7 | 1.94 | 0.916 | 1.00 |
| $K_2CoGeO_4$ | 26.1 | 21.9 | 28.2 | 1.72 | 0.957 | 1.00 |
| $K_2NiSiO_4$ | 25.8 | 14.7 | 9.7 | 1.91 | 0.726 | 1.00 |

Test Example 1

Examination of Potassium Extraction/Insertion (Li Half Cell)

To perform charge-discharge measurement, $K_2Co^{2+}Si^{4+}O_4$ obtained in Examples 5-1 and 5-2, polyvinylidene fluoride (PVDF), and acetylene black (AB) were mixed in an agate mortar in a mass ratio of 85:7.5:7.5. The resulting slurry was applied to aluminum foil (thickness: 20 μm), which was a positive electrode current collector, and the resultant was punched into a circle (diameter: 8 mm) to obtain a positive electrode. Further, pressure bonding was performed at 30 to 40 MPa so that the sample was not separated from the positive electrode current collector.

Metal lithium punched with a diameter of 14 mm was used as a negative electrode, and two pieces of porous Celgard 2500 cut out with a diameter of 18 mm were used as separators. An electrolyte solution (Kishida Chemicals) in which LiPF6 was dissolved as a supporting electrolyte at a concentration of 1 mol dm$^{-3}$ in a solvent containing ethylene carbonate (EC) and diethyl carbonate (DEC) in a volume ratio of 1:2 was used. The battery was produced in a glove box in an Ar atmosphere because metal lithium was used and any mixing of water with the electrolyte solution that happened became a factor of increasing the resistance increment. A Cr2032 coin cell was used as a cell. Constant-current, charge-discharge measurement was performed using a voltage switching device by setting the electric current to 10 mAg$^{-1}$, the maximum voltage to 4.8 V, and the minimum voltage to 1.5 V, and by starting with a charge. The charge-discharge measurement was performed with the cell in a 55° C. thermostat bath. As a result, the charging capacity of potassium ions present in the $K_2CoSiO_4$ structure was about 160 mAhg$^{-1}$ in the initial charge process. This corresponds to about 1.4 electrons. Specifically, the reaction generated in Test Example 1 is as follows.

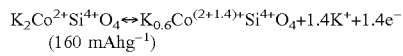
$$K_2Co^{2+}Si^{4+}O_4 \leftrightarrow K_{0.6}Co^{(2+1.4)+}Si^{4+}O_4 + 1.4K^+ + 1.4e^-$$
(160 mAhg$^{-1}$)

Test Example 2

Examination of Cation Extraction and Insertion (K Half-Cell)

Figure 62:
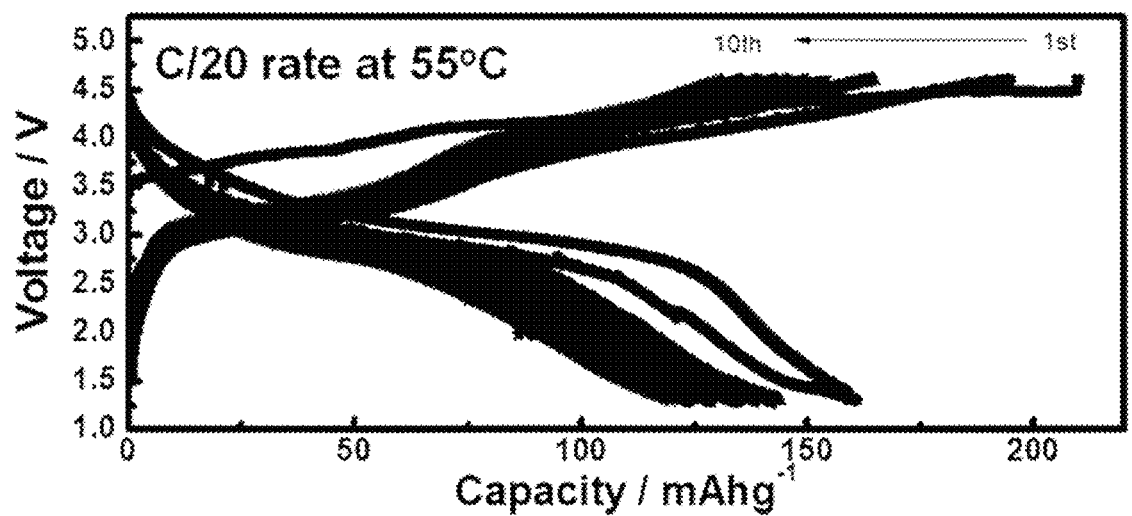
FIG. 62 shows charge-discharge curves of a potassium half cell using $K_2Mn^{2+}Mn^{4+}O_4$ obtained in Example 13.

The test was performed as in Test Example 1, except that $K_2Mn^{2+}Mn^{4+}O_4$ obtained in Example 13 was used, potassium metal was used as a negative electrode, and the electrolyte used was obtained by dissolving KPF6 as a supporting electrolyte in propylene carbonate (PC) at a concentration of 1 mol dm$^{-3}$. FIG. 62 shows the results.

Test Example 3

Examination of Potassium Ion Extraction/Insertion (Potassium Ion Secondary Battery)

Figure 63:
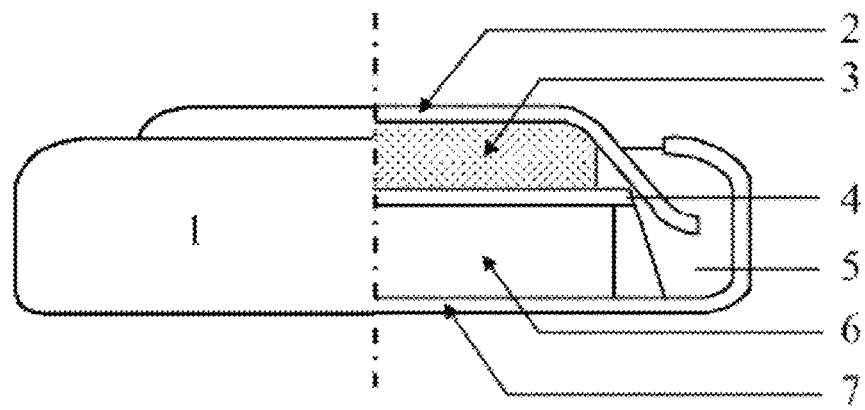
FIG. 63 shows a sectional view of the test cell of Test Example 3.
Figure 64:
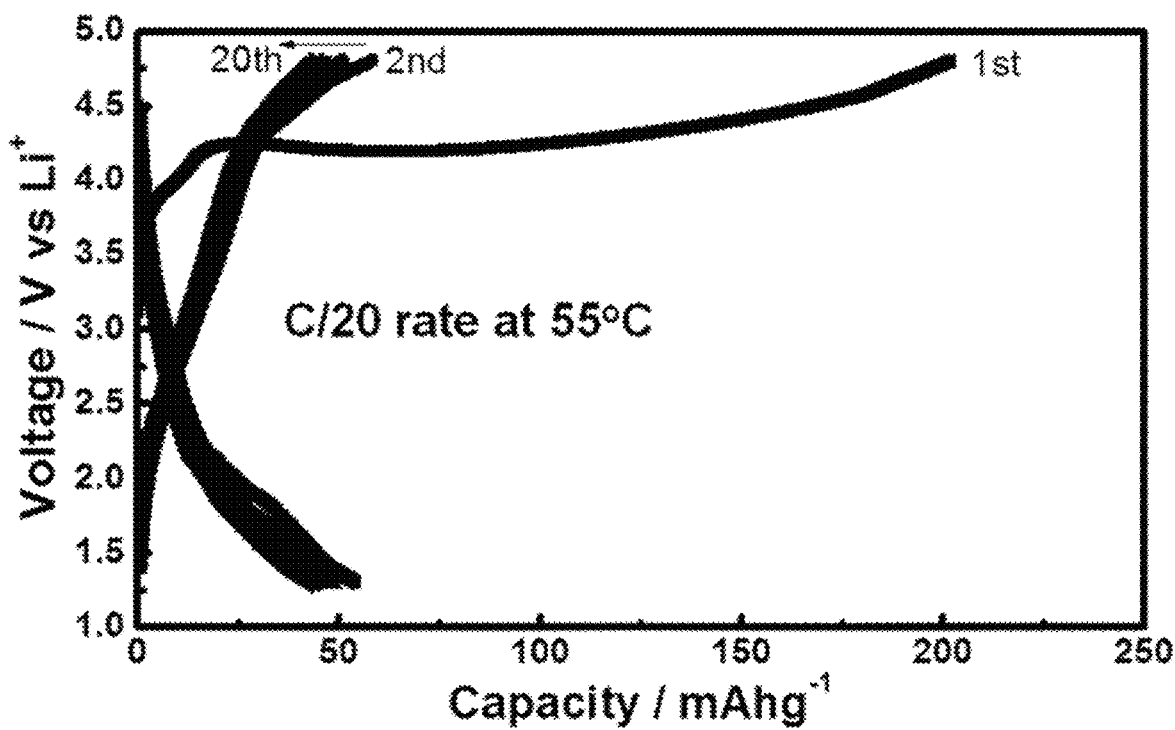
FIG. 64 shows charge-discharge curves of a test cell using $K_2Fe^{2+}Mn^{4+}O_4$.
Figure 65:
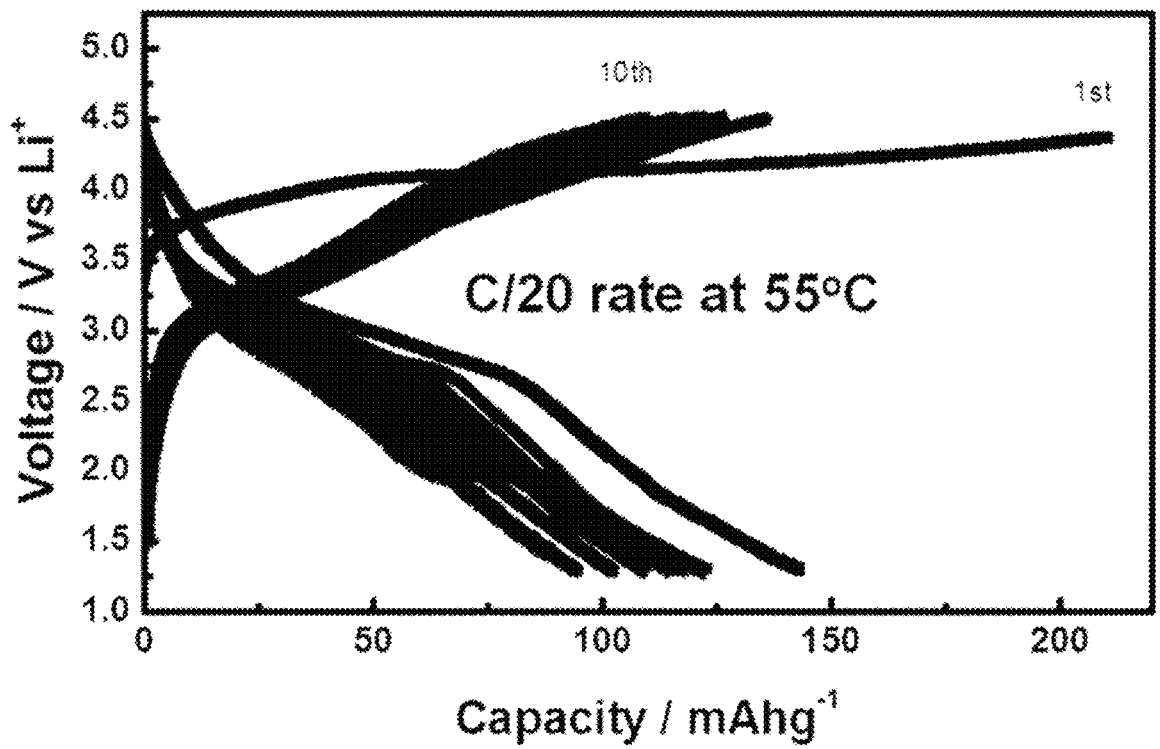
FIG. 65 shows charge-discharge curves of a test cell using $K_2Ni^{2+}Mn^{4+}O_4$.
Figure 66:
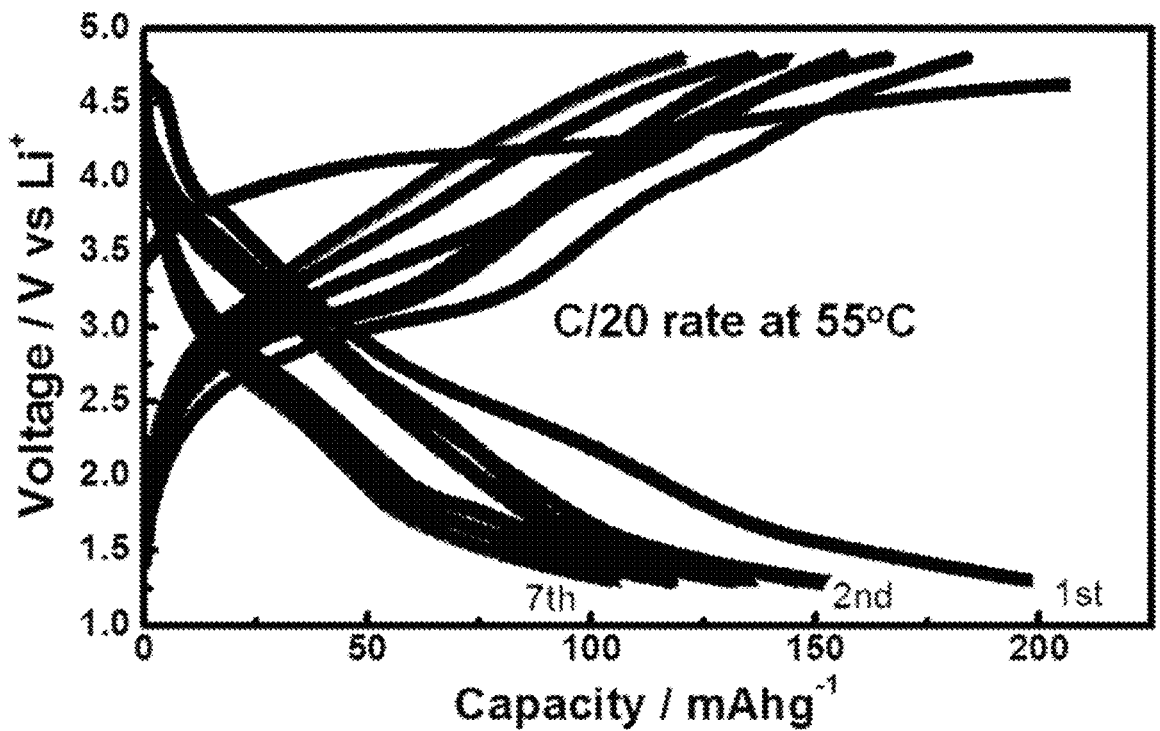
FIG. 66 shows charge-discharge curves of a test cell using $K_2Co2+Mn4+0_4$.
Figure 67:
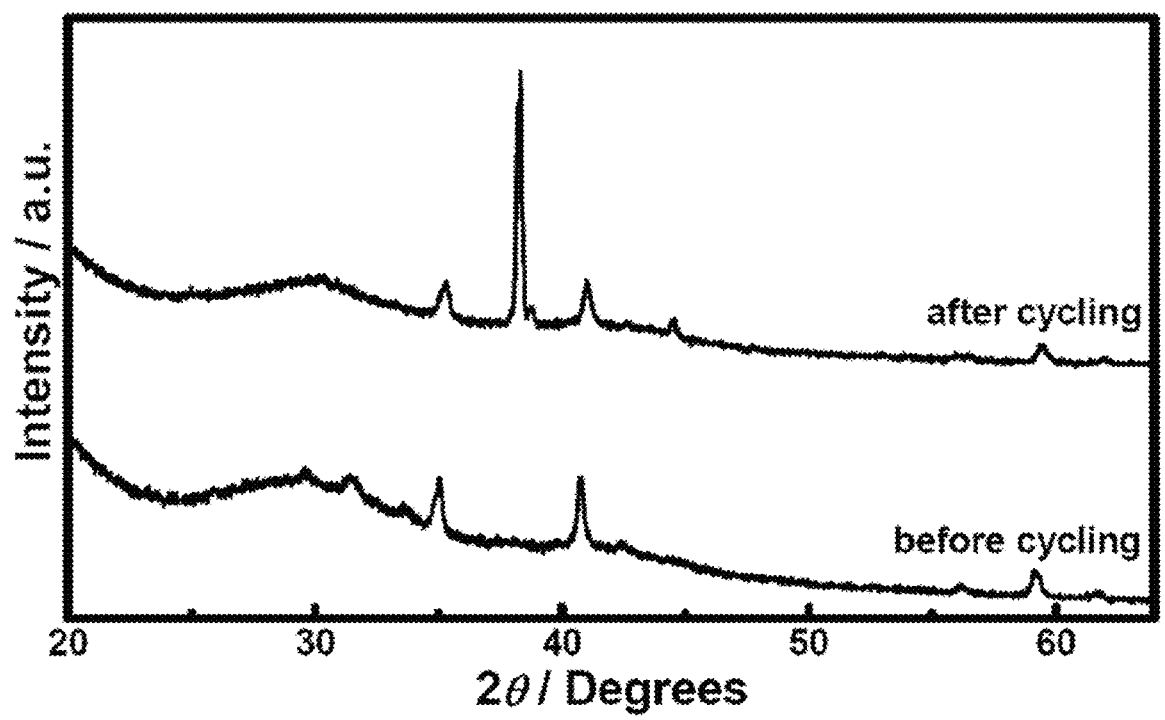
FIG. 67 shows X-ray diffraction patterns of $K_2Fe^{2+}Mn^{4+}O_4$ before and after charge-discharge test.

The CR2032 coin cell shown in FIG. 63 was used as a cell. A Li box was used as a negative electrode. Potassium bis trifluoromethane sulfonyl imide (KTFSI) was used as an electrolyte, and an electrolyte solution obtained by dissolving KTFSI at a concentration of 1M (mol dm$^{-3}$) in a propylene carbonate (PC) solvent was used. Constant-current, charge-discharge measurement was performed using a voltage switching device by setting the electric current to 10 mAg$^{-1}$, the maximum voltage to 4.2 V, and the minimum voltage to 1.5 V, and by starting with a charge. The charge-discharge measurement was performed with the cell in a 55° C. thermostat bath. In order to avoid the influence of the air exposure due to the hygroscopicity of the potassium-containing compound, the means for producing a battery etc. was performed in a glove box in which an Ar atmosphere was maintained. It was revealed that the hygroscopicity of the positive electrode compound was higher in the order of Fe<Mn<Cu≤Co<<Ni, and that the hygroscopicity of a polyanion-based compound was higher in the order of MnO$_4$≤TiO$_4$<SiO$_4$<<GeO$_4$. As a result, the initial charge capacity at a current density rate of C/20 was about 120 mAhg$^{-1}$ (52% of the theoretical capacity). FIGS. 64 to 66 show the results. Further, FIG. 67 shows the X-ray diffraction patterns of $K_2Fe^{2+}Mn^{4+}O_4$ before and after charge-discharge test.

REFERENCE SIGNS LIST

1. Potassium ion secondary battery
2. Negative electrode terminal
3. Negative electrode
4. Separator impregnated with electrolyte
5. Insulating packing
6. Positive electrode
7. Positive electrode can

The invention claimed is:

1. A potassium ion secondary battery positive electrode active material comprising a potassium compound represented by general formula (1): $K_nA_kBO_m$,
   wherein A is positive divalent manganese, iron, or copper; B is positive tetravalent silicon, germanium or manganese k is 0.6 to 1.5; n is 1.5 to 2.5; and m is 3.5 to 4.5.

2. The potassium ion secondary battery positive electrode active material according to claim 1, wherein the potassium compound has at least one member selected from the group consisting of a cubic structure, a tetragonal structure, an orthorhombic structure, and a monoclinic structure.

3. The potassium ion secondary battery positive electrode active material according to claim 1, wherein the potassium compound has a mean particle diameter of 0.2 to 200 μm.

4. A method for producing the potassium ion secondary battery positive electrode active material according to claim 1, the method comprising a heating step of heating a mixture containing potassium; manganese, iron, or copper; silicon, germanium, or manganese; and oxygen.

5. The production method according to claim 4, wherein the heating temperature in the heating step is 600 to 1500° C.

6. A potassium ion secondary battery positive electrode comprising the potassium ion secondary battery positive electrode active material according to claim 1.

7. The potassium ion secondary battery positive electrode according to claim 6, further comprising a conductive material.

8. A potassium ion secondary battery comprising the potassium ion secondary battery positive electrode according to claim 6.

* * * * *